United States Patent
Allen et al.

(10) Patent No.: US 9,834,710 B2
(45) Date of Patent: Dec. 5, 2017

(54) ADHESIVE COMPOSITIONS AND METHODS

(71) Applicant: Saudi Aramco Technologies Company, Dhahran (SA)

(72) Inventors: Scott D. Allen, Ithaca, NY (US); Vahid Sendijarevic, Troy, MI (US); James O'Connor, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 0 days.

(21) Appl. No.: 14/394,762

(22) PCT Filed: Apr. 16, 2013

(86) PCT No.: PCT/US2013/036751
§ 371 (c)(1),
(2) Date: Oct. 16, 2014

(87) PCT Pub. No.: WO2013/158621
PCT Pub. Date: Oct. 24, 2013

(65) Prior Publication Data
US 2015/0083326 A1    Mar. 26, 2015

Related U.S. Application Data

(60) Provisional application No. 61/683,277, filed on Aug. 15, 2012, provisional application No. 61/625,065, filed on Apr. 16, 2012.

(51) Int. Cl.
| | | |
|---|---|---|
| C08G 18/42 | (2006.01) | |
| C08G 18/44 | (2006.01) | |
| C08G 18/76 | (2006.01) | |
| C09J 5/00 | (2006.01) | |
| C09J 175/06 | (2006.01) | |
| C09J 175/04 | (2006.01) | |
| C08G 18/08 | (2006.01) | |
| C08G 18/12 | (2006.01) | |

(52) U.S. Cl.
CPC .......... *C09J 175/04* (2013.01); *C08G 18/089* (2013.01); *C08G 18/12* (2013.01); *C08G 18/42* (2013.01); *C08G 18/44* (2013.01); *C08G 18/7671* (2013.01); *C09J 5/00* (2013.01); *C09J 175/06* (2013.01); *C08G 2170/20* (2013.01); *C08G 2170/80* (2013.01); *C09J 2201/61* (2013.01)

(58) Field of Classification Search
CPC .... C08G 18/42; C08G 18/44; C08G 18/7671; C09J 175/00; C09J 175/04; C09J 175/06; C09J 5/00; C09J 169/00; C09D 175/04
See application file for complete search history.

(56) References Cited

U.S. PATENT DOCUMENTS

| | | | |
|---|---|---|---|
| 5,637,739 A | 6/1997 | Jacobsen et al. | |
| 5,663,393 A | 9/1997 | Jacobsen et al. | |
| 5,665,890 A | 9/1997 | Jacobsen et al. | |
| 5,929,232 A | 7/1999 | Jacobsen et al. | |
| 6,130,340 A | 10/2000 | Jacobsen et al. | |
| 6,133,398 A * | 10/2000 | Bhat ................. | C08G 18/10 523/211 |
| 6,309,997 B1 | 10/2001 | Fujita et al. | |
| 6,525,162 B1 | 2/2003 | Altounian | |
| 6,639,087 B2 | 10/2003 | Larrow et al. | |
| 6,844,448 B2 | 1/2005 | Jacobsen et al. | |
| 6,884,750 B2 | 4/2005 | Kim et al. | |
| 6,903,043 B2 | 6/2005 | Kim et al. | |
| 7,145,022 B2 | 12/2006 | Luinstra et al. | |
| 7,244,805 B2 | 7/2007 | Park et al. | |
| 8,163,867 B2 | 4/2012 | Lee et al. | |
| 8,207,365 B2 | 6/2012 | Zheng et al. | |
| 8,232,267 B2 | 7/2012 | Groves | |
| 8,247,520 B2 | 8/2012 | Allen et al. | |
| 8,252,955 B2 | 8/2012 | Gao et al. | |
| 8,461,290 B2 | 6/2013 | Carpentier et al. | |
| 8,470,956 B2 | 6/2013 | Allen et al. | |
| 8,507,733 B2 | 8/2013 | Ok et al. | |
| 8,598,309 B2 | 12/2013 | Jeong et al. | |
| 8,604,155 B2 | 12/2013 | Allen et al. | |
| 8,642,721 B2 | 2/2014 | Ok et al. | |
| 8,748,555 B2 | 6/2014 | Allen | |
| 8,791,274 B2 | 7/2014 | Ok et al. | |
| 8,921,508 B2 | 12/2014 | Allen et al. | |
| 8,952,104 B2 | 2/2015 | Allen | |
| 9,029,498 B2 | 5/2015 | Allen et al. | |
| 9,376,531 B2 | 6/2016 | Allen et al. | |

(Continued)

FOREIGN PATENT DOCUMENTS

| | | |
|---|---|---|
| CA | 2804134 A1 | 1/2012 |
| EP | 2146977 B1 | 11/2012 |

(Continued)

OTHER PUBLICATIONS

Epoxy Curing Agents and Modifiers. Air Products. Pub. No. 125-9723 (1998).
International Search Report for PCT/US2013/036751, 3 pages (dated Aug. 23, 2013).
Written Opinion for PCT/US2013/036751, 13 pages (dated Aug. 23, 2013).

*Primary Examiner* — Christopher M Rodd
(74) *Attorney, Agent, or Firm* — Choate, Hall & Stewart LLP; Charles E. Lyon; Michael A. Shinall

(57) ABSTRACT

The present invention encompasses polyurethane adhesive compositions comprising aliphatic polycarbonate chains. In one aspect, the present invention encompasses polyurethane adhesives derived from aliphatic polycarbonate polyols and polyisocyanates wherein the polyol chains contain a primary repeating unit having a structure:. In another aspect, the invention provides articles comprising the inventive polyurethane compositions as well as methods of making such compositions.

36 Claims, 14 Drawing Sheets

(56) References Cited

U.S. PATENT DOCUMENTS

| | | |
|---|---|---|
| 9,399,701 B2 | 7/2016 | Allen et al. |
| 2002/0143133 A1 | 10/2002 | Imai et al. |
| 2003/0070741 A1* | 4/2003 | Rosenberg ............. C08G 18/10 156/108 |
| 2004/0063869 A1* | 4/2004 | Minamida ............. C08G 18/12 525/452 |
| 2008/0312386 A1 | 12/2008 | Nakamura et al. |
| 2010/0256329 A1 | 10/2010 | Nozaki et al. |
| 2011/0230580 A1 | 9/2011 | Allen et al. |
| 2013/0059973 A1 | 3/2013 | Wamprecht et al. |
| 2013/0150526 A1 | 6/2013 | Wamprecht et al. |
| 2013/0274401 A1 | 10/2013 | Allen et al. |
| 2014/0072806 A1 | 3/2014 | Allen et al. |
| 2014/0249279 A1 | 9/2014 | Williams et al. |
| 2015/0344751 A1 | 12/2015 | Allen et al. |
| 2016/0264728 A1 | 9/2016 | Allen et al. |

FOREIGN PATENT DOCUMENTS

| | | | |
|---|---|---|---|
| EP | 2257559 B1 | 10/2014 | |
| KR | 10-2011-0053652 A | 5/2011 | |
| WO | WO-88/06577 A1 | 9/1988 | |
| WO | WO-98/04538 A1 | 2/1998 | |
| WO | WO-2009/148889 A2 | 12/2009 | |
| WO | WO-2010/022388 A2 | 2/2010 | |
| WO | WO-2010/028362 A1 | 3/2010 | |
| WO | WO-2010/033703 A1 | 3/2010 | |
| WO | WO-2010/033705 A1 | 3/2010 | |
| WO | WO 2010028362 A1 * | 3/2010 | ......... C08G 64/0208 |
| WO | WO-2010/062703 A1 | 6/2010 | |
| WO | WO-2010/115567 A1 | 10/2010 | |
| WO | WO-2011/047123 A2 | 4/2011 | |
| WO | WO-2011/079041 A1 | 6/2011 | |
| WO | WO-2011/129940 A1 | 10/2011 | |
| WO | WO-2011/138274 A1 | 11/2011 | |
| WO | WO-2011/163250 A1 | 12/2011 | |
| WO | WO 2011163250 A1 * | 12/2011 | ......... C08G 18/0823 |
| WO | WO-2012/027725 A1 | 3/2012 | |
| WO | WO-2012/037282 A2 | 3/2012 | |
| WO | WO-2012/040454 A2 | 3/2012 | |
| WO | WO-2012/071505 A1 | 5/2012 | |
| WO | WO-2012/094619 A1 | 7/2012 | |
| WO | WO-2012/154849 A1 | 11/2012 | |
| WO | WO-2013/012895 A1 | 1/2013 | |
| WO | WO-2013/016331 A2 | 1/2013 | |
| WO | WO-2013/022932 A1 | 2/2013 | |
| WO | WO-2013/055747 A1 | 4/2013 | |
| WO | WO-2013/067460 A1 | 5/2013 | |
| WO | WO-2013/090276 A1 | 6/2013 | |
| WO | WO-2013/096602 A1 | 6/2013 | |
| WO | WO-2013/138161 A1 | 9/2013 | |

* cited by examiner

ADHESIVE COMPOSITIONS AND METHODS

PRIORITY CLAIM

This application claims priority to U.S. Application Ser. Nos. U.S. 61/625,065 (filed 16 Apr. 2012) and 61/683,277 (filed 15 Aug. 2012) each of which is incorporated herein by reference in its entirety.

GOVERNMENT SUPPORT

The invention was made in part with United States Government support under grants DE-FE0002474 awarded by the Department of Energy. The United States Government has certain rights in the invention.

FIELD OF THE INVENTION

This invention pertains to the field of polymers. More particularly, the invention pertains to polyurethane adhesives incorporating aliphatic polycarbonate polyols derived from copolymerization of epoxides and carbon dioxide. Polyurethane adhesives are used for creating adhesive films as well as joining two substrates to one another.

BACKGROUND OF THE INVENTION

Polyurethanes adhesives are a unique urethanes product group that vary widely in composition and are used in many different applications and market segments. Typical product forms include reactive types such as 1-component, 2-component and hot-melt compositions, as well as non-reactive types such as solvent-borne, water-borne and hot-melt compositions, among others.

Polyurethane adhesives are normally defined as those adhesives that contain a number of urethane groups in the molecular backbone of a polymer comprising the adhesive or which are formed during use, regardless of the chemical composition of the rest of the chain. Thus a typical urethane adhesive may contain, in addition to urethane linkages, aliphatic and aromatic hydrocarbons, esters, ethers, amides, urea and allophonate groups. An isocyanate group reacts with the hydroxyl groups of a polyol to form the repeating urethane linkage. Isocyanates will react with water to form a urea linkage and carbon dioxide as a by-product. Linear polyurethane adhesives may be obtained by using compounds with two reactive groups such as diisocyanates and diols. When polyols with three or more hydroxyl groups (i.e. a functionality of 3 or more) are reacted with an polyisocyanate, or when isocyanates with three or more isocyanate groups are reacted with a polyol the resulting polymer is crosslinked. In reaction systems where there is an excess of isocyanate, crosslinking reactions may occur. Often, excess isocyante in the composition reacts with atmospheric water or moisture contained in the substrate.

One component adhesives are usually viscous liquid isocyanate-terminated pre-polymers at room temperature. They set by reaction of the free isocyantes groups with atmospheric moisture or with moisture contained in the substrate to form polyurea groups. They typically do not require mixing with other components before curing. The prepolymers are prepared by reacting an excess of isocyanate with polyols. If the functionality of the prepolymer is greater than two the cured film will be chemically crosslinked.

Two component polyurethane adhesive compositions generally comprise components that are liquids or pastes at room temperature before they are mixed together. The first component of the composition comprises a polyol and other ingredients, such as chain extenders, catalysts, blocking agents and other additives as desired. The second component comprises monomeric, polymeric or prepolymeric polyisocyanate. In order to make a bond, the two components of the adhesive are fully mixed together and the composition is then applied to a substrate. The mixed composition then initiates cure and develops bonding strength while transforming into a solid form. The curing reaction takes place between the free isocyanate groups and the active hydrogens from the polyol. If there are excess free isocyanate groups after the main curing reaction, the excess free isocyanate groups are cured by ambient or surface moisture from the substrates. The isocyanates and polyols employed may have a functionality of two or higher to provide crosslinking in the adhesive.

Reactive hot melt adhesives are characterized as a readily meltable polyisocyanate polyurethane (NCO prepolymer) which is usually solid or highly viscous at room temperature. They set both physically by cooling and chemically by reaction with atmospheric moisture. Depending on the formulation, reactive polyurethane hot-melt adhesives cure to form elastomers with flexible to hard properties and tough adhesive layers. The prepolymers typically have a low free isocyanate content.

Non reactive solvent borne and water borne adhesives typically consist of a hydroxyl terminated polyurethane dissolved in a solvent. The polyurethanes are usually obtained by reacting a diol with a diisocyante. The polymer solutions are applied to both substrate surfaces to be bonded, some time is allowed for the solvents to evaporate and the surfaces are bonded together, at which point interdiffusions of the polymer chains will occur.

Non-reactive hot melt adhesives typically consist of linear chains that are solid at room temperature and are often used in the lamination of textiles although they have many other applications. They usually consist of hydroxyl-terminated polyurethanes that form the adhesive bond by cooling from the molten state. In some cases these are also known as thermoplastic polyurethane adhesives.

Polycarbonate polyols are available commercially in the polyurethane field. However, the commercial materials differ in structure from those used in the invention described below. Commercial polycarbonate polyols are all derived from diols (such as 1,4 butane diol, 1,6-hexane diol and the like) reacted with phosgene (or a reactive equivalent) to produce carbonate linkages between the diol units. No commercial polycarbonate polyols have only 2 carbon atoms between the carbonate linkages since synthesis of such materials is not possible with phosgene chemistry since the reaction results in formation of cyclic carbonate rather than polymer. The processes to make these polyols are also not particularly green. Phosgene is toxic, the diols are generally expensive and energy intensive to make and even non-phosgene-based process are energy intensive and expensive to operate.

Existing polycarbonate polyols, though expensive, are recognized to have excellent strength and resistance to hydrolysis and UV radiation and are therefore used where high performance is required. Nonetheless, there remains a need for inexpensive, green alternatives to these materials.

SUMMARY OF THE INVENTION

In one aspect, the present invention encompasses polyurethane adhesives comprising polyisocyanates and aliphatic polycarbonate polyols derived from the copolymerization of $CO_2$ with one or more epoxides. In one aspect, the aliphatic polycarbonate polyol chains contain a primary repeating unit having a structure:

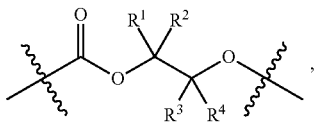

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

As noted above, such polycarbonate polyols are different from existing commercial polycarbonate polyols which all have more than two carbon atoms enchained between adjacent carbonate linkages. The polyols of the present invention therefore have a higher density of carbonate functional groups per unit chain length. In certain embodiments, the incorporation of such polyols leads to unique and unexpected properties in the resulting adhesives. In certain aspects the inventive adhesives have unexpectedly superior properties to those based on existing commercially available polycarbonate polyols.

In certain embodiments, such aliphatic polycarbonate chains are derived from the copolymerization of carbon dioxide with one or more epoxide substrates. Such copolymerizations are exemplified in published PCT application WO 2010/028362, the entirety of which is incorporated herein by reference. In some embodiments, the aliphatic polycarbonate chains are derived from ethylene oxide, propylene oxide, or optionally substituted $C_{3-30}$ aliphatic epoxides, or mixtures of two or more of these. In some embodiments, the aliphatic polycarbonate chains have a number average molecular weight (Mn) less than about 20,000 g/mol. In certain embodiments, the aliphatic polycarbonate polyols have a functional number of between about 1.8 and about 6.

In another aspect, the present invention encompasses isocyanate-terminated prepolymers comprising a plurality of epoxide-$CO_2$-derived polyol segments linked via urethane bonds formed from reaction with polyisocyanate compounds.

In another embodiment, the invention comprises a process for bonding two substrates together by contacting the adhesive composition of the invention with at least one of the substrates and contacting the substrates together along a portion to which the adhesive was applied, and allowing the adhesive to cure thereby bonding the substrates together.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used herein

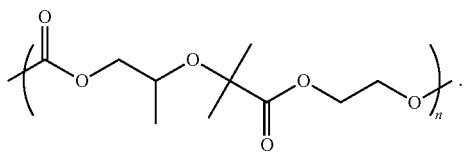

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated or partially unsaturated groups.

As used herein, the term "bivalent $C_{1-8}$ (or $C_{1-3}$) saturated or unsaturated, straight or branched, hydrocarbon chain", refers to bivalent alkyl, alkenyl, and alkynyl, chains that are straight or branched as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 7-membered carbocycle" refers to a 3-to 7-membered saturated or partially unsaturated monocyclic carbocyclic ring. In certain embodiments, the term "3- to 8-membered carbocycle" refers to a 3- to 8-membered saturated or partially unsaturated monocyclic carbocyclic ring. In certain embodiments, the terms "3-to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8-to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^\circ$; —$(CH_2)_{0-4}OR^\circ$; —O—$(CH_2)_{0-4}C(O)OR^\circ$; —$(CH_2)_{0-4}CH(OR^\circ)_2$; —$(CH_2)_{0-4}SR^\circ$; —$(CH_2)_{0-4}Ph$, which may be substituted with $R^\circ$; —$(CH_2)_{0-4}O(CH_2)_{0-1}Ph$ which may be substituted with $R^\circ$; —CH=CHPh, which may be substituted with $R^\circ$; —$NO_2$; —CN; —$N_3$; —$(CH_2)_{0-4}N(R^\circ)_2$; —$(CH_2)_{0-4}N(R^\circ)C(O)R^\circ$; —$N(R^\circ)C(S)R^\circ$; —$(CH_2)_{0-4}N(R^\circ)C(O)NR^\circ_2$; —$N(R^\circ)C(S)NR^\circ_2$; —$(CH_2)_{0-4}N(R^\circ)C(O)OR^\circ$; —$N(R^\circ)N(R^\circ)C(O)R^\circ$; —$N(R^\circ)N(R^\circ)C(O)NR^\circ_2$; —$N(R^\circ)N(R^\circ)C(O)OR^\circ$; —$(CH_2)_{0-4}C(O)R^\circ$; —$C(S)R^\circ$; —$(CH_2)_{0-4}C(O)OR^\circ$; —$(CH_2)_{0-4}C(O)N(R^\circ)_2$; —$(CH_2)_{0-4}C(O)SR^\circ$; —$(CH_2)_{0-4}C(O)OSiR^\circ_3$; —$(CH_2)_{0-4}OC(O)R^\circ$; —$OC(O)(CH_2)_{0-4}SR$—, $SC(S)SR^\circ$; —$(CH_2)_{0-4}SC(O)R^\circ$; —$(CH_2)_{0-4}C(O)NR^\circ_2$; —$C(S)NR^\circ_2$; —$C(S)SR^\circ$; —$SC(S)SR^\circ$, —$(CH_2)_{0-4}OC(O)NR^\circ_2$; —$C(O)N(OR^\circ)R^\circ$; —$C(O)C(O)R^\circ$; —$C(O)CH_2C(O)R^\circ$; —$C(NOR^\circ)R^\circ$; —$(CH_2)_{0-4}SSR^\circ$; —$(CH_2)_{0-4}S(O)_2R^\circ$; —$(CH_2)_{0-4}S(O)_2OR^\circ$; —$(CH_2)_{0-4}OS(O)_2R^\circ$; —$S(O)_2NR^\circ_2$; —$(CH_2)_{0-4}S(O)R^\circ$; —$N(R^\circ)S(O)_2NR^\circ_2$; —$N(R^\circ)S(O)_2R^\circ$; —$N(OR^\circ)R^\circ$; —$C(NH)NR^\circ_2$; —$P(O)_2R^\circ$; —$P(O)R^\circ_2$; —$OP(O)R^\circ_2$; —$OP(O)(OR^\circ)_2$; $SiR^\circ_3$; —$(C_{1-4}$ straight or branched)alkylene)O—$N(R^\circ)_2$; or —$(C_{1-4}$ straight or branched)alkylene)C(O)O—$N(R^\circ)_2$, wherein each $R^\circ$ may be substituted as defined below and is independently hydrogen, $C_{1-8}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of $R^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R^\circ$ (or the ring formed by taking two independent occurrences of $R^\circ$ together with their intervening atoms), are independently halogen, —$(CH_2)_{0-2}R^\bullet$, -(halo$R^\bullet$), —$(CH_2)_{0-2}OH$, —$(CH_2)_{0-2}OR^\bullet$, —$(CH_2)_{0-2}CH(OR^\bullet)_2$; —O(halo$R^\bullet$), —CN, —$N_3$, —$(CH_2)_{0-2}C(O)R^\bullet$, —$(CH_2)_{0-2}C(O)OH$, —$(CH_2)_{0-2}C(O)OR^\bullet$, —$(CH_2)_{0-4}C(O)N(R^\circ)_2$; —$(CH_2)_{0-2}SR^\bullet$, —$(CH_2)_{0-2}SH$, —$(CH_2)_{0-2}NH_2$, —$(CH_2)_{0-2}NHR^\bullet$, —$(CH_2)_{0-2}NR^\bullet_2$, —$NO_2$, —$SiR^\bullet_3$, —$OSiR^\bullet_3$, —$C(O)SR^\bullet$, —$(C_{1-4}$ straight or branched alkylene)C(O)O$R^\bullet$, or —$SSR^\bullet$ wherein each $R^\bullet$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^\circ$ include =O and =S.

Suitable divalent substituents on a saturated carbon atom of an "optionally substituted" group include the following: =O, =S, =$NNR^*_2$, =$NNHC(O)R^*$, =$NNHC(O)OR^*$, =$NNHS(O)_2R^*$, =$NR^*$, =$NOR^*$, —$O(C(R^*_2))_{2-3}O$—, or —$S(C(R^*_2))_{2-3}S$—, wherein each independent occurrence of $R^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —$O(CR^*_2)_{2-3}O$—, wherein each independent occurrence of $R^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of $R^*$ include halogen, —$R^\bullet$, -(halo$R^\bullet$), —OH, —$OR^\bullet$, —O(halo$R^\bullet$), —CN, —C(O)OH, —C(O)$OR^\bullet$, —$NH_2$, —$NHR^\bullet$, —$NR^\bullet_2$, or —$NO_2$, wherein each $R^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —$R^\dagger$, —$NR^\dagger_2$, —$C(O)R^\dagger$, —$C(O)OR^\dagger$, —$C(O)C(O)R^\dagger$, —$C(O)CH_2C(O)R^\dagger$, —$S(O)_2R^\dagger$, —$S(O)_2NR^\dagger_2$, —$C(S)NR^\dagger_2$, —$C(NH)NR^\dagger_2$, or —$N(R^\dagger)S(O)_2R^\dagger$; wherein each $R^\dagger$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of $R^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^\dagger$ are independently halogen, —$R^\bullet$, -(halo$R^\bullet$), —OH, —$OR^\bullet$, —O(halo$R^\bullet$), —CN, —C(O)OH, —C(O)$OR^\bullet$, —$NH_2$, —$NHR^\bullet$, —$NR^\bullet_2$, or —$NO_2$, wherein each $R^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical"

in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

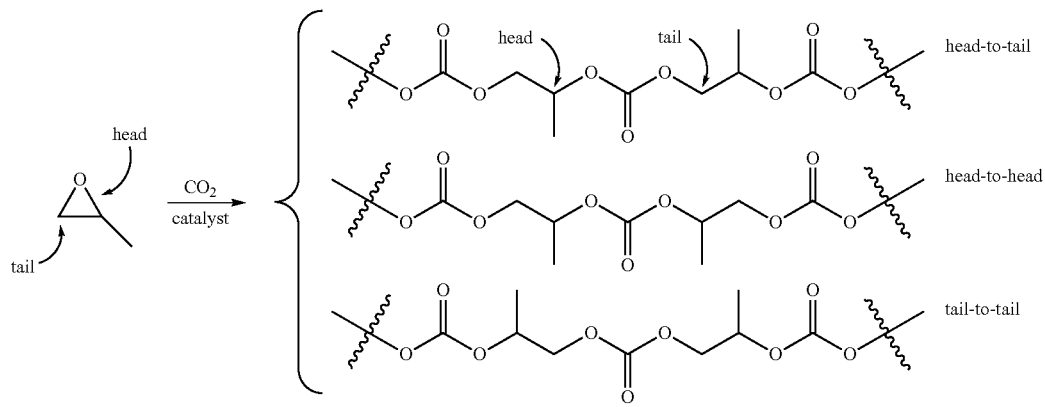

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

As used herein, the term "isocyanate index" means the excess of isocyanate over the theoretical amount for (1:1) reaction with all active protons in a polyurethane composition, expressed in percentage terms (i.e. 1:1=100). Thus, isocyanate index=100× (Actual amount of isocyanate used)/(Theoretical amount of isocyanate required)

DETAILED DESCRIPTION OF CERTAIN EMBODIMENTS

Figure 1:
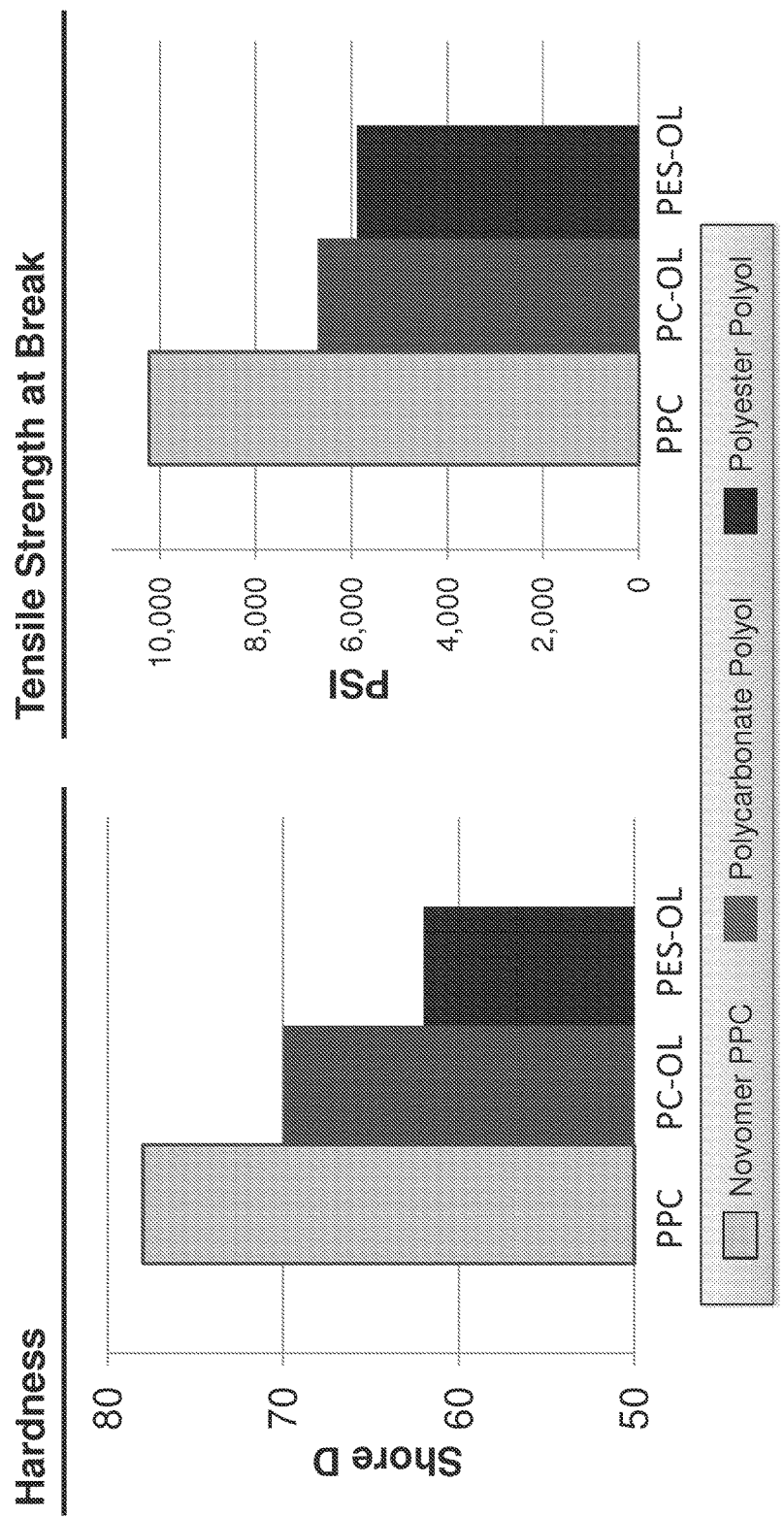
FIG. 1 shows the hardness and tensile strength of an adhesive composition of the present invention in comparison to adhesive formulations based on commercial polyester or polycarbonate polyols.
Figure 2:
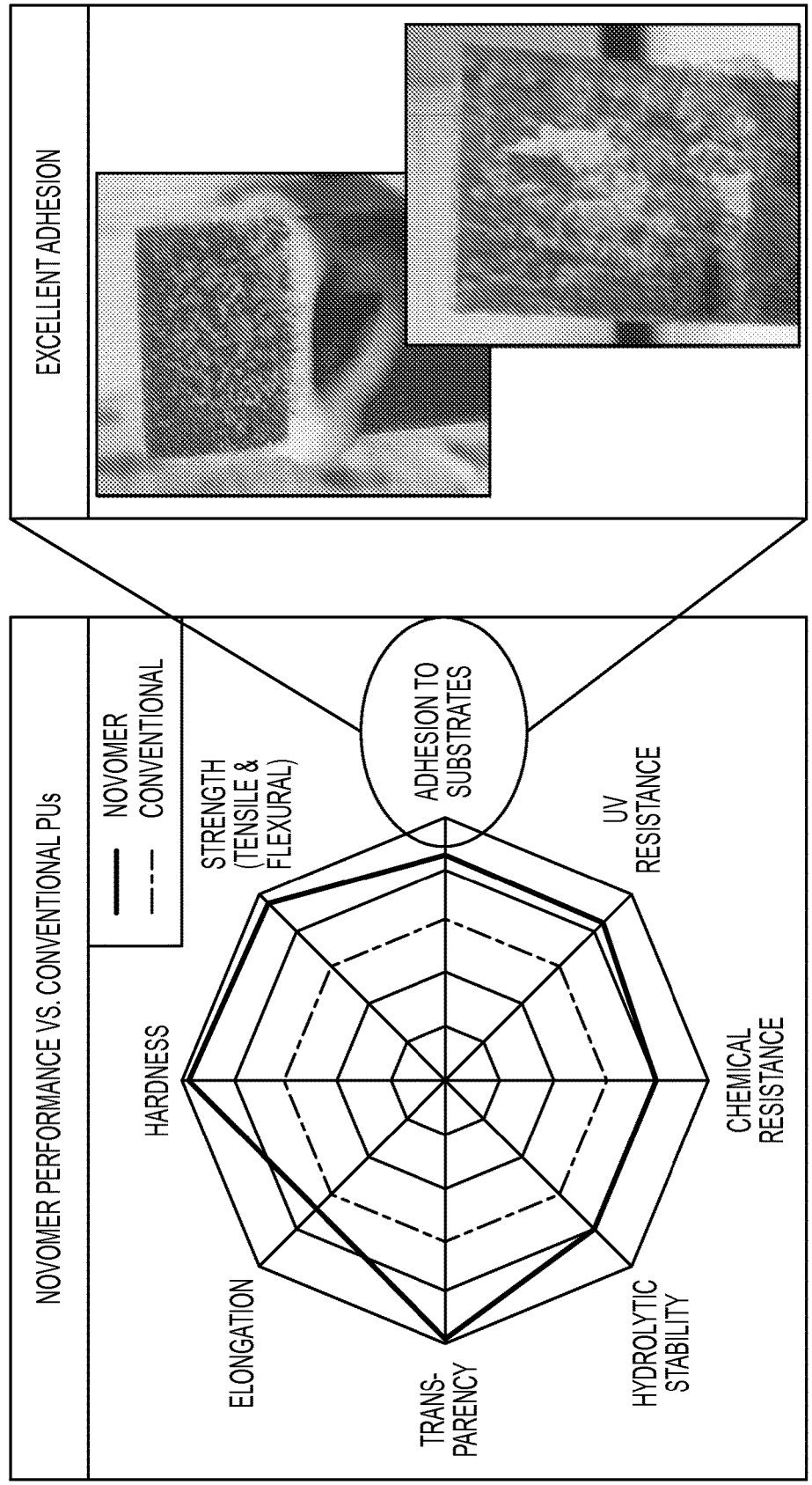
FIG. 2 shows a spider graph showing several properties of an adhesive composition of the present invention in comparison to adhesive formulations based on commercial polycarbonate polyols.
Figure 3:
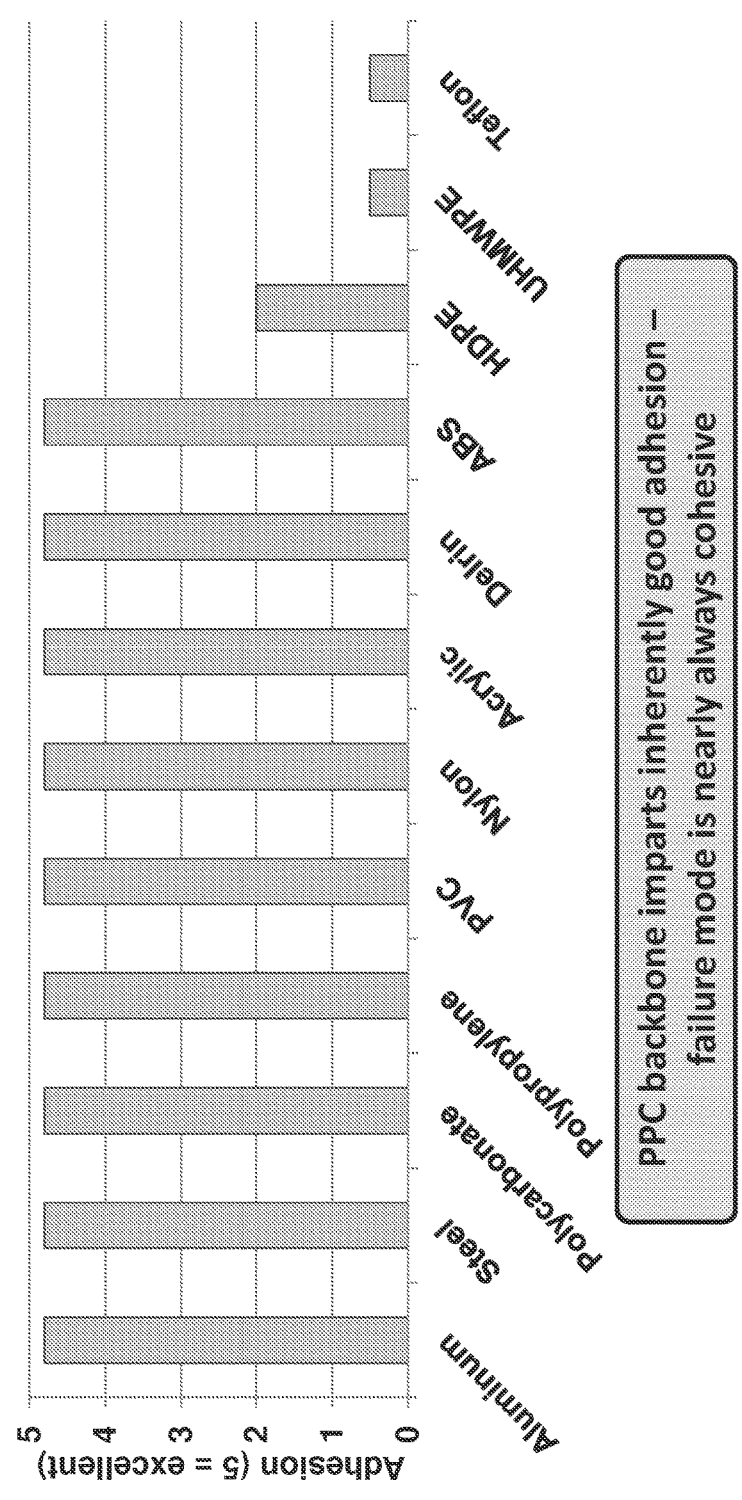
FIG. 3 shows the adhesion to a range of substrates of an adhesive composition of the present invention.
Figure 4:
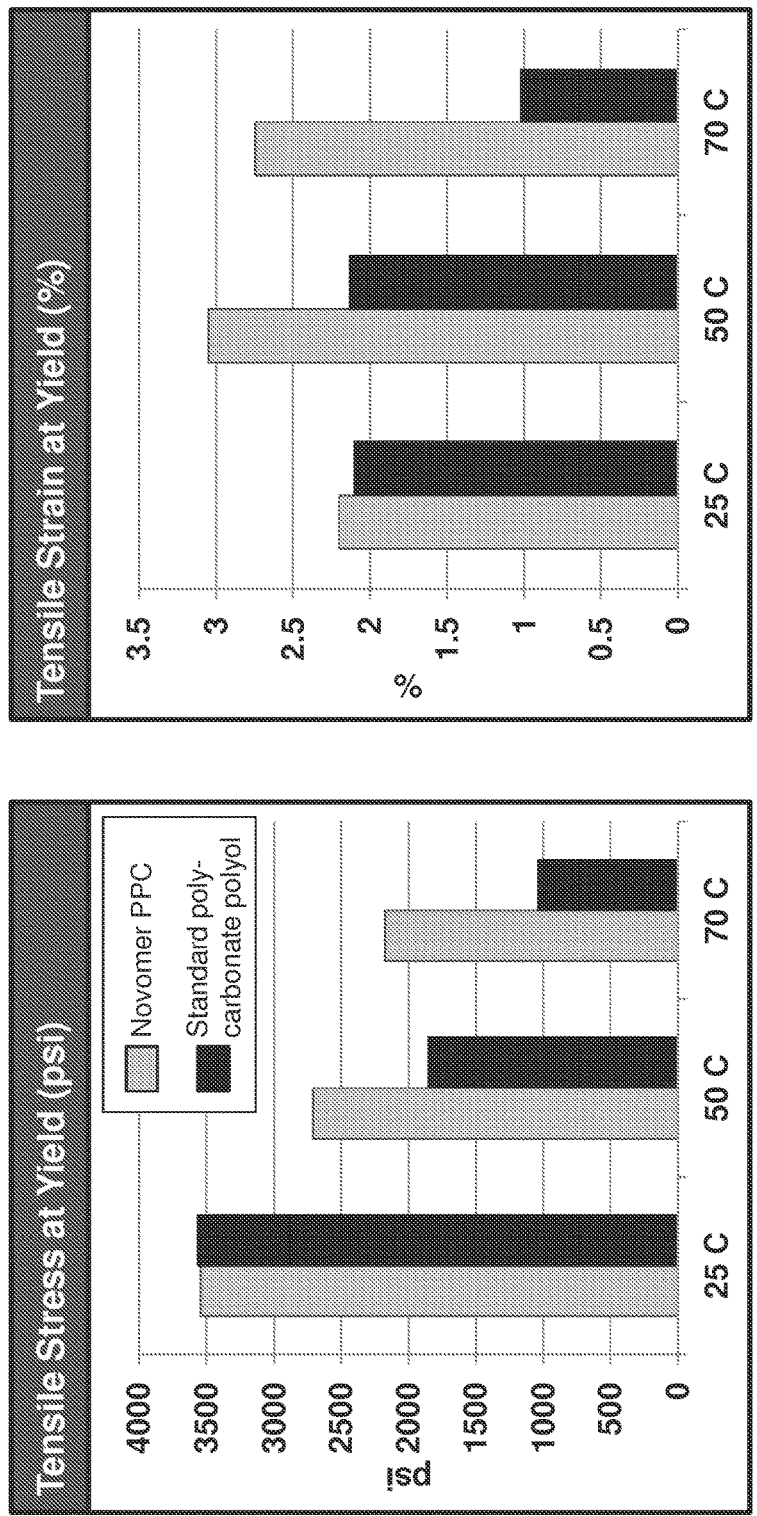
FIG. 4 shows the strength retention at elevated temperatures of an adhesive composition of the present invention in comparison to adhesive formulations based on commercial polyester or polycarbonate polyols.

In one aspect, the present invention encompasses polymer compositions comprising aliphatic polycarbonate chains cross-linked or chain extended through urethane linkages. In certain embodiments, these polymer compositions comprise polyurethane adhesives.

The field of polyurethane adhesive manufacture and formulation is well advanced. In some embodiments, the novel materials presented herein are formulated, processed, and/or used according to methods well known in the art. Combining knowledge of the art, with the disclosure and teachings herein, the skilled artisan will readily apprehend variations, modifications and applications of the inventive compositions and methods and such variations are specifically encompassed herein. The following references contain information on the formulation, manufacture and uses of polyurethane adhesives generally, the entire content of each of these references is incorporated herein by reference.

*Polyurethanes: Coatings Adhesives and Sealants*, Ulrich Maeier-Westhues, 2007 (ISBN 3-87870-334-1)

*The Polyurethanes Book*, J. Wiley & Sons, 2003 (ISBN 978-0470850411)

*Szycher's Handbook of Polyurethanes*, CRC Press LLC, 1999 (ISBN 0-8493-0602-7)

*Polyurethane Elastomers From Morphology to Mechanical Aspects*, Springer-Verlag/Wein, 2011 (ISBN 978-3-7091-0513-9)

*Szycher's Handbook of Polyurethanes*, CRC Press LLC, 1999 (ISBN 0-8493-0602-7)

*Polyurethane Handbook*, Hanser, 1994 (ISBN 1569901570)

In certain embodiments, the polyurethane compositions of the present invention are derived by combining two compositions: a first composition comprising one or more isocyanate compounds optionally containing diluents, solvents, coreactants and the like, and a second composition comprising one or more aliphatic polycarbonate polyols optionally with additional reactants, solvents, catalysts, or additives. These compositions may be formulated separately and then combined or all components of the finished polyurethane composition may be combined in a single step. Before fully describing these compositions, the polyols and isocyanates from which they are formulated will be more fully described.

I. Aliphatic Polycarbonate Polyols

This section describes some of the aliphatic polycarbonate polyols that have utility in making compositions of the present invention. In certain embodiments, compositions of the present invention comprise aliphatic polycarbonate polyols derived from the copolymerization of one or more epoxides and carbon dioxide. Examples of suitable polyols, as well as methods of making them are disclosed in PCT publication WO2010/028362 the entirety of which is incorporated herein by reference.

It is advantageous for many of the embodiments described herein that the aliphatic polycarbonate polyols used have a high percentage of reactive end groups. Such reactive endgroups are typically hydroxyl groups, but other reactive functional groups may be present if the polyols are treated to modify the chemistry of the end groups, such modified materials may terminate in amino groups, thiol groups, alkene groups, carboxylate groups, isocyanate groups, silyl groups, epoxy groups and the like. For purposes of this invention, the term 'aliphatic polycarbonate polyol' includes both traditional hydroxy-terminated materials as well as these end-group modified compositions.

In certain embodiments, at least 90% of the end groups of the polycarbonate polyol used are reactive end groups. In certain embodiments, at least 95%, at least 96%, at least 97% or at least 98% of the end groups of the polycarbonate polyol used are reactive end groups. In certain embodiments, more than 99%, more than 99.5%, more than 99.7%, or more than 99.8% of the end groups of the polycarbonate polyol used are reactive end groups. In certain embodiments, more than 99.9% of the end groups of the polycarbonate polyol used are reactive end groups.

In certain embodiments, at least 90% of the end groups of the polycarbonate polyol used are —OH groups. In certain embodiments, at least 95%, at least 96%, at least 97% or at least 98% of the end groups of the polycarbonate polyol used are —OH groups. In certain embodiments, more than 99%, more than 99.5%, more than 99.7%, or more than 99.8% of the end groups of the polycarbonate polyol used are —OH groups. In certain embodiments, more than 99.9% of the end groups of the polycarbonate polyol used are —OH groups.

Another way of expressing the —OH end-group content of a polyol composition is by reporting its OH# which is measured using methods well known in the art. In certain embodiments, the aliphatic polycarbonate polyols used in the present invention have an OH# greater than about 20. In certain embodiments, the aliphatic polycarbonate polyols utilized in the present invention have an OH# greater than about 40. In certain embodiments, the aliphatic polycarbonate polyols have an OH# greater than about 50, greater than about 75, greater than about 100, or greater than about 120.

In certain embodiments, it is advantageous if the aliphatic polycarbonate polyol compositions have a substantial proportion of primary hydroxyl end groups. These are the norm for compositions comprising poly(ethylene carbonate), but for polyols derived from copolymerization of substituted epoxides with $CO_2$, it is common for some or most of the chain ends to consist of secondary hydroxyl groups. In certain embodiments, such polyols are treated to increase the proportion of primary —OH end groups. This may be accomplished by reacting the secondary hydroxyl groups with reagents such as ethylene oxide, reactive lactones, and the like. In certain embodiments, the aliphatic polycarbonate polyols are treated with beta lactones, caprolactone and the like to introduce primary hydroxyl end groups. In certain embodiments, the aliphatic polycarbonate polyols are treated with ethylene oxide to introduce primary hydroxyl end groups.

In certain embodiments, aliphatic polycarbonate chains comprise a copolymer of carbon dioxide and one or more epoxides. In certain embodiments, aliphatic polycarbonate chains comprise a copolymer of carbon dioxide and ethylene oxide. In certain embodiments, aliphatic polycarbonate chains comprise a copolymer of carbon dioxide and propylene oxide. In certain embodiments, aliphatic polycarbonate chains comprise a copolymer of carbon dioxide and 1,2-butene oxide and/or 1,2-hexene oxide. In certain embodiments, aliphatic polycarbonate chains comprise a copolymer of carbon dioxide and cyclohexene oxide. In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexene oxide. In certain embodiments, aliphatic polycarbonate chains comprise a copolymer of carbon dioxide and 3-ethyl cyclohexene oxide.

In certain embodiments, aliphatic polycarbonate chains comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, 3-ethyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In embodiments, the aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, in the polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 500 g/mol and about 10,000 g/mol. In certain embodiments, aliphatic polycarbonate chains have an $M_n$ between about 500 g/mol and about 5,000 g/mol. In certain embodiments, aliphatic polycarbonate chains have an $M_n$ between about 1,000 g/mol and about 5,000 g/mol. In certain embodiments, aliphatic polycarbonate chains have an $M_n$ between about 5,000 g/mol and about 10,000 g/mol. In certain embodiments, aliphatic polycarbonate chains have an $M_n$ between about 500 g/mol and about 1,000 g/mol. In certain embodiments, aliphatic polycarbonate chains have an $M_n$ between about 1,000 g/mol and about 3,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol. In certain embodiments, aliphatic polycarbonate chains have an $M_n$ of about 1,500 g/mol. In certain embodiments, aliphatic polycarbonate chains have an $M_n$ of about 1,000 g/mol. In certain embodiments, aliphatic polycarbonate chains have an $M_n$ of about 750 g/mol. In certain embodiments, aliphatic polycarbonate chains have an $M_n$ of about 500 g/mol.

In certain embodiments, the aliphatic polycarbonate polyols used are characterized in that they have a narrow molecular weight distribution. This can be indicated by the polydispersity indices (PDI) of the aliphatic polycarbonate polymers. In certain embodiments, aliphatic polycarbonate compositions have a PDI less than 3. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments, the aliphatic polycarbonate polyols used do not have a narrow PDI. This can be the case if, for example, a polydisperse chain transfer agent is used to initiate an epoxide $CO_2$ copolymerization, or if a plurality of aliphatic polycarbonate polyol compositions with different molecular weights are blended. In certain embodiments, aliphatic polycarbonate compositions have a PDI greater than 3. In certain embodiments, aliphatic polycarbonate compositions have a PDI greater than 2. In certain embodiments, aliphatic polycarbonate compositions have a PDI greater than 1.8. In certain embodiments, aliphatic polycarbonate compositions have a PDI greater than 1.5. In certain embodiments, aliphatic polycarbonate compositions have a PDI greater than 1.4.

In certain embodiments, aliphatic polycarbonate compositions of the present invention comprise substantially alternating polymers containing a high percentage of carbonate linkages and a low content of ether linkages. In certain embodiments, aliphatic polycarbonate compositions of the present invention are characterized in that, on average in the composition, the percentage of carbonate linkages is 85% or greater. In certain embodiments, aliphatic polycarbonate compositions of the present invention are characterized in that, on average in the composition, the percentage of carbonate linkages is 90% or greater. In certain embodiments, aliphatic polycarbonate compositions of the present invention are characterized in that, on average in the composition, the percentage of carbonate linkages is 91% or greater. In certain embodiments, aliphatic polycarbonate compositions of the present invention are characterized in that, on average in the composition, the percentage of carbonate linkages is 92% or greater. In certain embodiments, aliphatic polycarbonate compositions of the present invention are characterized in that, on average in the composition, the percentage of carbonate linkages is 93% or greater. In certain embodiments, aliphatic polycarbonate compositions of the present invention are characterized in that, on average in the composition, the percentage of carbonate linkages is 94% or greater. In certain embodiments, aliphatic polycarbonate compositions of the present invention are characterized in that, on average in the composition, the percentage of carbonate linkages is 95% or greater. In certain embodiments, aliphatic polycarbonate compositions of the present invention are characterized in that, on average in the composition, the percentage of carbonate linkages is 96% or greater. In certain embodiments, aliphatic polycarbonate compositions of the present invention are characterized in that, on average in the composition, the percentage of carbonate linkages is 97% or greater. In certain embodiments, aliphatic polycarbonate compositions of the present invention are characterized in that, on average in the composition, the percentage of carbonate linkages is 98% or greater. In certain embodiments, aliphatic polycarbonate compositions of the present invention are characterized in that, on average in the composition, the percentage of carbonate linkages is 99% or greater. In certain embodiments, aliphatic polycarbonate compositions of the present invention are characterized in that, on average in the composition, the percentage of carbonate linkages is 99.5% or greater. In certain embodiments, the percentages above exclude ether linkages present in polymerization initiators or chain transfer agents and refer only to the linkages formed during epoxide $CO_2$ copolymerization.

In certain embodiments, aliphatic polycarbonate compositions of the present invention are characterized in that they contain essentially no ether linkages either within the polymer chains derived from epoxide $CO_2$ copolymerization or within any polymerization initiators, chain transfer agents or end groups that may be present in the polymer. In certain embodiments, aliphatic polycarbonate compositions of the present invention are characterized in that they contain, on average, less than one ether linkage per polymer chain within the composition. In certain embodiments, aliphatic polycarbonate compositions of the present invention are characterized in that they contain essentially no ether linkages.

In certain embodiments where an aliphatic polycarbonate is derived from monosubstituted epoxides (e.g. such as propylene oxide, 1,2-butylene oxide, epichlorohydrin, epoxidized alpha olefins, or a glycidol derivative), the aliphatic polycarbonate is characterized in that it is regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13 NMR spectroscopy.

In certain embodiments, compositions of the present invention comprise aliphatic polycarbonate polyols having a structure P1:

n is at each occurrence, independently an integer from about 2 to about 50;

is a bond or a multivalent moiety; and x and y are each independently an integer from 0 to 6, where the sum of x and y is between 2 and 6.

In certain embodiments, the multivalent moiety

embedded within the aliphatic polycarbonate chain is derived from a polyfunctional chain transfer agent having two or more sites from which epoxide/$CO_2$ copolymerization can occur. In certain embodiments, such copolymerizations are performed in the presence of polyfunctional chain transfer agents as exemplified in published PCT application WO 2010/028362. In certain embodiments, such copolymerizations are performed as exemplified in US 2011/0245424. In certain embodiments, such copolymerizations are performed as exemplified in Green Chem. 2011, 13, 3469-3475.

In certain embodiments, a polyfunctional chain transfer agent has a formula:

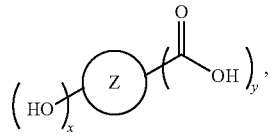

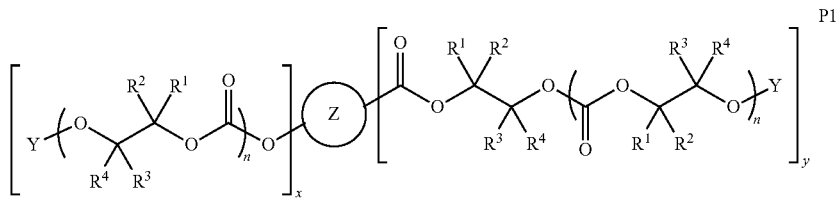

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-40}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H, a reactive group (as defined hereinabove), or a site of attachment to any of the chain-extending moieties or isocyanates described in the classes and subclasses herein;

wherein each of

x, and y is as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in Scheme 2:

Scheme 2

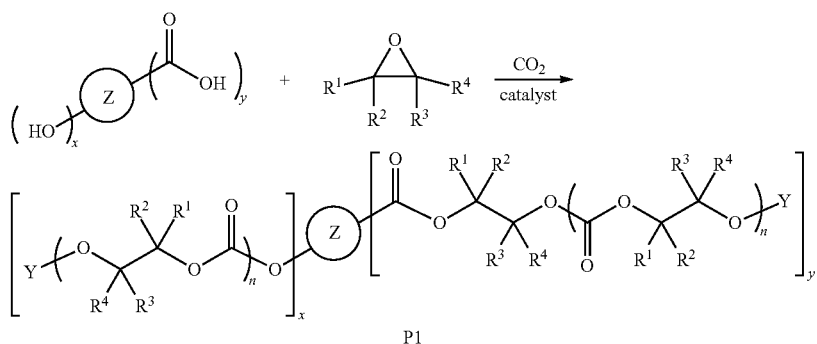

In certain embodiments, aliphatic polycarbonate chains in polymer compositions of the present invention comprise chains with a structure P2:

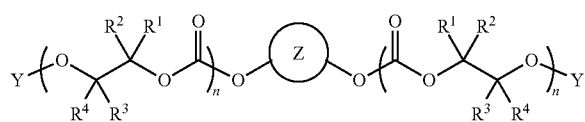

P2 wherein each of $R^1$, $R^2$, $R^3$, $R^4$, Y,

and n is as defined above and described in the classes and subclasses herein.

In certain embodiments where aliphatic polycarbonate chains have a structure P2,

is derived from a dihydric alcohol. In such instances

represents the carbon-containing backbone of the dihydric alcohol, while the two oxygen atoms adjacent to

are derived from the —OH groups of the diol. For example, if the polyfunctional chain transfer agent were ethylene glycol, then

would be —$CH_2CH_2$— and P2 would have the following structure:

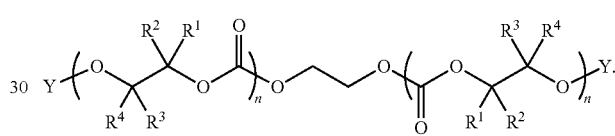

In certain embodiments where

is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments where

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycol) such as those having number average molecular weights of from 234 to about 2000 g/mol.

In certain embodiments where

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments where

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, polyoxymethylene polymers, and alkoxylated analogs of any of these. In certain embodiments, the polymeric diol has an average molecular weight less than about 2000 g/mol.

In certain embodiments,

is derived from a polyhydric alcohol with more than two hydroxy groups. In embodiments in which

is derived from a polyhydric alcohol with more than two hydroxyl groups, these >2 functional polyols are a component of a polyol mixture containing predominantly polyols with two hydroxyl groups. In certain embodiments, these >2 functional polyols are less than 20% of the total polyol mixture by weight. In certain embodiments, these >2 functional polyols are less than 10% of the total polyol mixture. In certain embodiments, these >2 functional polyols are less than 5% of the total polyol mixture. In certain embodiments, these >2 functional polyols are less than 2% of the total polyol mixture. In certain embodiments, the aliphatic polycarbonate chains in polymer compositions of the present invention comprise aliphatic polycarbonate chains where the moiety

is derived from a triol. In certain embodiments, such aliphatic polycarbonate chains have the structure P3:

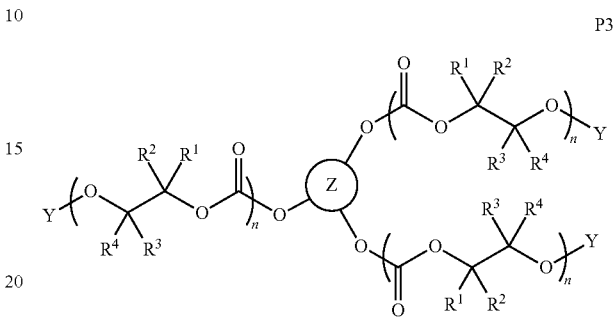

wherein each of $R^1$, $R^2$, $R^3$, $R^4$, Y,

and n is as defined above and described in classes and subclasses herein.

In certain embodiments where

is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,2,4-cyclohexanetrimethanol, pentaerythritol mono esters, pentaerythritol mono ethers, and alkoxylated analogs of any of these. In certain embodiments, such alkoxylated derivatives comprise ethoxylated or propoxylated compounds.

In certain embodiments,

is derived from an alkoxylated derivative of a trifunctional carboxylic acid or trifunctional hydroxy acid. In certain embodiments, alkoxylated derivatives comprise ethoxylated or propoxylated compounds.

In certain embodiments, where

is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these. In certain embodiments, the alkoxylated polymeric triols comprise ethoxylated or propoxylated compounds.

In certain embodiments,

is derived from a polyhydric alcohol with four hydroxy groups. In certain embodiments, aliphatic polycarbonate chains in polymer compositions of the present invention comprise aliphatic polycarbonate chains where the moiety

is derived from a tetraol. In certain embodiments, aliphatic polycarbonate chains in polymer compositions of the present invention comprise chains with the structure P4:

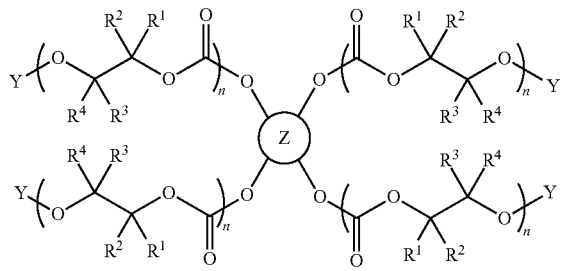

P4 wherein each of $R^1$, $R^2$, $R^3$, $R^4$, Y,

and n is as defined above and described in classes and subclasses herein.

In certain embodiments,

is derived from a polyhydric alcohol with more than four hydroxy groups. In certain embodiments,

is derived from a polyhydric alcohol with six hydroxy groups. In certain embodiments, a polyhydric alcohol is dipentaerythritol or an alkoxylated analog or other derivative thereof. In certain embodiments, a polyhydric alcohol is sorbitol or an alkoxylated analog thereof. In certain embodiments, aliphatic polycarbonate chains in polymer compositions of the present invention comprise chains with the structure P5:

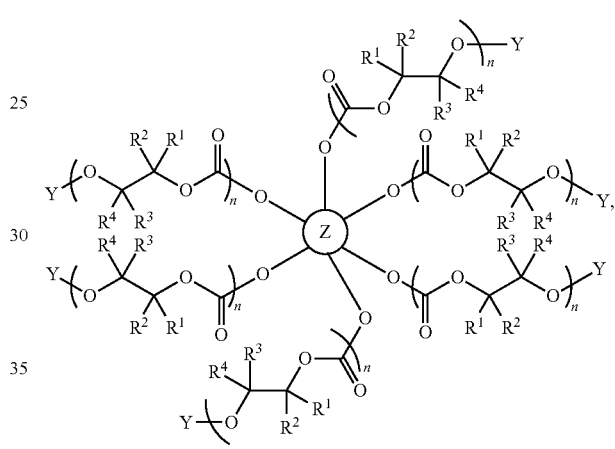

P5 wherein each of $R^1$, $R^2$, $R^3$, $R^4$, Y,

and n is as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

is derived from a hydroxy acid. In certain embodiments, aliphatic polycarbonate chains in polymer compositions of the present invention comprise chains with the structure P6:

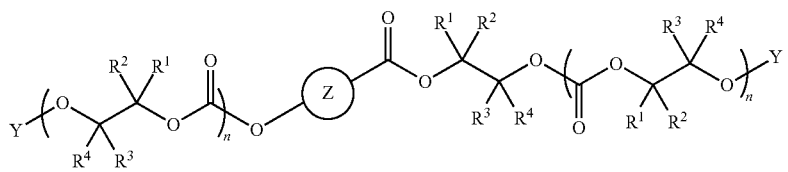

wherein each of $R^1$, $R^2$, $R^3$, $R^4$, Y,

and n is as defined above and described in classes and subclasses herein. In such instances,

represents the carbon-containing backbone of the hydroxy acid, while ester and carbonate linkages adjacent to

are derived from the —$CO_2H$ group and the hydroxy group of the hydroxy acid. For example, if

were derived from 3-hydroxypropanoic acid, then

would be —$CH_2CH_2$— and P6 would have the following structure:

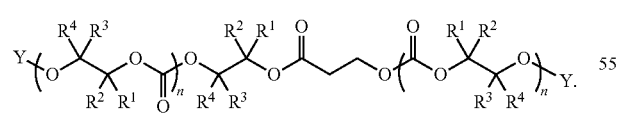

In certain embodiments,

is derived from an optionally substituted $C_{2-40}$ hydroxy acid. In certain embodiments, is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutyric acid, D-3 hydroxybutyric acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted $C_{3-20}$ aliphatic α-ω hydroxy acids and oligomeric esters.

In certain embodiments, a hydroxy acid is selected from the group consisting of:

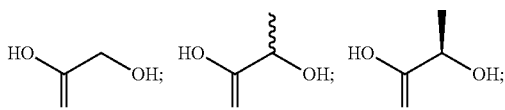

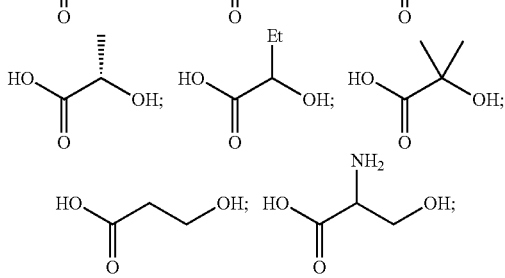

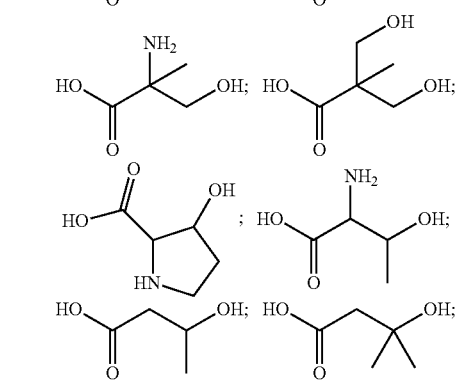

-continued

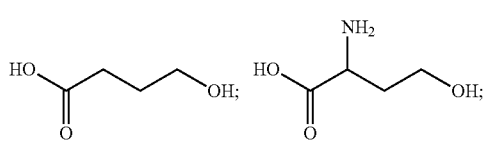

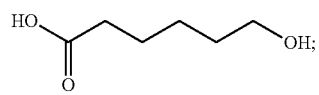

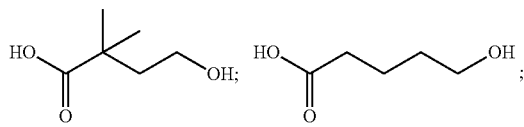

-continued

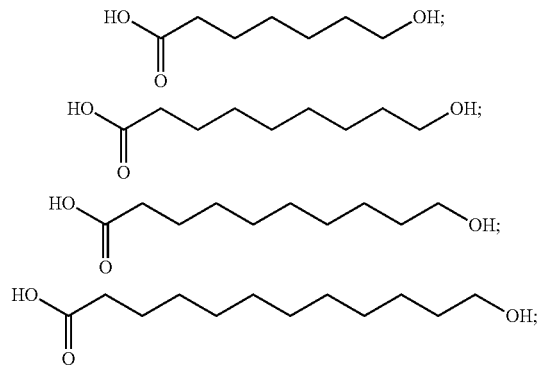

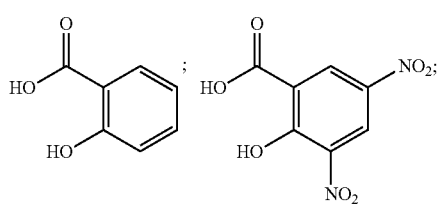

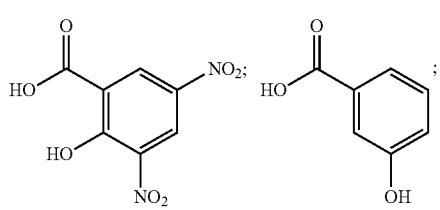

-continued

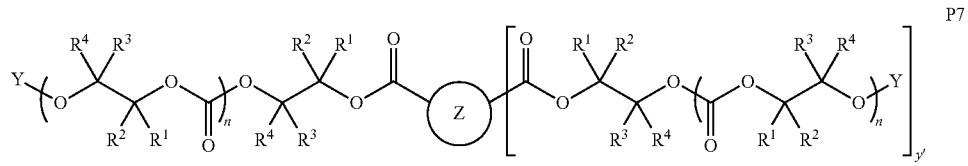

In certain embodiments,  is derived from a polycarboxylic acid. In certain embodiments, aliphatic polycarbonate chains in polymer compositions of the present invention comprise chains with the structure P7:

wherein each of $R^1$, $R^2$, $R^3$, $R^4$, Y,

and n is as defined above and described in classes and subclasses herein, and y' is an integer from 1 to 5 inclusive.

In embodiments where the aliphatic polycarbonate chains have a structure P7,

represents the carbon-containing backbone (or a bond in the case of oxalic acid) of a polycarboxylic acid, while ester groups adjacent to

are derived from —$CO_2H$ groups of the polycarboxylic acid. For example, if

were derived from succinic acid ($HO_2CCH_2CH_2CO_2H$), then would be —CH$_2$CH$_2$— and P7 would have the following structure:

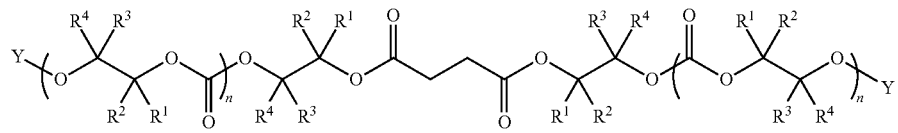

wherein each of R$^1$, R$^2$, R$^3$, R$^4$, Y, and n is as defined above and described in classes and subclasses herein.

In certain embodiments,

is derived from a dicarboxylic acid. In certain embodiments, aliphatic polycarbonate chains in polymer compositions of the present invention comprise chains with the structure P8:

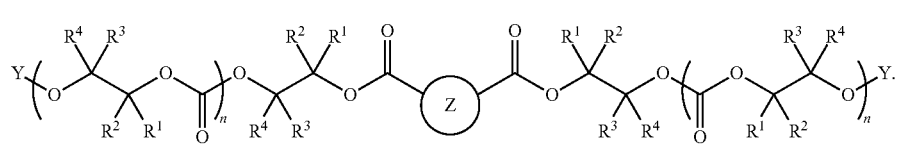

In certain embodiments,

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

is derived from a diacid selected from the group consisting of:

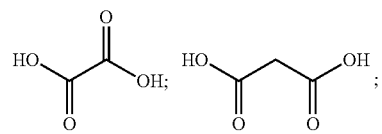

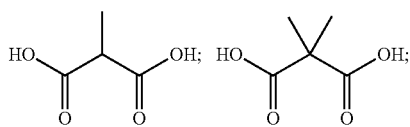

-continued

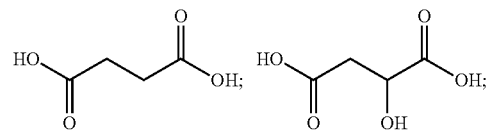

-continued

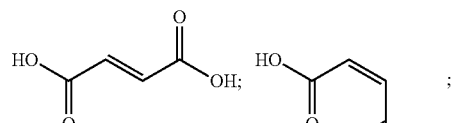

-continued

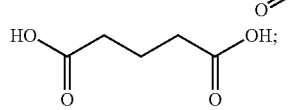

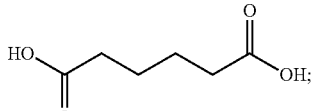

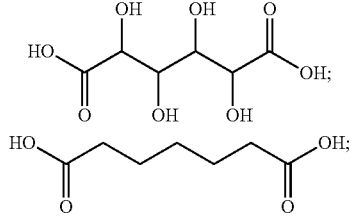

-continued

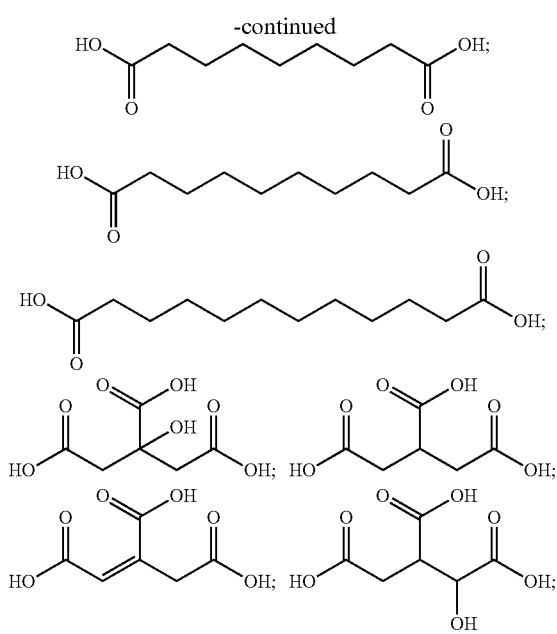

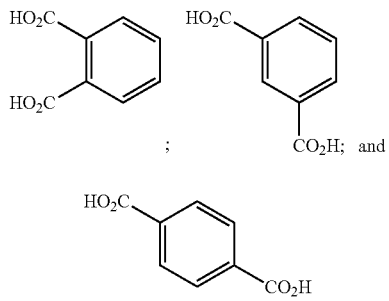

In certain embodiments,

is derived from a phosphorous-containing molecule. In certain embodiments,

has a formula —P(O)(OR)$_k$— where each R is independently an optionally substituted C$_{1-20}$ aliphatic group or an optionally substituted aryl group and k is 0, 1, or 2.

For example, if

were derived from PhO—P(O)(OH)$_2$, then

would be —P(O)(OPh)- and P7 would have the following structure:

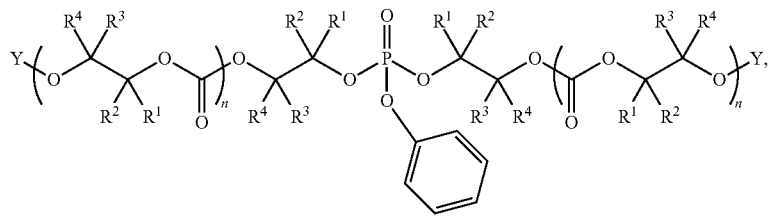

wherein each of R$^1$, R$^2$, R$^3$, R$^4$, Y, and n is as defined above and described in classes and subclasses herein.

In certain embodiments,

is derived from a phosphorous-containing molecule selected from the group consisting of:

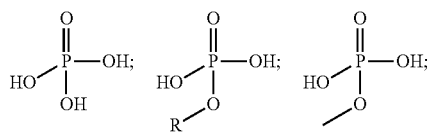

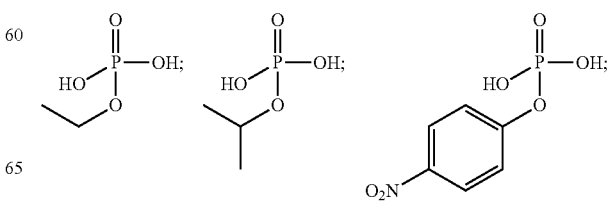

-continued

[Structures: phenyl phosphonic acid HO-P(=O)(OH)-O-phenyl; and 2,4,5-trichlorophenyl phosphate HO-P(=O)(OH)-O-(2,4,5-trichlorophenyl)]

In certain embodiments, $$\boxed{Z}$$

has a formula —P(O)(R)— where R is an optionally substituted $C_{1-20}$ aliphatic group or an optionally substituted aryl group and k is 0, 1, or 2. In certain embodiments, $$\boxed{Z}$$

is derived from a phosphorous-containing molecule selected from the group consisting of:

[Structures of phosphonic/phosphinic acids: HO-P(=O)(OH)-R; HO-P(=O)(OH)-CH₃; HO-P(=O)(OH)-CH₂CH₃; HO-P(=O)(OH)-(CH₂)$_z$, z = 2-30; HO-P(=O)(OH)-(CH₂)$_z$-OH; HO-P(=O)(OH)-(CH₂)$_z$-CO₂H; and HO-P(=O)(OH)-(aryl-R$^d$)]

where each of R and $R^d$ is as defined above and in the classes and subclasses herein.

In certain embodiments, $$\boxed{Z}$$

has a formula —PR— where R is an optionally substituted $C_{1-20}$ aliphatic group or an optionally substituted aryl group.

In certain embodiments, each

[Structure with $R^1$, $R^2$, $R^3$, $R^4$ substituents on a carbon]

in the structures herein is independently selected from the group consisting of:

[Series of substituent structures including various alkyl chains with n = 9-30, chloro-, CF₃-, C₂F₅-, C₃F₇-, C₄F₉-, R$^x$O-, R$^x$OCO-, phenyl, cyclopentyl, cyclohexyl, and substituted cyclohexyl groups]

-continued

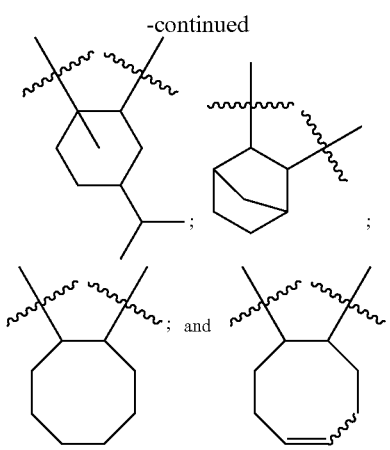

wherein each $R^x$ is independently an optionally substituted moiety selected from the group consisting of $C_{2-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

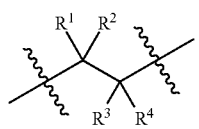

in the structures herein is independently selected from the group consisting of:

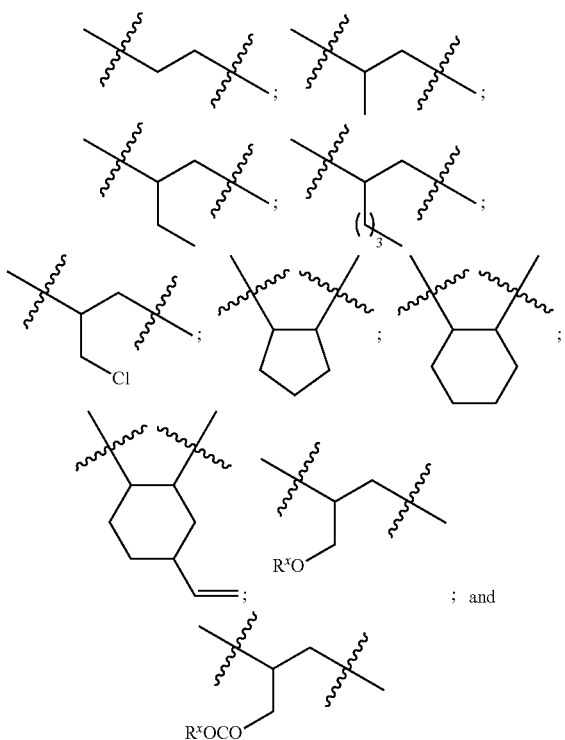

wherein $R^x$ is as defined above and described in classes and subclasses herein.

In certain embodiments, the moiety —Y in the structures herein is —H.

In certain embodiments, —Y comprises an ester linkage to an optionally substituted $C_{2-40}$ linker terminated with an —OH group. In certain embodiments, —Y is selected from the group consisting of:

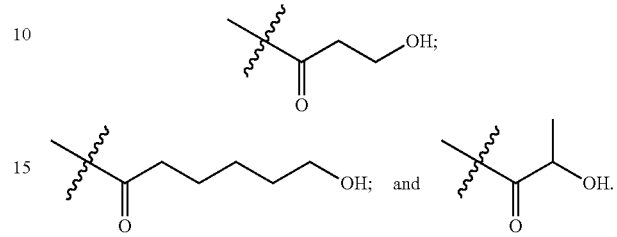

In certain embodiments, —Y comprises an ester linkage to an optionally substituted $C_{2-40}$ linker terminated with an —$CO_2H$ group. In certain embodiments, —Y is selected from the group consisting of:

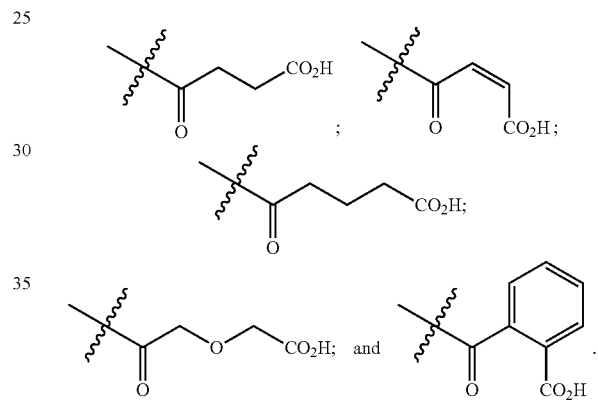

In certain embodiments, the moiety —Y in the structures herein comprises a hydroxy-terminated polymer. In certain embodiments, —Y comprises a hydroxy-terminated polyether. In certain embodiments, —Y comprises

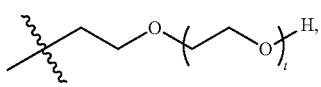

where t is an integer from 1 to 20.

In certain embodiments, —Y comprises a hydroxy-terminated polyester. In certain embodiments, —Y is selected from the group consisting of:

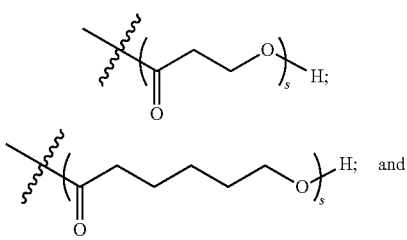

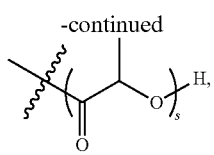

where s is an integer from 2 to 20.

In certain embodiments, aliphatic polycarbonate chains comprise:

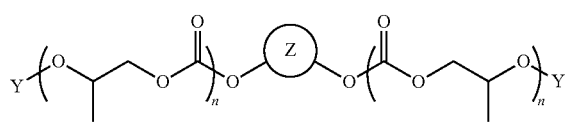

P2a wherein each of

—Y, and n is as defined above and described in classes and subclasses herein.

In certain embodiments, aliphatic polycarbonate chains comprise:

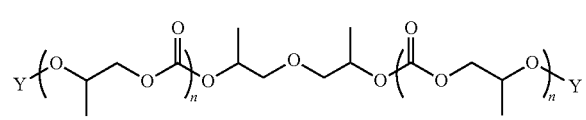

P2b wherein each of —Y and n is as defined above and described in classes and subclasses herein.

In certain embodiments, aliphatic polycarbonate chains comprise:

P2b' wherein each of —Y and n is as defined above and described in classes and subclasses herein.

In certain embodiments, aliphatic polycarbonate chains comprise:

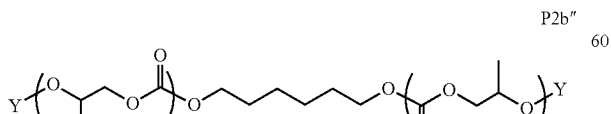

P2b'' wherein each of —Y and n is as defined above and described in classes and subclasses herein.

In certain embodiments, aliphatic polycarbonate chains comprise:

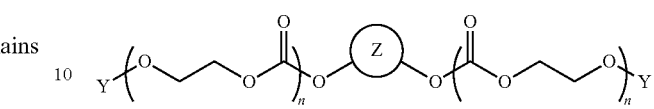

P2c wherein each of

Z

—Y, and n is as defined above and described in classes and subclasses herein.

In certain embodiments, aliphatic polycarbonate chains comprise:

P2d wherein each of —Y and n is as defined above and described in classes and subclasses herein.

In certain embodiments, aliphatic polycarbonate chains comprise:

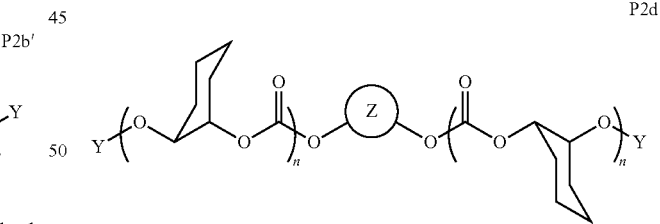

P2d wherein each of

—Y, and n is as defined above and described in classes and subclasses herein.

In certain embodiments, aliphatic polycarbonate chains comprise:

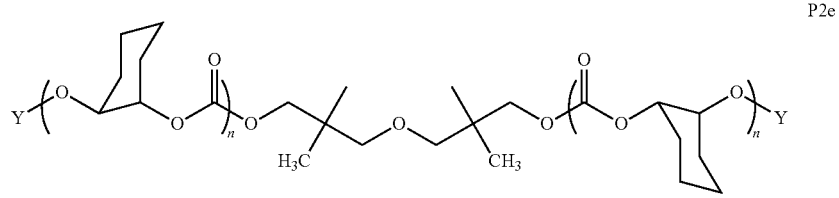

P2e wherein each of —Y and n are is as defined above and described in classes and subclasses herein.

In certain embodiments, aliphatic polycarbonate chains comprise:

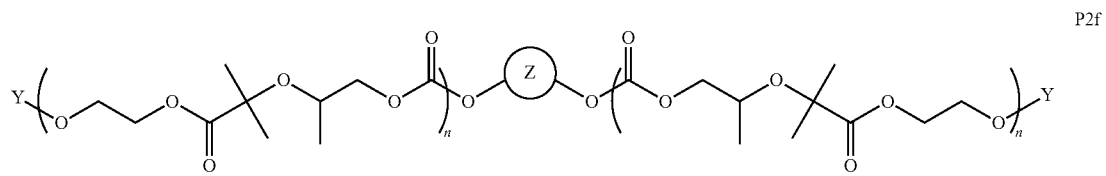

P2f wherein each of , —Y, and n is as defined above and described in classes and subclasses herein.

In certain embodiments, aliphatic polycarbonate chains comprise:

wherein each of , —Y, and n is as defined above and described in classes and subclasses herein.

In certain embodiments, aliphatic polycarbonate chains comprise:

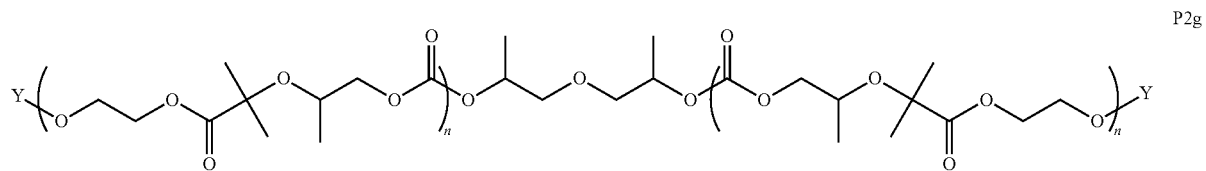

P2g wherein each of —Y and n is as defined above and described in classes and subclasses herein.

In certain embodiments, aliphatic polycarbonate chains comprise:

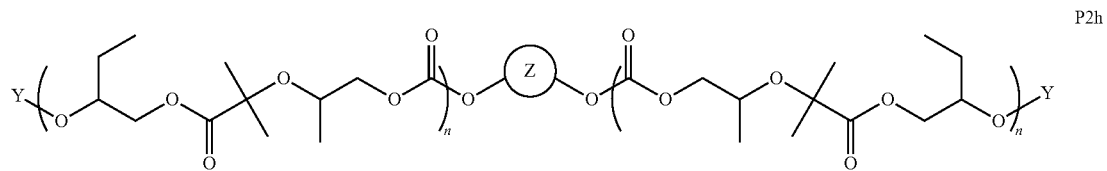

P2h

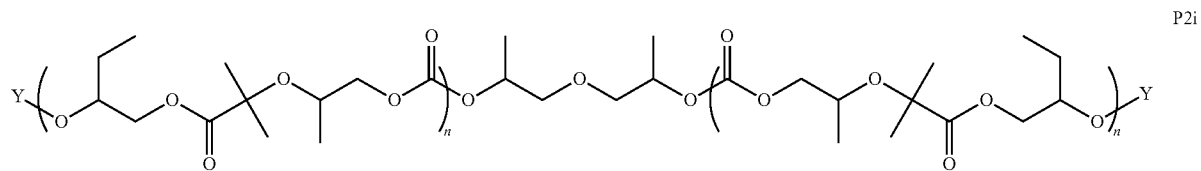

P2i wherein each of —Y and n is as defined above and described in classes and subclasses herein.

In certain embodiments, aliphatic polycarbonate chains comprise:

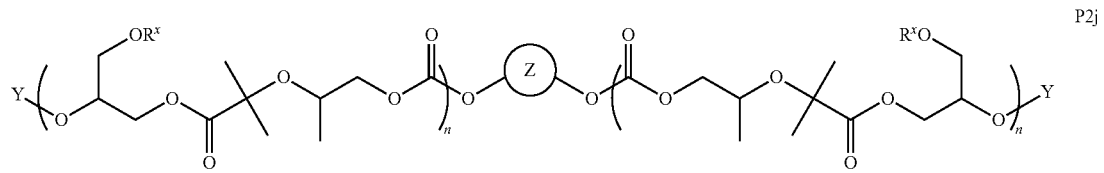

P2j wherein each of , —Y, $R^x$, and n is as defined above and described in classes and subclasses herein.

In certain embodiments, aliphatic polycarbonate chains comprise:

wherein each of , —Y, and n is as defined above and described in classes and subclasses herein.

In certain embodiments, aliphatic polycarbonate chains comprise:

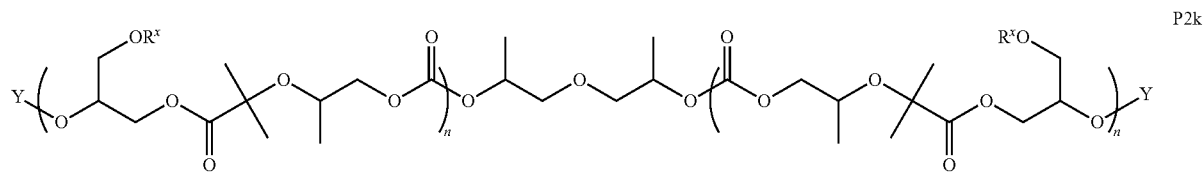

P2k wherein each of —Y, $R^x$, and n is as defined above and described in classes and subclasses herein.

In certain embodiments, aliphatic polycarbonate chains comprise:

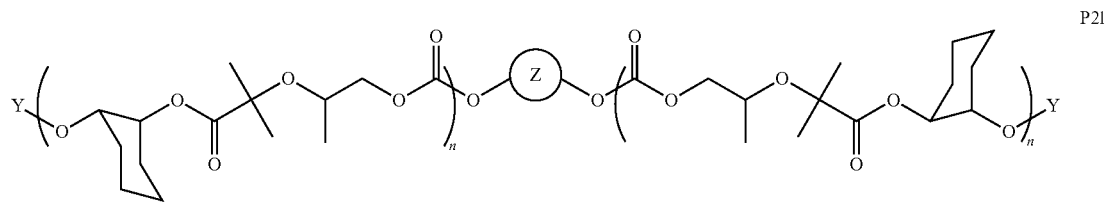

P2l

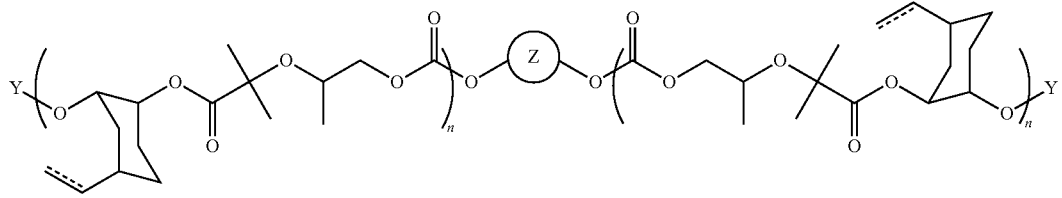

P2l-a wherein each of

,

—Y, and n are is as defined above and described in classes and subclasses herein; and each ≡ independently represents a single or double bond.

In certain embodiments, aliphatic polycarbonate chains comprise:

wherein each of

, $R^x$, —Y and n is as defined above and described in classes and subclasses herein.

In certain embodiments, aliphatic polycarbonate chains comprise:

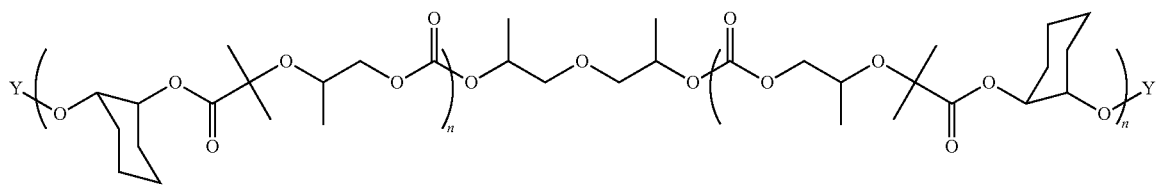

P2m wherein each of —Y and n is as defined above and described in classes and subclasses herein.

In certain embodiments, aliphatic polycarbonate chains comprise:

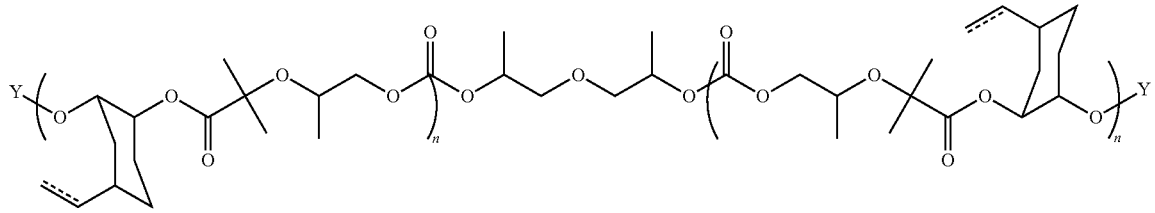

P2m-a wherein each of —Y, ≡ and n is as defined above and described in classes and subclasses herein.

In certain embodiments, aliphatic polycarbonate chains comprise:

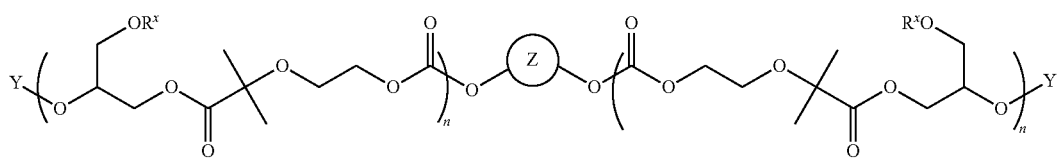

P2n

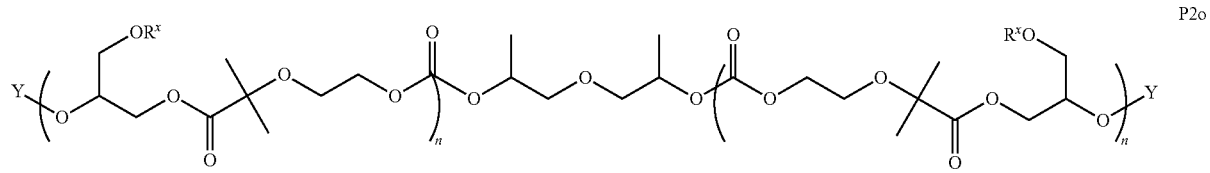

P2o wherein each of —Y, R$^x$, and n is as defined above and described in classes and subclasses herein.

In certain embodiments, aliphatic polycarbonate chains comprise:

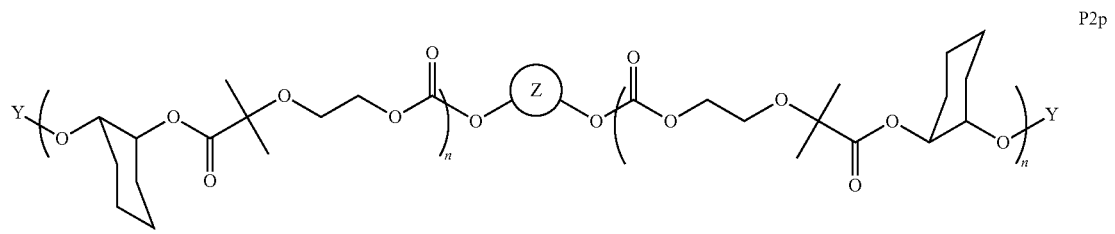

P2p wherein each of

,

—Y, and n is as defined above and described in classes and subclasses herein.

In certain embodiments, aliphatic polycarbonate chains comprise:

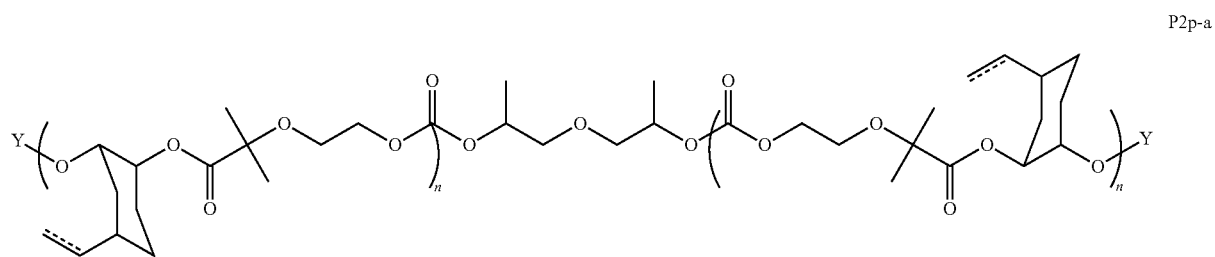

P2p-a wherein each of —Y, ⋯ and n is as defined above and described in classes and subclasses herein.

In certain embodiments, aliphatic polycarbonate chains comprise:

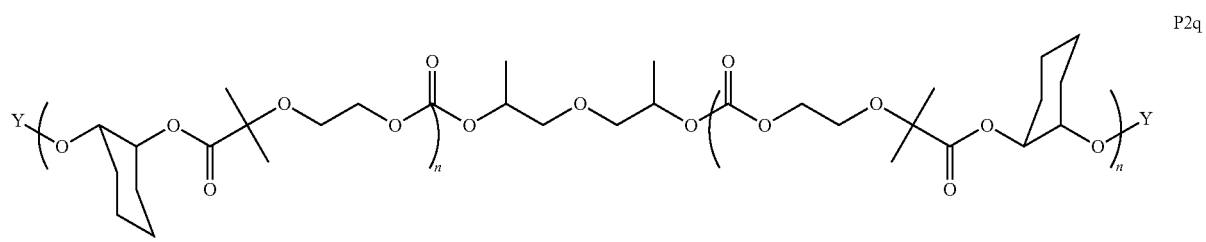

P2q wherein each of —Y and n is as defined above and described in classes and subclasses herein.

In certain embodiments, aliphatic polycarbonate chains comprise:

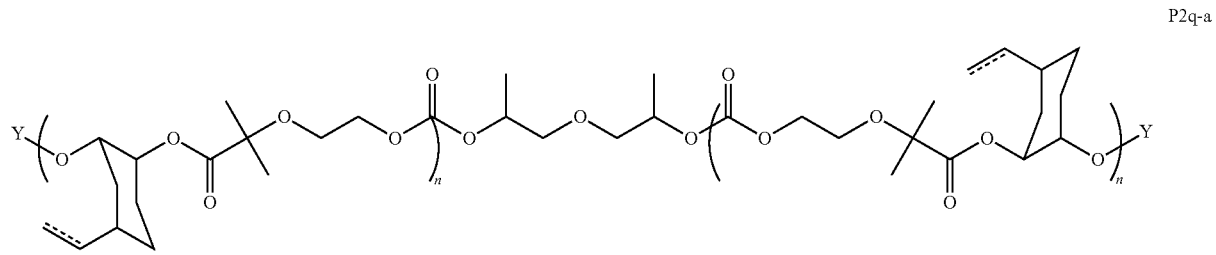

P2q-a wherein each of —Y, ⋯ and n is as defined above and described in classes and subclasses herein.

In certain embodiments, aliphatic polycarbonate chains comprise:

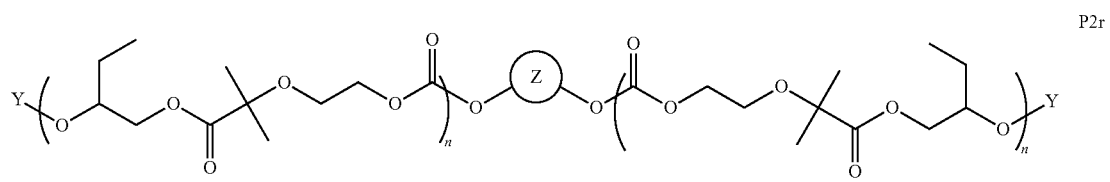

P2r wherein each of

—Y, and n is as defined above and described in classes and subclasses herein.

In certain embodiments, aliphatic polycarbonate chains comprise:

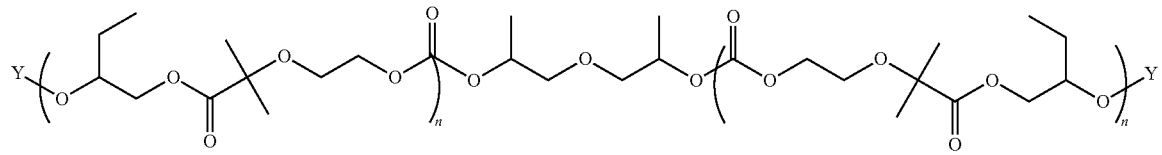

P2r-a wherein each of —Y and n is as defined above and described in classes and subclasses herein.

In certain embodiments, in polycarbonates of structures P2a, P2c, P2d, P2f, P2h, P2j, P2l, P2l-a, P2n, P2p, and P2r,

is selected from the group consisting of: ethylene glycol; diethylene glycol, triethylene glycol, 1,3 propane diol; 1,4 butane diol, hexylene glycol, 1,6 hexane diol, neopentyl glycol, propylene glycol, dipropylene glycol, tripropylene glycol, and alkoxylated derivatives of any of these.

In certain embodiments, in polycarbonates of structures P2a, P2c, P2d, P2f, P2h, P2j, P2l, P2l-a, P2n, P2p, and P2r, —Y is —H.

For polycarbonates comprising repeat units derived from two or more epoxides, such as those represented by structures P2f through P2r-a, depicted above, it is to be understood that the structures drawn may represent mixtures of positional isomers or regioisomers that are not explicitly depicted. For example, the polymer repeat unit adjacent to either end group of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e. temperature pressure, etc.) as well as by the timing of addition of reaction components. Similarly, while the drawings above may show a defined regiochemistry for repeat units derived from substituted epoxides, the polymer compositions will, in some cases, contain mixtures of regioi somers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

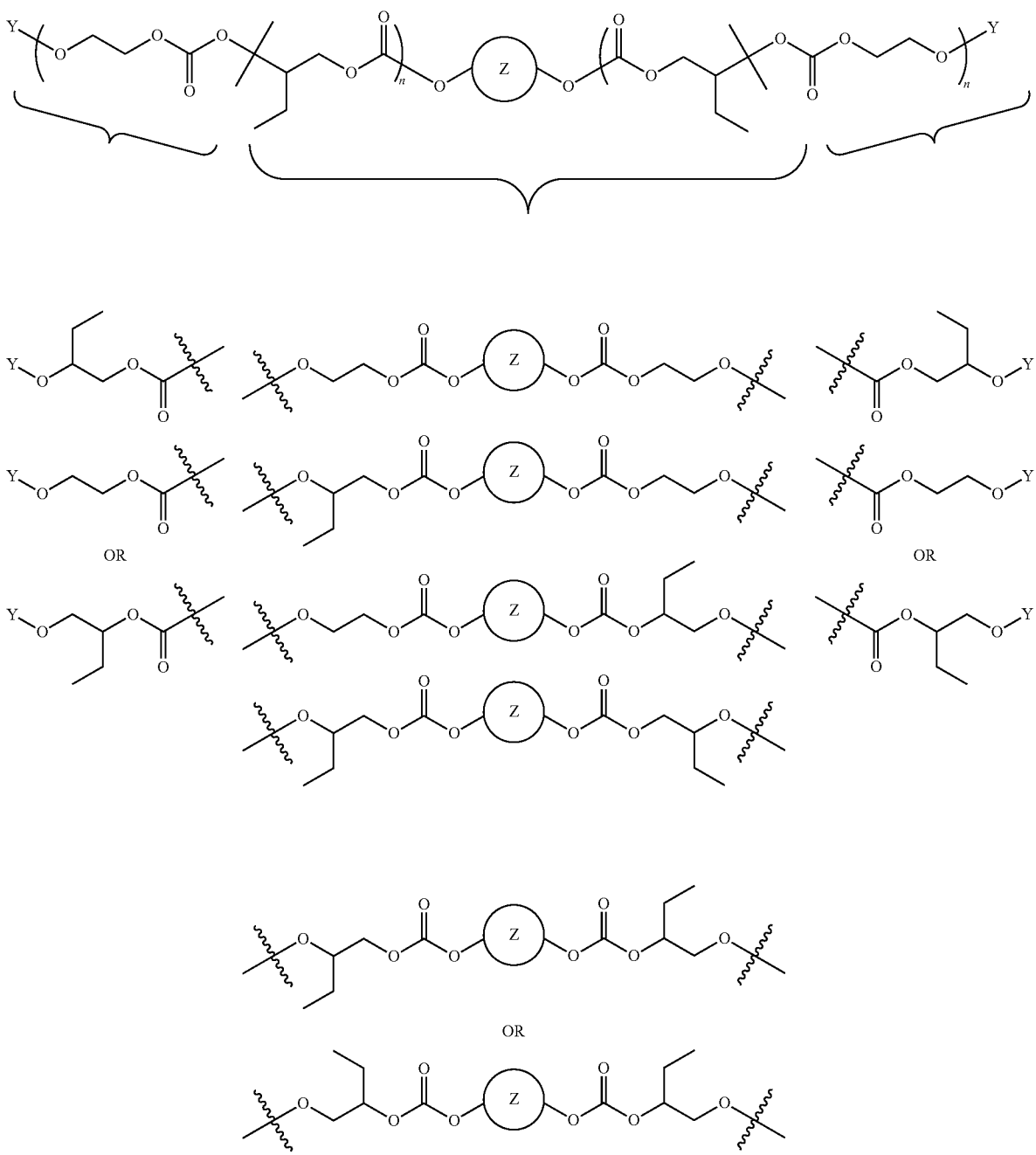

In certain embodiments, the aliphatic polycarbonate polyol is selected from the group consisting of Q1, Q2, Q3, Q4, Q5, Q6, and mixtures of any two or more of these.

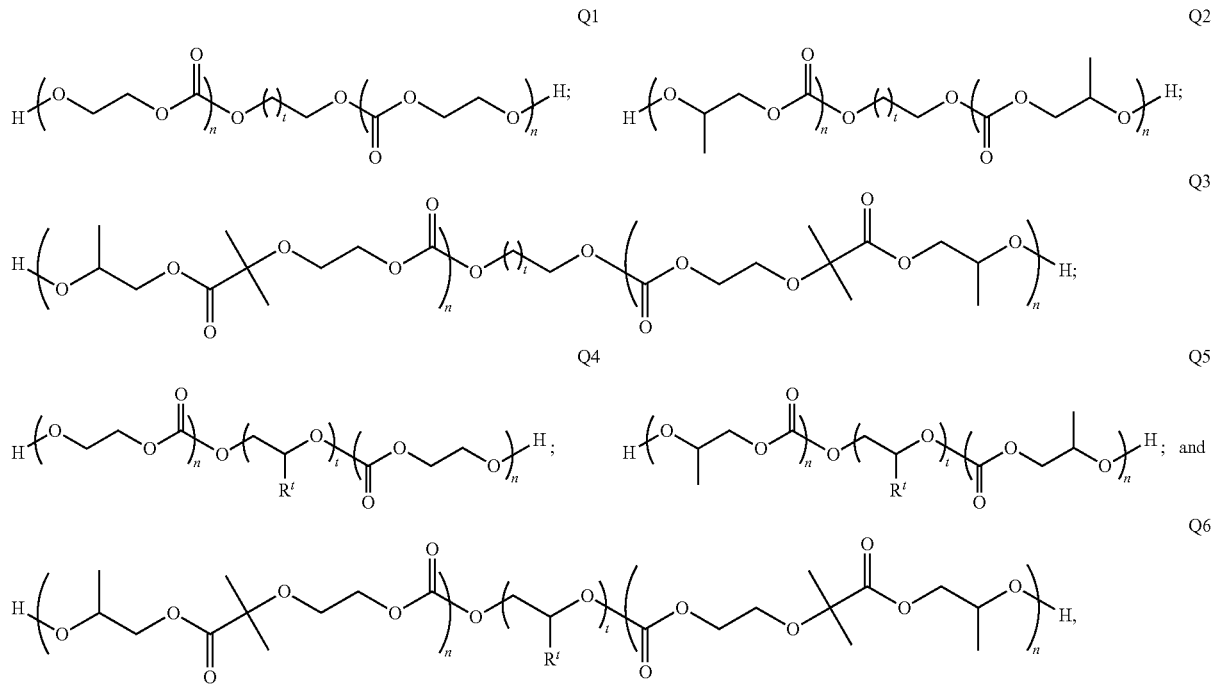

wherein, t is an integer from 1 to 12 inclusive, and R$^t$ is independently at each occurrence —H, or —CH$_3$.

In certain embodiments, the aliphatic polycarbonate polyol is selected from the group consisting of:

Poly(ethylene carbonate) of formula Q1 having an average molecular weight number of between about 500 g/mol and about 3,000 g/mol, a polydispersity index less than about 1.25, at least 85% carbonate linkages, and at least 98% —OH end groups;

Poly(ethylene carbonate) of formula Q1 having an average molecular weight number of about 500 g/mol, a polydispersity index less than about 1.25, at least 85% carbonate linkages, and at least 98% —OH end groups;

Poly(ethylene carbonate) of formula Q1 having an average molecular weight number of about 1,000 g/mol, a polydispersity index less than about 1.25, at least 85% carbonate linkages, and at least 98% —OH end groups;

Poly(ethylene carbonate) of formula Q1 having an average molecular weight number of about 2,000 g/mol, a polydispersity index less than about 1.25, at least 85% carbonate linkages, and at least 98% —OH end groups;

Poly(ethylene carbonate) of formula Q1 having an average molecular weight number of about 3,000 g/mol, a polydispersity index less than about 1.25, at least 85% carbonate linkages, and at least 98% —OH end groups;

Poly(propylene carbonate) of formula Q2 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q2 having an average molecular weight number of about 500 g/mol, a polydispersity index less than about 1.25, at least 95% carbonate linkages, and at least 98% —OH end groups;

Poly(propylene carbonate) of formula Q2 having an average molecular weight number of about 1,000 g/mol, a polydispersity index less than about 1.25, at least 95% carbonate linkages, and at least 98% —OH end groups;

Poly(propylene carbonate) of formula Q2 having an average molecular weight number of about 2,000 g/mol, a polydispersity index less than about 1.25, at least 95% carbonate linkages, and at least 98% —OH end groups;

Poly(propylene carbonate) of formula Q2 having an average molecular weight number of about 3,000 g/mol, a polydispersity index less than about 1.25, at least 95% carbonate linkages, and at least 98% —OH end groups;

Poly(ethylene-co-propylene carbonate) of formula Q3 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q3 having an average molecular weight number of about 500 g/mol, a polydispersity index less than about 1.25, at least 90% carbonate linkages, and at least 98% —OH end groups;

Poly(ethylene-co-propylene carbonate) of formula Q3 having an average molecular weight number of about 1,000 g/mol, a polydispersity index less than about 1.25, at least 90% carbonate linkages, and at least 98% —OH end groups;

Poly(ethylene-co-propylene carbonate) of formula Q3 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q3 having an average molecular weight number of about 3,000 g/mol, a polydispersity index less than about 1.25, at least 95% carbonate linkages, and at least 98% —OH end groups;

Poly(ethylene carbonate) of formula Q4 having an average molecular weight number of between about 500 g/mol and about 3,000 g/mol (e.g. each n is between about 4 and about 16), a polydispersity index less than about 1.25, at least 95% carbonate linkages, and at least 98% —OH end groups;

Poly(ethylene carbonate) of formula Q4 having an average molecular weight number of about 500 g/mol, a polydispersity index less than about 1.25, at least 85% carbonate linkages, and at least 98% —OH end groups;

Poly(ethylene carbonate) of formula Q4 having an average molecular weight number of about 1,000 g/mol, a polydispersity index less than about 1.25, at least 85% carbonate linkages, and at least 98% —OH end groups;

Poly(ethylene carbonate) of formula Q4 having an average molecular weight number of about 2,000 g/mol, a polydispersity index less than about 1.25, at least 85% carbonate linkages, and at least 98% —OH end groups;

Poly(ethylene carbonate) of formula Q4 having an average molecular weight number of about 3,000 g/mol, a polydispersity index less than about 1.25, at least 85% carbonate linkages, and at least 98% —OH end groups.

Poly(propylene carbonate) of formula Q5 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q5 having an average molecular weight number of about 500 g/mol, a polydispersity index less than about 1.25, at least 95% carbonate linkages, and at least 98% —OH end groups;

Poly(propylene carbonate) of formula Q5 having an average molecular weight number of about 1,000 g/mol, a polydispersity index less than about 1.25, at least 95% carbonate linkages, and at least 98% —OH end groups;

Poly(propylene carbonate) of formula Q5 having an average molecular weight number of about 2,000 g/mol, a polydispersity index less than about 1.25, at least 95% carbonate linkages, and at least 98% —OH end groups;

Poly(propylene carbonate) of formula Q5 having an average molecular weight number of about 3,000 g/mol, a polydispersity index less than about 1.25, at least 95% carbonate linkages, and at least 98% —OH end groups;

Poly(ethylene-co-propylene carbonate) of formula Q6 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q6 having an average molecular weight number of about 500 g/mol, a polydispersity index less than about 1.25, at least 90% carbonate linkages, and at least 98% —OH end groups;

Poly(ethylene-co-propylene carbonate) of formula Q6 having an average molecular weight number of about 1,000 g/mol, a polydispersity index less than about 1.25, at least 90% carbonate linkages, and at least 98% —OH end groups;

Poly(ethylene-co-propylene carbonate) of formula Q6 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q6 having an average molecular weight number of about 3,000 g/mol, a polydispersity index less than about 1.25, at least 95% carbonate linkages, and at least 98% —OH end groups; and Mixtures of any two or more of these.

In certain embodiments, the embedded chain transfer agent

is a moiety derived from a polymeric diol or higher polyhydric alcohol. In certain embodiments, such polymeric alcohols are polyether or polyester polyols. In certain embodiments

is a polyether polyol comprising ethylene glycol or propylene glycol repeating units (—OCH$_2$CH$_2$O—, or —OCH$_2$CH(CH$_3$)O—) or combinations of these. In certain embodiments,

is a polyester polyol comprising the reaction product of a diol and a diacid, or a material derived from ring-opening polymerization of one or more lactones.

In certain embodiments where

comprises a polyether diol, the aliphatic polycarbonate polyol has a structure Q7:

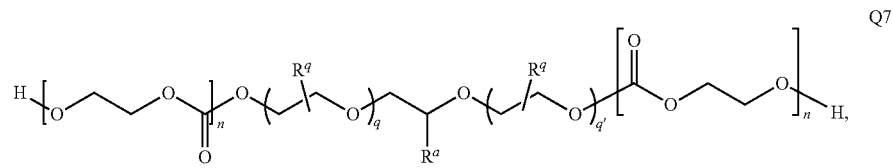

wherein, $R^q$ is at each occurrence in the polymer chain independently —H or —CH$_3$;

$R^a$ is —H, or —CH$_3$;

q and q' are independently an integer from about 0 to about 40; and and n is as defined above and in the examples and embodiments herein.

In certain embodiments, an aliphatic polycarbonate polyol is selected from the group consisting of:

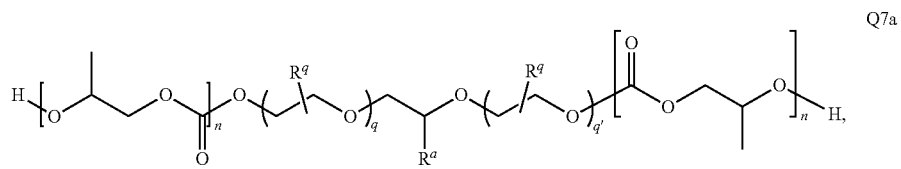

Q7a

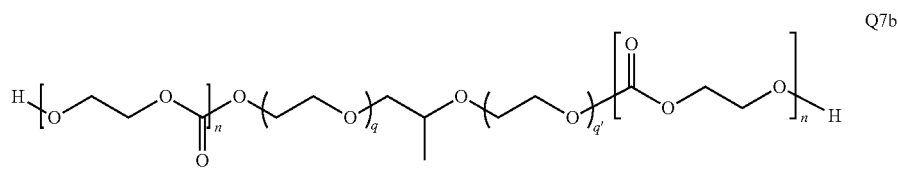

Q7b

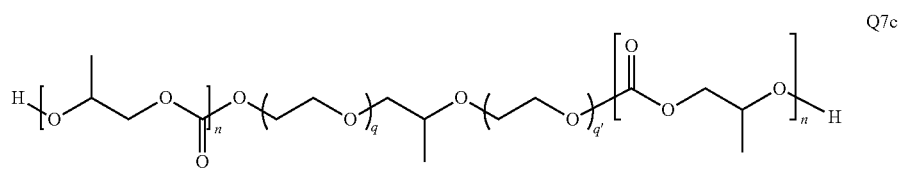

Q7c

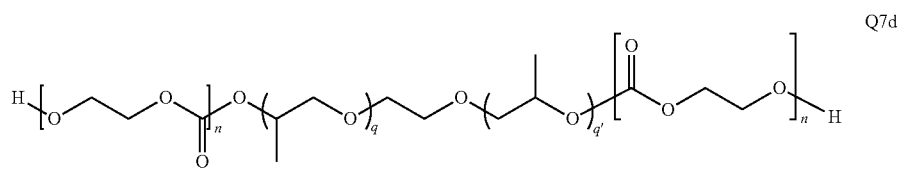

Q7d

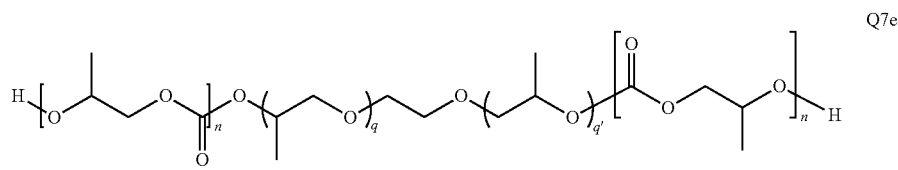

Q7e

In certain embodiments, where aliphatic polycarbonate polyols comprise compounds conforming to structure Q7, the moiety (Z)

is derived from a commercially available polyether polyol such as those typically used in the formulation of polyurethane compositions.

In certain embodiments where (Z)

comprises a polyester diol, the aliphatic polycarbonate polyol has a structure Q8:

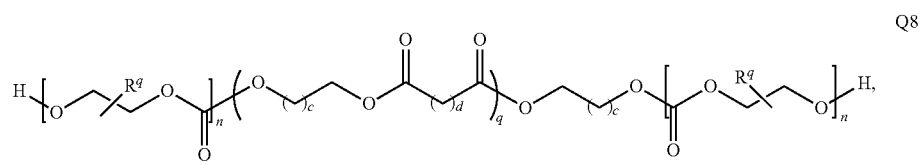

Q8 wherein,
c is at each occurrence in the polymer chain independently an integer from 0 to 6;
d is at each occurrence in the polymer chain independently an integer from 1 to 11; and
each of $R^q$, n, and q is as defined above and in the examples and embodiments herein.

In certain embodiments, an aliphatic polycarbonate polyol is selected from the group consisting of:

reagents is to react with the reactive end groups on the aliphatic polycarbonate polyols to form higher molecular weight structures through chain extension and/or cross-linking.

The art of polyurethane synthesis is well advanced and a very large number of isocyanates and related polyurethane precursors are known in the art. While this section of the specification describes isocyanates suitable for use in certain embodiments of the present invention, it is to be understood

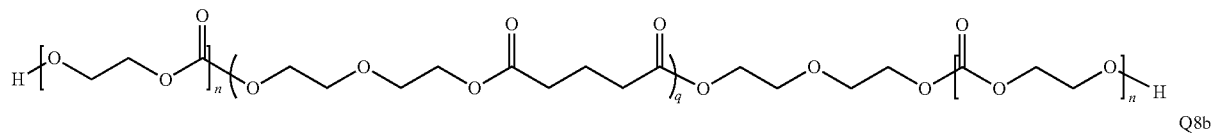
Q8a

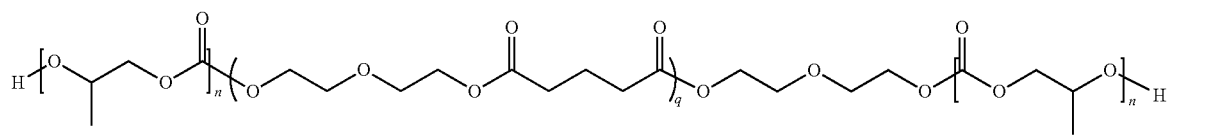
Q8b

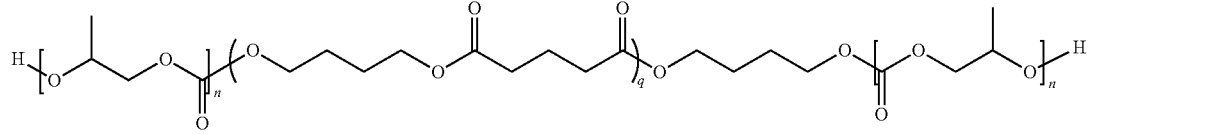
Q8c

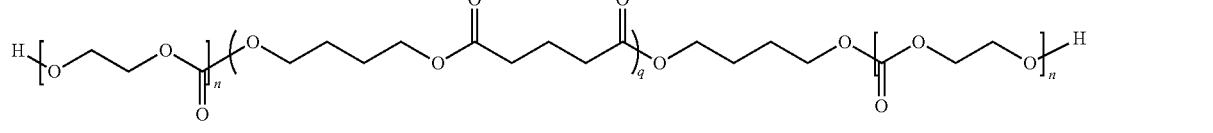
Q8d

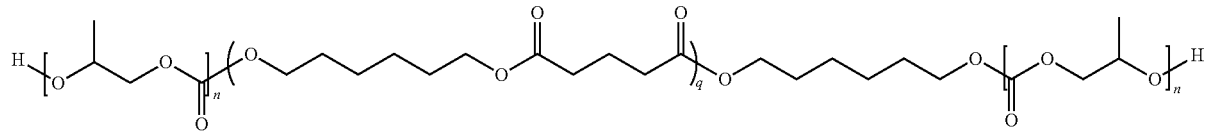
Q8e

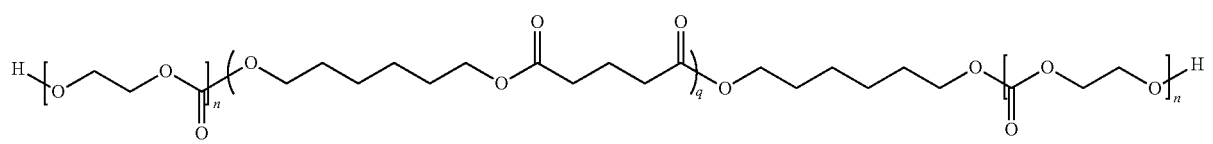
Q8f

Q8g

In certain embodiments, where aliphatic polycarbonate polyols comprise compounds conforming to structure Q8, the moiety (z)

is derived from a commercially available polyester polyol such as those typically used in the formulation of polyurethane compositions.

II. Isocyanate Reagents

As described above, the compositions of the present invention comprise higher polymers derived from reactions with isocyanate reagents. The purpose of these isocyanate that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: *Chemistry and Technology of Polyols for Polyurethanes* Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference.

In certain embodiments, the isocyanate reagents comprise two or more isocyanate groups per molecule. In certain embodiments the isocyanate reagents are diisocyanates. In other embodiments, the isocyanate reagents are higher polyisocyanates such as triisocyanates, tetraisocyanates, isocyanate polymers or oligomers, and the like, which are typically a minority component of a mix of predominantly diisocyanates. In certain embodiments, the isocyanate reagents are aliphatic polyisocyanates or derivatives or oligomers of aliphatic polyisocyanates. In other embodiments, the isocyanates are aromatic polyisocyanates or derivatives or oligomers of aromatic polyisocyanates. In certain embodiments, the compositions may comprise mixtures of any two or more of the above types of isocyanates.

In certain embodiments, isocyanate reagents usable for the production of the polyurethane adhesive include aliphatic, cycloaliphatic and aromatic diisocyanate compounds.

Suitable aliphatic and cycloaliphatic isocyanate compounds include, for example, 1,3-trimethylene diisocyanate, 1,4-tetramethylene diisocyanate, 1,6-hexamethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, isophorone diisocyanate, 4,4,'-dicyclohexylmethane diisocyanate, 2,2'-diethylether diisocyanate, hydrogenated xylylene diisocyanate, and hexamethylene diisocyanate-biuret.

The aromatic isocyanate compounds include, for example, p-phenylene diisocyanate, tolylene diisocyanate, xylylene diisocyanate, 4,4'-diphenyl diisocyanate, 2,4'-diphenylmethane diisocyanate, 1,5-naphthalene diisocyanate, 4,4'-diphenylmethane diisocyanate (MDI), 3,3'-methyleneditolylene-4,4'-diisocyanate, tolylenediisocyanate-trimethylolpropane adduct, triphenylmethane triisocyanate, 4,4'-diphenylether diisocyanate, tetrachlorophenylene diisocyanate, 3,3'-dichloro-4,4'-diphenylmethane diisocyanate, and triisocyanate phenylthiophosphate.

In certain embodiments, the isocyanate compound employed comprises one or more of: 4,4'-diphenylmethane diisocyanate, 1,6-hexamethylene diisocyanate and isophorone diisocyanate. In certain embodiments, the isocyanate compound employed is 4,4'-diphenylmethane diisocyanate. The above-mentioned diisocyanate compounds may be employed alone or in mixtures of two or more thereof.

In certain embodiments, an isocyanate reagent is selected from the group consisting of: 1,6-hexamethylaminediisocyanate (HDI), isophorone diisocyanate (IPDI), 4,4' methylene-bis(cyclohexyl isocyanate) (H$_{12}$MDI), 2,4-toluene diisocyanate (TDI), 2,6-toluene diisocyanate (TDI), diphenylmethane-4,4'-diisocyanate (MDI), diphenylmethane-2,4'-diisocyanate (MDI), xylylene diisocyanate (XDI), 1,3-Bis(isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4"triisocyanate, Tris(p-isocyanatomethyl)thiosulfate, 1,3-Bis(isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, HDI allophonate trimer, HDI urethdione and HDI-trimer and mixtures of any two or more of these.

In certain embodiments, an isocyanate reagent is selected from the group consisting of 4,4'-diphenylmethane diisocyanate, 1,6-hexamethylene diisocyanate and isophorone diisocyanate. In certain embodiments, an isocyanate reagent is 4,4'-diphenylmethane diisocyanate. certain embodiments, an isocyanate reagent is 1,6-hexamethylene diisocyanate. certain embodiments, an isocyanate reagent is isophorone diisocyanate.

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations. The selection of suitable commercially-available isocyanate materials as reagents to produce polyurethane compositions for a particular application is within the capability of one skilled in the art of polyurethane coating technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, the isocyanates are selected from the group consisting of the materials shown in Table 1, and typically from the subset of this list that are between 1.95 and 2.1 functional isocyanates:

TABLE 1

| Products | Description | % NCO | Nominal Funct. |
|---|---|---|---|
| Lupranate M | 4,4' MDI | 33.5 | 2 |
| Lupranate MS | 4,4' MDI | 33.5 | 2 |
| Lupranate MI | 2,4' and 4,4' MDI Blend | 33.5 | 2 |
| Lupranate LP30 | Liquid Pure 4,4' MDI | 33.1 | 2 |
| Lupranate 227 | Monomeric/Modified MDI Blend Carbodiimide Modified MDI | 32.1 | 2 |
| Lupranate 5143 | Carbodiimide Modified 4,4' MDI | 29.2 | 2.2 |
| Lupranate MM103 | Carbodiimide Modified 4,4' MDI | 29.5 | 2.2 |
| Lupranate 219 | Carbodiimide Modified 4,4' MDI | 29.2 | 2.2 |
| Lupranate 81 | Carbodiimide Modified MDI | 29.5 | 2.2 |
| Lupranate 218 | Carbodiimide Modified MDI Polymeric MDI (PMDI) | 29.5 | 2.2 |
| Lupranate M10 | Low Funct. Polymeric | 31.7 | 2.2 |
| Lupranate R2500U | Polymeric MDI Variant | 31.5 | 2.7 |
| Lupranate M20S | Mid-Functionality Polymeric | 31.5 | 2.7 |
| Lupranate M20FB | Mid-Functionality Polymeric | 31.5 | 2.7 |
| Lupranate M70L | High-Functionality Polymeric | 31 | 3 |
| Lupranate M200 | High-Functionality Polymeric | 30 | 3.1 |
| Polymeric MDI Blends and Derivatives | | | |
| Lupranate 241 | Low Functionality Polymeric | 32.6 | 2.3 |
| Lupranate 230 | Low Viscosity Polymeric | 32.5 | 2.3 |
| Lupranate 245 | Low Viscosity Polymeric | 32.3 | 2.3 |
| Lupranate TF2115 | Mid Functionality Polymeric | 32.3 | 2.4 |
| Lupranate 78 | Mid Functionality Polymeric | 32 | 2.3 |
| Lupranate 234 | Low Functionality Polymeric | 32 | 2.4 |
| Lupranate 273 | Low Viscosity Polymeric | 32 | 2.5 |
| Lupranate 266 | Low Viscosity Polymeric | 32 | 2.5 |

TABLE 1-continued

| Products | Description | % NCO | Nominal Funct. |
|---|---|---|---|
| Lupranate 261 | Low Viscosity Polymeric | 32 | 2.5 |
| Lupranate 255 | Low Viscosity Polymeric | 31.9 | 2.5 |
| Lupranate 268 | Low Viscosity Polymeric | 30.6 | 2.4 |
| Select MDI Prepolymers | | | |
| Lupranate 5010 | Higher Functional Prepolymer | 28.6 | 2.3 |
| Lupranate 223 | Low Visc. Derivative of Pure MDI | 27.5 | 2.2 |
| Lupranate 5040 | Mid Functional, Low Viscosity | 26.3 | 2.1 |
| Lupranate 5110 | Polymeric MDI Prepolymer | 25.4 | 2.3 |
| Lupranate MP102 | 4,4' MDI Prepolymer | 23 | 2 |
| Lupranate 5090 | Special 4,4' MDI Prepolymer | 23 | 2.1 |
| Lupranate 5050 | Mid Functional, Mid NCO Prepol | 21.5 | 2.1 |
| Lupranate 5030 | Special MDI Prepolymer | 18.9 | NA |
| Lupranate 5080 | 2,4'-MDI Enhanced Prepolymer | 15.9 | 2 |
| Lupranate 5060 | Low Funct, Higher MW Prepol | 15.5 | 2 |
| Lupranate 279 | Low Funct, Special Prepolymer | 14 | 2 |
| Lupranate 5070 | Special MDI Prepolymer | 13 | 2 |
| Lupranate 5020 | Low Functionality, Low NCO | 9.5 | 2 |
| Toluene Diisocyanate (TDI) | | | |
| Lupranate T80- | 80/20:2,4/2,6 TDI | 48.3 | 2 |
| Lupranate T80- | High Acidity TDI | 48.3 | 2 |
| Lupranate 8020 | 80/20:TDI/Polymeric MDI | 44.6 | 2.1 |

Other isocyanates suitable for certain embodiments of the present invention are sold under the trade name Desmodur® available from Bayer Material Science. In certain embodiments, the isocyanates are selected from the group consisting of the materials shown in Table 2, and typically from the subset of this list that are between 1.95 and 2.1 functional isocyanates:

TABLE 2

| Trade Name | Description |
|---|---|
| Desmodur ® 2460 M | Monomeric diphenylmethane diisocyanate with high 2,4'-isomer content |
| Desmodur ® 44 M | A monomeric diphenylmethane-4,4'-diisocyanate (MDI). |
| Desmodur ® 44 MC | Desmodur 44 MC Flakes is a monomeric diphenylmethane-4,4'-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4'-diisocyanate. |
| Desmodur ® CD-S | Desmodur CD-S is a modified isocyanate based on diphenylmethane-4,4'-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |

TABLE 2-continued

| Trade Name | Description |
|---|---|
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4'-diphenylmethane diisocyanate (2,4'-MDI) and a hexanediol |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4'-diphenylmethane diisocyanate (2,4'-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |
| Desmodur ® H | Monomeric aliphatic diisocyanate |
| Desmodur ® HL | Aromatic/aliphatic polyisocyanate based on toluylene diisocyanate/hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on tolulene diisocyanate |
| Desmodur ® LD | Low-functionality isocyanate based on hexamethylene diisocyanate (HDI) |
| Desmodur ® LS 2424 | Monomeric diphenylmethane diisocyanate with high 2,4'-isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4'-diisocyanate (MDI). |
| Desmodur ® PF | Desmodur PF is a modified diphenyl-methane-4,4'-diisocyanate (MDI). |
| Desmodur ® PL 340, 60% BA/SN | Blocked aliphatic polyisocyanate based on IPDI |
| Desmodur ® PL 350 | Blocked aliphatic polyisocyanate based on HDI |
| Desmodur ® RC | Solution of a polyisocyanurate of toluene diisocyanate (TDI) in ethyl acetate. |
| Desmodur ® RE | Solution of triphenylmethane-4,4',4''-triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4'-toluene diisocyanate (TDI) |
| Desmodur ® T 65 N | 2,4- and 2,6-toluene diisocyanate (TDI) in the ratio 67:33 |
| Desmodur ® T 80 | 2,4- and 2,6-toluene diisocyanate (TDI) in the ratio 80:20 |
| Desmodur ® T 80 P | 2,4- and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4'-diisocyanate (MDI) with isomers and higher functional |
| Desmodur ® VKP 79 | Desmodur VKP 79 is a modified diphenylmethane-4,4'-diisocyanate (MDI) with isomers and homologues. |

TABLE 2-continued

| Trade Name | Description |
|---|---|
| Desmodur ® VKS 10 | Desmodur VKS 10 is a mixture of diphenylmethane-4,4'-diisocyanate (MDI) with isomers and higher functional |
| Desmodur ® VKS 20 | Desmodur VKS 20 is a mixture of diphenylmethane-4,4'-diisocyanate (MDI) with isomers and higher functional |
| Desmodur ® VKS 20 F | Desmodur VKS 20 F is a mixture of diphenylmethane-4,4'-diisocyanate (MDI) with isomers and higher functional |
| Desmodur ® VKS 70 | Desmodur VKS 70 is a mixture of diphenylmethane-4,4'-diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |
| Desmodur ® VP LS 2397 | Desmodur VP LS 2397 is a linear prepolymer based on polypropylene ether glycol and diphenylmethane diisocyanate |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4'-diisocyanates (MDI) with |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2—nanoparticles |

Additional isocyanates suitable for certain embodiments of the present invention are sold under the trade name Tolonate® (Perstorp). In certain embodiments, the isocyanates are selected from the group consisting of the materials shown in Table 3, and typically from the subset of this list that are between 1.95 and 2.1 functional isocyanates:

TABLE 3

| Tolonate ™ D2 | a blocked aliphatic polyisocyanate, supplied at 75% solids in aromatic solvent |
|---|---|
| Tolonate ™ HDB | a viscous solvent-free aliphatic polyisocyanate |
| Tolonate ™ HDB-LV | a solvent free low viscosity aliphatic polyisocyanate |
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, the isocyanates are selected from the group consisting of the materials shown in Table 4, and typically from the subset of this list that are between 1.95 and 2.1 functional isocyanates:

TABLE 4

| Trade Name | Description |
| --- | --- |
| MONDUR 445 | TDI/MDI blend polyisocyanate; blend of toluene diisocyanate and polymeric diphenylmethane diisocyanate; NCO weight 44.5-45.2% |
| MONDUR 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR 489 | modified polymeric diphenylmethane diisocyanate (pMDI); NCO weight 31.5%; viscosity 700 mPa · s @ 25° C.; equivalent weight 133; functionality 3.0 |
| MONDUR 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR 541 | polymeric diphenylmethane diisocyanate (pMDI); binder for composite wood products and as a raw material in adhesive formulations; NCO weight 31.5%; viscosity 200 mPa · s @ 25° C. |
| MONDUR 582 | polymeric diphenylmethane diisocyanate (pMDI); binder for composite wood products and as a raw material in adhesive formulations; NCO weight 31.0%; viscosity 200 mPa · s @ 25° C. |
| MONDUR 541-Light | polymeric diphenylmethane diisocyanate (pMDI); NCO weight 32.0%; viscosity 70 mPa · s @ 25° C.; equivalent weight 131; functionality 2.5 |
| MONDUR 841 | modified polymeric MDI prepolymer; NCO, Wt 30.5%; Acidity, Wt 0.02%; Amine Equivalent 132; Viscosity at 25° C., mPa · s 350; Specific gravity at 25° C. 1.24; Flash Point, PMCC, ° F. >200 |
| MONDUR 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |
| MONDUR MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR MA-2904 | Allophanate-modified MDI polyether prepolymer; NCO weight 12.0%; viscosity 1,800 mPa · s @ 25° C.; equivalent weight 350; functionality of 2.0 |
| MONDUR MB | high-purity grade difunctional isocyanante, diphenylmethane 4,4'-diisocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · S; bult density 10 lb/gal (fused) or 9.93 lb/gal (molten); freezing temperature 39° C. |
| MONDUR MLQ | monomeric diphenylmethan diisocyanate; used in a foams, cast elastomers, coatings and ahdesives; appearance light yellow clear liquid, NCO 33.4% wt; 1.19 specific gravity at 25° C., 196° C. flash point, DIN 51758; 11-15° C. freezing temperature |
| MONDUR MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa · S; bulk density 10 lb./gal (fused) or 9.93 lb./gal (molten); freezing temperature 39° C. |
| MONDUR MR | polymeric diphenylmethane diisocyanate (pMDI); NCO weight 31.5%; viscosity 200 mPa · s @ 25° C.; equivalent weight 133; functionality 2.8 |
| MONDUR MR LIGHT | polymeric diphenylmethane diisocyanate (pMDI); NCO weight 31.5%; viscosity 200 mPa · s @ 25° C.; equivalent weight 133; functionality 2.8 |

TABLE 4-continued

| Trade Name | Description |
| --- | --- |
| MONDUR MR-5 | polymeric diphenylmethane diisocyanate (pMDI); NCO weight 32.5%; viscosity 50 mPa · s @ 25° C.; equivalent weight 129; functionality 2.4 |
| MONDUR MRS | 2,4' rich polymeric diphenylmethane diisocyanate (pMDI); NCO weight 31.5%; viscosity 200 mPa · s @ 25° C.; equivalent weight 133; functionality 2.6 |
| MONDUR MRS 2 | 2,4' rich polymeric diphenylmethane diisocyanate (pMDI); NCO weight 33.0%; viscosity 25 mPa · s @ 25° C.; equivalent weight 127; functionality 2.2 |
| MONDUR MRS-4 | 2,4' rich polymeric diphenylmethane diisocyanate (pMDI); NCO weight 32.5%; viscosity 40 mPa · s @ 25° C.; equivalent weight 129; functionality 2.4 |
| MONDUR MRS-5 | 2,4' rich polymeric diphenylmethane diisocyanate (pMDI); NCO weight 32.3%; viscosity 55 mPa · s @ 25° C.; equivalent weight 130; functionality 2.4 |
| MONDUR PC | modified 4,4' diphenylmethane diisocyanate (mMDI); NCO weight 25.8%; viscosity 145 mPa · s @ 25° C.; equivalent weight 163; functionality 2.1 |
| MONDUR PF | modified 4,4' diphenylmethane diisocyanate (mMDI) prepolymer; NCO weight 22.9%; viscosity 650 mPa · s @ 25° C.; equivalent weight 183; functionality 2 |
| MONDUR TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR TD-80 GRADE A/GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

In certain embodiments, one or more of the above-described isocyanate compositions is provided in a formulation typical of a mixture known in the art of polyurethane adhesives manufacture. Such mixtures may comprise pre-polymers formed by the reaction of a molar excess of one or more isocyanates with reactive molecules comprising reactive functional groups such as alcohols, amines, thiols, carboxylates and the like. These mixtures may also comprise solvents, surfactants, stabilizers, and other additives known in the art.

In certain embodiments, the composition of the adhesive might comprise a blocked isocyante. Such mixtures do not react under normal conditions, even in the presence of water. Instead curing is triggered by heating.

III. Pre-Polymers

In another aspect, the present invention encompasses prepolymers comprising isocyanate-terminated epoxide-$CO_2$-derived polyols. In certain embodiments, such isocyanate-terminated prepolymers comprise a plurality of epoxide-$CO_2$-derived polyol segments linked via urethane bonds formed by reaction with polyisocyanate compounds.

In certain embodiments, a prepolymer of the present invention is the result of a reaction between one or more of the aliphatic polycarbonate polyols described above with a stoichiometric excess of any one or more of the diisocyanates described herein. The degree of polymerization of these prepolymers (i.e. the average number of polyol segments contained in the prepolymer chains) can be manipulated by controlling the relative amount of isocyanate, as well as the order of reagent addition and the reaction conditions.

In certain embodiments, prepolymers comprise compounds conforming to a formula:

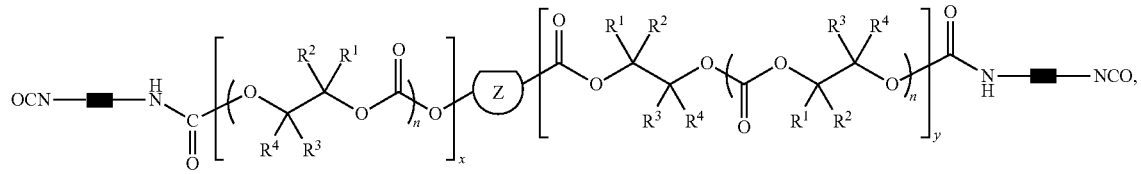

where, the black rectangles ▮ represent the carbon skeleton of the diisocyanate, $R^1$, $R^2$, $R^3$, $R^4$, n, x, and y, are as defined above and in the classes and subclasses herein.

In certain embodiments, prepolymers comprise compounds conforming to a formula:

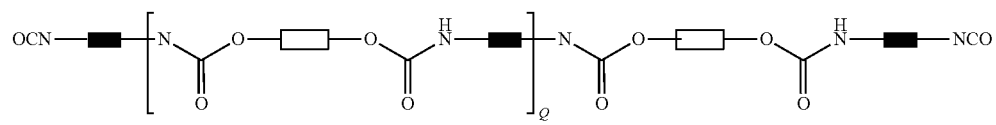

wherein Q is 0 or an integer between 1 and about 50, each open rectangle, ▢, represents a polyol moiety each of which may be the same or different, and ■, is as defined above and in the classes and subclasses herein. In certain of these embodiments, some of the polyol moieties are derived from one or more of the aliphatic polycarbonate polyols as defined herein, while other of the polyol moieties may be derived from other polyols such as polyether or polyester polyols as described herein.

In certain embodiments, prepolymers comprise chains conforming to the formula:

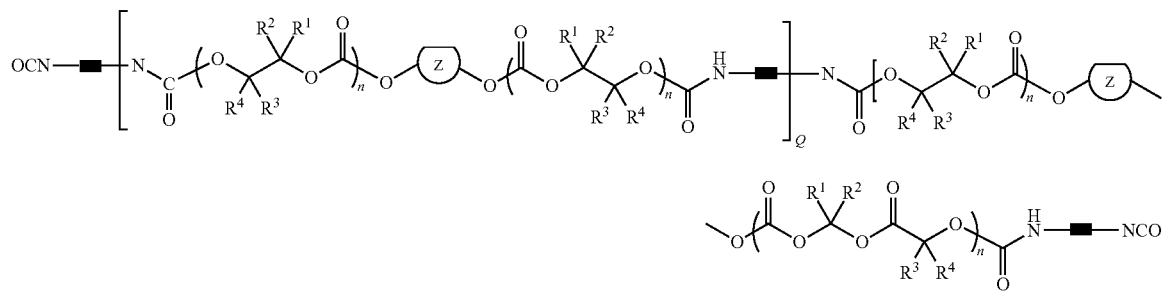

wherein, ■,

$Q, R^1, R^2, R^3, R^4$, and n are as defined above and in the classes and subclasses herein.

In other embodiments, a prepolymer may be formed by reacting a stoichiometric excess of polyol with a limited amount of isocyanate. In such embodiments, the inventive prepolymer has —OH end groups and contains two or more polyol units connected by urethane linkages. In certain embodiments, such prepolymers conform to a structure:

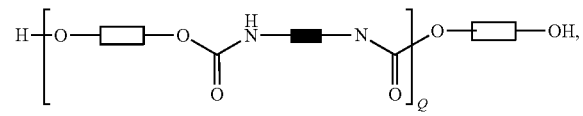

wherein ▢, ■, and Q, are as defined above and in the classes and subclasses herein.

In certain embodiments, such prepolymers have structures conforming to:

wherein, ■,

$Q, R^1, R^2, R^3, R^4$, and n are as defined above and in the classes and subclasses herein.

IV. Other Co-Reactants and Additives

As described above, in some embodiments, compositions of the present invention can include one or more of the aliphatic polycarbonate polyols described in Section I above. Additional aliphatic polycarbonate polyols suitable for the formulation of such mixtures of the present invention are disclosed in WO 2010/028362.

In certain embodiments, these mixtures comprise the aliphatic polycarbonate polyols in combination with one or more additional polyols and/or one or more additives. In certain embodiments, the additional polyols are selected from the group consisting of: polyester polyols, in some cases based on adipic acid and various diols; polyether polyols; and/or polycaprolactone polyols. In certain embodiments, the mixtures comprise additional reactive small molecules known as chain extenders such as amines, alcohols, thiols or carboxylic acids that participate in bond-forming reactions with isocyanates. In certain embodiments, additives are selected from the group consisting of: solvents, fillers, clays, blocking agents, stabilizers, thixotropes, plasticizers, compatibilizers, colorants, UV stabilizers, flame retardants, and the like.

A. Additional Polyols

In certain embodiments, the mixtures of the present invention comprise aliphatic polycarbonate polyols as described above in combination with one or more additional polyols such as are traditionally used in polyurethane adhesive compositions. In embodiments where additional polyols

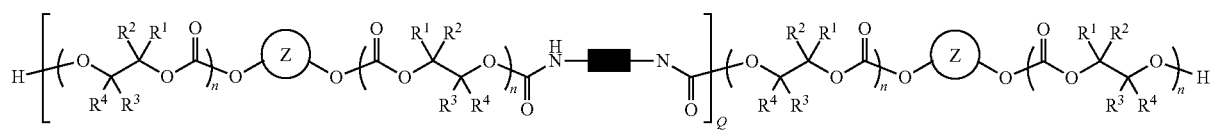

are present, they may comprise up to about 95 weight percent of the total polyol content with the balance of the polyol mixture made up of one or more aliphatic polycarbonate polyols described in Section I above and in the examples and specific embodiments herein.

In embodiments where mixtures of the present invention comprise or are derived from a mixture of one or more aliphatic polycarbonate polyols and one or more additional polyols, the additional polyols are selected from the group consisting of polyether polyols, polyester polyols, polystyrene polyols, polyether-carbonate polyols, polyether-ester carbonates, butane diol adipate polyols, ethylene glycol adipate polyols, hexane diol adipate polyols, polycaprolactone polyols, polycarbonate polyols, polytetramethylene ether glycol (PTMEG) polyols, EO/PO polyether polyols, and mixtures of any two or more of these. In certain embodiments, mixtures of the present invention comprise or derived from a mixture of one or more aliphatic polycarbonate polyols as described herein and one or more other polyols selected from the group consisting of materials available commercially under the trade names: Voranol® (Dow), SpecFlex® (Dow), Tercarol® (Dow), Caradol® (Shell), Hyperliter®, Acclaim® (Bayer Material Science), Ultracel® (Bayer Material Science), Desmophen® (Bayer Material Science), Arcol® (Bayer Material Science), Stepanpol® (Stepan), Terate® (Invista), Terol® (oxid), Agrol® (BioBased Technologies), BiOH® (Cargil), HB® (Honey Bee), Polycin® (Vertellus), Poly-BD® (Cray Valley) and Krasol® (Cray Valley).

In certain embodiments, the mixtures of the present invention contain polyether polyols, polyester polyols, and/or polycaprolactone polyols in combination with one or more aliphatic polycarbonate polyols as described herein. In certain embodiments, such polyols are characterized in that they have an Mn between about 500 and about 10,000 g/mol. In certain embodiments, such polyols have an Mn between about 500 and about 5,000 g/mol. In certain embodiments, such polyols have an Mn between about 1,500 and about 25,000 g/mol.

In certain embodiments, mixtures of the present invention contain polyether polyols, polyester polyols, and/or polycaprolactone polyols in combination with one or more aliphatic polycarbonate polyols as described herein. In certain embodiments, such polyols are characterized in that they have a functionality between 1.9 and 2.5. In certain embodiments, such polyols are characterized in that they have a functionality between 1.95 and 2.2. In certain embodiments, such polyols have a functionality greater than 2.5, in which cases such high-functionality polyols typically compromise a minority of the overall polyol formulation. Polyester polyols that may be present include those which can be obtained by known methods, for example, polyester polyols can be based on the reaction of adipic acid or succinic acid (or their corresponding reactive derivatives or anhydrides) with various diols including, butanediol (BDO), hexanediol (HDO), and ethylene glycol (EG), propane diol (PDO).

Polyether polyols that may be present include those which can be obtained by known methods, for example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 2, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3 butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups, preferably secondary hydroxyl groups from the addition of propylene oxide onto an initiator because these groups are slower to react. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in Encyclopedia of Chemical Technology, Vol. 7, pp. 257-262, published by Interscience Publishers, Inc. (1951) or in U.S. Pat. No. 1,922,459. Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, a-methyl glucoside, sucrose, and sorbitol. Also included within the term "polyhydric alcohol" are compounds derived from phenol such as 2,2-bis(4-hydroxyphenyl)-propane, commonly known as Bisphenol A. Suitable organic amine initiators which may be condensed with alkylene oxides include aromatic amines-such as aniline, N-alkylphenylenediamines, 2,4'-, 2,2'-, and 4,4'-methylenedianiline, 2,6- or 2,4-toluenediamine, vicinal toluenediamines, o-hloroaniline, p-aminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3-diaminobutane, and 1,4-diaminobutane. Preferable amines include monoethanolamine, vicinal toluenediamines, ethylenediamines, and propylenediamine. Yet another class of aromatic polyether polyols contemplated for use in this invention are the Mannich-based polyol an alkylene oxide adduct of phenol/formaldehyde/alkanolamine resin, frequently called a "Mannich" polyol such as disclosed in U.S. Pat. Nos. 4,883,826; 4,939,182; and 5,120,815. In certain embodiments where additional polyols are present, they comprise from about 5 weight percent to about 95 weight percent of the total polyol content with the balance of the polyol mixture made up of one or more aliphatic polycarbonate polyols described in Section I above and in the examples and specific embodiments herein. In certain embodiments, up to about 75 weight percent of the total polyol content of the mixture is aliphatic polycarbonate polyol. In certain embodiments, up to about 50 weight percent of the total polyol content of the mixture is aliphatic polycarbonate polyol. In certain embodiments, up to about 40 weight percent, up to about 30 weight percent, up to about 25 weight percent, up to about 20 weight percent, up to about 15 weight percent, or up to about 10 weight percent of the total polyol content of the mixture is aliphatic polycarbonate polyol. In certain embodiments, at least about 5 weight percent of the total polyol content of the mixture is aliphatic polycarbonate polyol. In certain embodiments, at least about 10 weight percent of the total polyol content of the mixture is aliphatic polycarbonate polyol. In certain embodiments, at least about 15 weight percent, at least about 20 weight percent, at least about 25 weight percent, at least about 40 weight percent, or at least about 50 weight percent, of the total polyol content of the mixture is aliphatic polycarbonate polyol.

In certain embodiments, a minority of the polyol present comprises aliphatic polycarbonate polyol. In certain embodiments, between about 10 weight percent and about 50 weight percent of the total polyol content of the mixture is aliphatic polycarbonate polyol. In certain embodiments, between about 10 weight percent and about 40 weight percent of the total polyol content of the mixture is aliphatic polycarbonate polyol. In certain embodiments, between about 10 weight percent and about 30 weight percent of the total polyol content of the mixture is aliphatic polycarbonate polyol. In certain embodiments, between about 5 weight percent and about 20 weight percent of the total polyol content of the mixture is aliphatic polycarbonate polyol. In certain embodiments, between about 5 weight percent and about 15 weight percent of the total polyol content of the mixture is aliphatic polycarbonate polyol. In certain embodiments, between about 5 weight percent and about 10 weight percent of the total polyol content of the mixture is aliphatic polycarbonate polyol.

In certain embodiments, a majority of the polyol present comprises aliphatic polycarbonate polyol. In certain embodiments, between about 50 weight percent and about 90 weight percent of the total polyol content of the mixture is aliphatic polycarbonate polyol. In certain embodiments, between about 50 weight percent and about 70 weight percent of the total polyol content of the mixture is aliphatic polycarbonate polyol. In certain embodiments, between about 80 weight percent and about 90 weight percent of the total polyol content of the mixture is aliphatic polycarbonate polyol. In certain embodiments, between about 90 weight percent and about 95 weight percent of the total polyol content of the mixture is aliphatic polycarbonate polyol.

B. Chain Extenders

In certain embodiments, the mixtures of the present invention include one or more small molecules reactive toward isocyanates. In certain embodiments, reactive small molecules included in the inventive mixtures comprise low molecular weight organic molecules having one or more functional groups selected from the group consisting of alcohols, amines, carboxylic acids, thiols, and combinations of any two or more of these.

In certain embodiments, the mixtures of the present invention include one or more alcohols. In certain embodiments, the mixtures include polyhydric alcohols.

In certain embodiments, reactive small molecules included in the inventive mixtures comprise dihydric alcohols. In certain embodiments, the dihydric alcohol comprises a $C_{2-40}$ diol. The polyol compound is selected from aliphatic and cycloaliphatic polyol compounds, for example, ethylene glycol, 1,2-ethanediol, 1,2-propanediol, 1,3-propanediol, 1,2-butanediol, 1,2-propylene glycol, 1,3-butane diol, 1,4-butane diol, 1,5-pentane diol, 1,6-hexane diol, 1,8-octane diol, 1,9-nonane diol, 1,10-decane diol, neopentyl glycol, 3-methyl-1,5-pentane diol, 3,3-dimethylolheptane, 1,4-cyclohexane diol, 1,4-cyclohexanedimethanol and 1,4-dihydroxyethyl cyclohexane; and aliphatic and aromatic polyamine compounds, for example, ethylene diamine, 1,2-propylene diamine, 1,6-hexamethylene diamine, isophorone diamine bis(4-aminocyclohexyl)methane, piperazine and meta- or para-xylene diamine; aliphatic, cycloaliphatic and aromatic aminoalcohol compounds, for example, 2-ethanolamine, N-methyldiethanolamine, N-phenyldipropanolamine; hydroxyalkyl sulfamides, for example, hydroxyethyl sulfamide and hydroxyethylaminoethyl sulfamide; urea and water. Among the above-mentioned chain extending compounds, preferably 1,4-butane diol, 2-ethanolamine, and 1,2-propylenediamine are employed. In certain embodiments, the chain extender is selected from the group consisting of: 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these. The above-mentioned chain-extending compounds may be used alone or in a mixture of two or more thereof.

In certain embodiments, a reactive small molecule included in the inventive mixtures comprises a dihydric alcohol selected from the group consisting of: diethylene glycol, triethylene glycol, tetraethylene glycol, higher poly (ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, a reactive small molecule included in the inventive mixtures comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a reactive small molecule included in the inventive mixtures comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, a reactive small molecule comprises a hydroxy-carboxylic acid having the general formula $(HO)_xQ(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxylalkyl) alkanoic acid. In certain embodiments, a coreactant comprises a bis(hydroxylmethyl) alkanoic acid. In certain embodiments the diol carboxylic acid is selected from the group consisting of 2,2 bis-hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a reactive small molecule comprises a polyhydric alcohol comprising one or more amino groups. In certain embodiments, a reactive small molecule comprises an amino diol. In certain embodiments, a reactive small molecule comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, Diisopropanol-p-toluidine, N,N-Bis(hydroxyethyl)-3-chloroaniline, 3-diethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quaternized derivative of any of the amino alcohols described above.

In certain embodiments, a reactive small molecule is selected from the group consisting of: inorganic or organic polyamines having an average of about 2 or more primary and/or secondary amine groups, polyalcohols, ureas, and combinations of any two or more of these. In certain embodiments, a reactive small molecule is selected from the group consisting of: diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, and sulfonated primary and/or secondary amines. In certain embodiments, reactive small molecule is selected from the group consisting of: hydrazine, substituted hydrazines, hydrazine reaction products, and the like, and mixtures thereof. In certain embodiments, a reactive small molecule is a polyalcohol including those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof.

In certain embodiments, reactive small molecules containing at least one basic nitrogen atom are selected from the group consisting of: mono-, bis- or polyalkoxylated aliphatic, cycloaliphatic, aromatic or heterocyclic primary amines, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydro op-phenylenediamine, N-12-hydroxyethyl piperazine, polyalkoxylated amines, propoxylated methyl diethanolamine, N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N,N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methylamine, 2,6-diaminopyridine, 2-dimethylaminomethyl-2-methylpropanel, 3-diol. In certain embodiments, chain-extending agents are compounds that contain two amino groups. In certain embodiments, chain-extending agents are selected from the group consisting of: ethylene diamine, 1,6-hexamethylene diamine, and 1,5-diamino-1-methylpentane.

C. Catalysts

In certain embodiments, no catalysts are used in the mixtures. In certain embodiments, in the polymerization reaction for the polyurethane, a conventional catalyst comprising an amine compound or tin compound can be employed to promote the reaction. These embodiments are most commonly found in reactive extrusion methods of polyurethane adhesive production. Any suitable urethane catalyst may be used, including tertiary amine compounds and organometallic compounds may be used. Exemplary tertiary amine compounds include triethylenediamine, N-methylmorpholine, N,N-dimethylcyclohexylamine, pentamethyldiethylenetriamine, tetramethylefhylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation.

In certain embodiments, where mixtures of the present invention comprise catalysts, the catalysts comprise tin based materials. In certain embodiments, tin catalysts are selected from the group consisting of: di-butyl tin dilaurate, dibutylbis(laurylthio)stannate, dibutyltinbis(isooctylmercapto acetate) and dibutyltinbis(isooctylmaleate), tin octanoate and mixtures of any two or more of these.

In certain embodiments, catalysts included in the mixtures comprise tertiary amines. In certain embodiments, catalysts included in the mixtures are selected from the group consisting of: DABCO, pentamethyldipropylenetriamine, bis (dimethylamino ethyl ether), pentamethyldiethylenetriamine, DBU phenol salt, dimethylcyclohexylamine, 2,4,6-tris(N,N-dimethylaminomethyl)phenol (DMT-30), triazabicyclodecene (TBD), N-methyl TBD, 1,3,5-tris(3-dimethylaminopropyl)hexahydro-s-triazine, ammonium salts and combinations or formulations of any of these.

Typical amounts of catalyst are 0.001 to 10 parts of catalyst per 100 parts by weight of total polyol in the mixture. In certain embodiments, catalyst levels in the formulation, when used, range between about 0.001 pph (weight parts per hundred) and about 3 pph based on the amount of polyol present in the mixture. In certain embodiments, catalyst levels range between about 0.05 pph and about 1 pph, or between about 0.1 pph and about 0.5 pph.

D. Mono-Functional Materials

In certain embodiments, monofunctional components are added. Suitable monofunctional components can include molecules having a single isocyanate-reactive functional group such as an alcohol, amine, carboxylic acid, or thiol. A monofunctional component will serve as a chain termination which can be used to limit molecular weight or crosslinking if higher functionality species are used. U.S. Pat. No. 5,545,706 illustrates the use of a monofunctional alcohol in a substantially linear polyurethane formulation. The monofunctional alcohol can be any compound with one alcohol available for reaction with isocyanate such as methanol, ethanol, propanol, isopropanol, butanol, isobutanol, pentanol, hexanol, heptanol, octanol, nonanol, decanol, dodecanol, phenol and the like. Additionally, the monofunctional component can be added as a low molecular weight polymer that has been initiated by or reacted with the monofunctional alcohol. The monofunctional alcohol can be a polyether such as polypropylene oxide or polyethylene oxide initiated with any of the monofunctional alcohols listed. The monofunctional alcohol can be a polyester polymer where the monofunctional alcohol is added to the recipe. The monofunctional alcohol can be a polycarbonate polymer such as polyethylene carbonate or polypropylene carbonate initiated with a monofunctional anion, such as halide, nitrate, azide, carboxylate, or a monohydric alcohol.

Similarly, the monofunctional component could be an isocyanate. Any monofunctional isocyanate could be added for this same function. Possible materials include phenyl isocyanate, naphthyl isocyanate, methyl isocyanate, ethyl isocyanate, propyl isocyanate, butyl isocyanate, hexyl isocyanate, octyl isocyanate and the like.

E. Additives

In addition to the above components, mixtures of the present invention may optionally contain various additives as are known in the art of polyurethane adhesive technology. Such additives may include, but are not limited to solvents, fillers, clays, blocking agents, stabilizers, thixotropes, plasticizers, compatibilizers, colorants, UV stabilizers, flame retardants, and the like.

1. Solvents

If desired, the polyurethane adhesives or pre-polymers can be dispersed in a solvent which can include water or organic solvents known to those skilled in the art. Suitable solvents can include aliphatic, aromatic, or halogenated hydrocarbons, ethers, esters, ketones, lactones, sulfones, nitriles, amides, nitromethane, propylene carbonate, dimethyl carbonate and the like. Representative examples include, but are not limited to: acetone, acetonitrile, benzene, butanol, butyl acetate, g-butyrolactone, butyl caribitl acetate, carbitol acetate, chloroform, cyclohexane, 1,2-dichloromethane, dibasic ester, diglyme, 1,2-dimethoxyethane, dimethylacetamide, dimethylsulfoxide, dimethformamide, 1,4-dioxane, ethanol, ethyl acetate, ethyl ether, ethylene glycol, hexane, hydroxylmethyl methacrylate, isopropyl acetate, methanol, methyl acetate, methyl amyl ketone, methyl isobutyl ketone, methylene chloride, methyl ethyl ketone, monoglyme, methyl methacrylate, propylene carbonate, propylene oxide, styrene, alpha-terpineol, tetrahydrofuran, texanol, toluene, diethyl succinate, diethylene glycol methyl ether, ethylene glycol diacetate, triethyl phosphate and the like.

2. Fillers

Optional components of the adhesive of the invention include fillers. Such fillers are well known to those skilled in the art and include carbon black, titanium dioxide, calcium carbonate, surface treated silicas, titanium oxide, fume silica, talc, aluminum trihydrate and the like. In certain embodiments, fillers comprise carbon black. In certain embodiments, more than one reinforcing filler may be used, of which one is carbon black and a sufficient amount of carbon black is used to provide the desired black color to the adhesive. In certain embodiments, a reinforcing filler is used in sufficient amount to increase the strength of the adhesive and/or to provide thixotropic properties to the adhesive. The amounts of filler or other additives will vary depending on the desired application.

3. Clays

Among optional materials in the adhesive composition are clays. Preferred clays useful in the invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray-dried beads or finely ground particles.

4. Blocking Agents

One or more blocking agents are utilized to provide an induction period between the mixing of the two parts of the adhesive composition and the initiation of the cure. The addition of the blocking agents provides an induction period which causes a reduction in the curing rate immediately after mixing of the components of the adhesive. The reduction in the curing rate results in lower initial tensile shear strengths and storage moduli immediately after mixing than those found in compositions that do not contain a blocking agent. Following the induction period the adhesive quickly cures so that the tensile shear strength and storage modulus are similar to those produced by adhesives that do not contain the blocking agent. Such thixotropes are well known to those skilled in the art and include hydroxyl containing compounds such as diethylene glycol, mono alkyl ethers, butanone oxime, methyl ethyl ketone oxime, nonylphenol, phenol and cresol; amine containing compounds such as caprolactam, diisopropyl amine, 1,2,4-triazole and 3,5-dimethylpyrazole; and aliphatic containing compounds such as dialkyl malonate.

5. Stabilizers

An adhesive of this invention may further comprise stabilizers which function to protect the adhesive composition from moisture, thereby inhibiting advancement and preventing premature crosslinking of the isocyanates in the adhesive formulation. Included among such stabilizers are diethylmalonate and alkylphenol alkylates.

6. Thixotrope

Optionally, the adhesive composition may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the adhesive of composition in a sufficient amount to give the desired rheological properties.

7. Plasticizers

Adhesive compositions of the present invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the adhesive composition is that amount which gives the desired rheological properties and/or which is sufficient to disperse any catalyst that may be present in the system.

8. Compatibilizers

In certain embodiments, the mixtures of the present invention comprise one or more suitable compatibilizers. Compatibilizers are molecules that allow two or more non-miscible ingredients to come together and give a homogeneous liquid phase. Many such molecules are known to the polyurethane industry, these include: amides, amines, hydrocarbon oils, phthalates, polybutyleneglycols, and ureas.

9. Colorants

In certain embodiments, the mixtures of the present invention comprise one or more suitable colorants. Typical inorganic coloring agents included titanium dioxide, iron oxides and chromium oxide. Organic pigments originated from the azo/diazo dyes, phthalocyanines and dioxazines, as well as carbon black. Recent advances in the development of polyol-bound colorants are described in:

Miley, J. W.; Moore, P. D. "Reactive Polymeric Colorants For Polyurethane", Proceedings Of The SPI-26th Annual Technical Conference; Technomic: Lancaster, Pa., 1981; 83-86.

Moore, P. D.; Miley, J. W.; Bates, S. H.; "New Uses For Highly Miscible Liquid Polymeric Colorants In The Manufacture of Colored Urethane Systems"; Proceedings of the SPI-27th Annual Technical/Marketing Conference; Technomic: Lancaster, Pa., 1982; 255-261.

Bates, S. H.; Miley, J. W. "Polyol-Bound Colorants Solve Polyurethane Color Problems"; Proceedings Of The SPI-30th Annual Technical/Marketing Conference; Technomic: Lancaster, Pa., 1986; 160-165

Vielee, R. C.; Haney, T. V. "Polyurethanes"; In Coloring of Plastics; Webber, T. G., Ed., Wiley-Interscience: New York, 1979, 191-204.

10. UV Stabilizers

In certain embodiments, the mixtures of the present invention comprise one or more suitable UV stabilizers. Polyurethanes based on aromatic isocyanates will typically turn dark shades of yellow upon aging with exposure to light. A review of polyurethane weathering phenomena is presented in: Davis, A.; Sims, D. Weathering Of Polymers; Applied Science: London, 1983, 222-237. Light protection agents, such as hydroxybenzotriazoles, zinc dibutyl thiocarbamate, 2,6-ditertiary butylcatechol, hydroxybenzophenones, hindered amines and phosphites have been used to improve the light stability of polyurethanes. Color pigments have also been used successfully.

11. Flame Retardants

In certain embodiments, the mixtures of the present invention comprise one or more suitable flame retardants. Flame retardants are often added to reduce flammability. The choice of flame retardant for any specific polyurethane adhesive often depends upon the intended service application of that adhesive and the attendant flammability testing scenario governing that application. Aspects of flammability that may be influenced by additives include the initial ignitability, burning rate and smoke evolution.

The most widely used flame retardants are the chlorinated phosphate esters, chlorinated paraffins and melamine powders. These and many other compositions are available from specialty chemical suppliers. A review of this subject has been given: Kuryla, W. C.; Papa, A. J. Flame Retardancy of Polymeric Materials, Vol. 3; Marcel Dekker: New York, 1975, 1-133.

V. Polyurethane Adhesive Compositions

In another aspect, the present invention encompasses polyurethane adhesives derived from one or more of aliphatic polycarbonate polyol compositions described above and in the specific embodiments and examples disclosed herein. In certain embodiments, the polyurethane adhesive compositions comprise the reaction product of one or more isocyanates and a mixture containing one or more of the aliphatic polycarbonate polyol compositions defined above.

A. Reactive 1-Component Polyurethane Adhesives

In one aspect, the present invention encompasses reactive one-component adhesives. In certain embodiments, such one-component adhesives compositions are derived from a mixture containing one or more of the aliphatic polycarbonate polyol compositions as defined above and in the embodiments and examples herein.

In certain embodiments the one-component adhesives are prepolymers made with one or more aliphatic polycarbonate polyols; these prepolymers typically have low isocyanate values and are produced by reacting an excess of isocyanate with a relatively high molecular weight polyol. These adhesives are typically cured with water which can be added or which is present in the atmosphere or the material being bonded.

In certain embodiments MDI is the preferred isocyanate to react with one or more aliphatic polycarbonate polyols and optionally one or more other polyols as described above. In certain embodiments requiring unique adhesive performance properties, TDI and/or aliphatic isocyanates are used in place of, or in addition to, MDI.

In certain embodiments the one component adhesives comprise 100% solids (e.g. no solvent is present at the time of application). In certain embodiments, the one component adhesives formulations may be dissolved, dispersed, and/or emulsified in a solvent or water to reduce viscosity or otherwise improve the applicability of the one component adhesive in these applications.

In certain embodiments no catalysts are used. In certain embodiments catalysts are included in the formulation to increase the reaction rate of free isocyanate and water.

In certain embodiments, hydroxyethyl acrylate groups may be included in the aliphatic polycarbonate polyol, other polyols, and/or the derivative prepolymers to introduce ultraviolet light curing properties.

In certain embodiments, fatty acid groups and/or other molecules with unsaturation functionality may be included in the aliphatic polycarbonate polyol, other polyols, and/or the derivative prepolymers to enable cross linking via oxidation.

In certain embodiments, the 1-component adhesive mixture forms a final, cured polyurethane adhesive with the following composition:

1-80 parts by weight of one or more isocyanate components or pre-polymers based on isocyanate components as described above and in the specific embodiments and examples herein;

20-99 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;

0 to 1 parts by weight of one or more catalysts as described above and in the specific embodiments and examples herein;

0 to 20 parts by weight of one or more chain extenders, wherein the chain extenders molecules are substantially as described above and in the specific embodiments and examples herein; and 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

B. Reactive 2-Component Polyurethane Adhesives

In another aspect, the present invention encompasses reactive two-component adhesive compositions. In certain embodiments, such two-component adhesive compositions are derived from a mixture containing one or more of the aliphatic polycarbonate polyols as defined above and in the embodiments and examples herein.

In certain embodiments the two-component adhesives include prepolymers derived from one or more aliphatic polycarbonate polyols. These prepolymers can be produced with excess isocyanate and/or excess hydroxyl content and are then mixed with one or more of the isocyanates, aliphatic polycarbonate polyols, other polyols, and other components described above.

In certain embodiments, the two-component adhesives are formulated to an isocyanate index range of 90 to 150. In certain embodiments, isocyanate indexes above 100 are used to increase hardness of the adhesive and to improve bonding to substrates, in particular those substrates with hydroxyl groups on their surfaces. In certain embodiments, isocyanate indexes below 100 are used to produce softer and more flexible adhesives.

In certain embodiments MDI is the preferred isocyanate used in the formulation of the two-component adhesives. In certain embodiments TDI is the preferred isocyanate used in the formulation of the two-component adhesives. In certain embodiments these isocyanates have a functionality greater than two, and may be polymeric. In certain embodiments other isocyanates are used, including aliphatic isocyanates in cases where resistance to ultraviolet light is a requirement.

In certain embodiments only a single aliphatic polycarbonate polyol is used in the formulation of the two-component adhesive. In certain embodiments one or more polycarbonate polyols are mixed with one or more additional polyols as described above. In certain embodiments these polyols have molecular weights between 200 and 10,000 grams per mol, preferably between 300 and 5,000 grams per mol.

In certain embodiments, the two-component adhesives are formulated with isocyanates and/and or polyols which are 2.0 functional or lower. In certain embodiments the adhesives are formulated with isocyanates and/or polyols functionality greater than 2.0 (in other words, some degree of branching) to introduce cross-linking in the cured two-component adhesives. In certain embodiments, the total level of crosslinking is relatively high to produce adhesives with high modulus, high hardness, and good tensile, shear stress, and peel strength properties. In certain embodiments, the total level of crosslinking is relatively low to produce adhesives with greater elasticity.

In certain embodiments the two-component adhesives are applied as 100% solids. In certain embodiments, the two component adhesives may be dissolved, dispersed, and/or emulsified in a solvent or water to reduce viscosity or otherwise improve their applicability. In certain embodiments, solvents such as acetone, methyl ethyl ketone, ethylacetate, toluene, or xylene are preferred.

In certain embodiments no fillers are present in the two-component adhesives. In other embodiments calcium carbonate, talc, clays, or the like are added as fillers to control rheology, reduce shrinkage, reduce cost, and/or for other reasons. In certain embodiments the two-component adhesives include thixotropic agents, flow agents, film-forming additives, and/or catalysts to achieve the processing and finished adhesives properties required.

In certain embodiments, the 2-component adhesive mixture forms a final, cured polyurethane adhesive with the following composition:
- 10-40 parts by weight of one or more isocyanate components or pre-polymers based on isocyanate components as described above and in the specific embodiments and examples herein;
- 60-90 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

Figure 8:
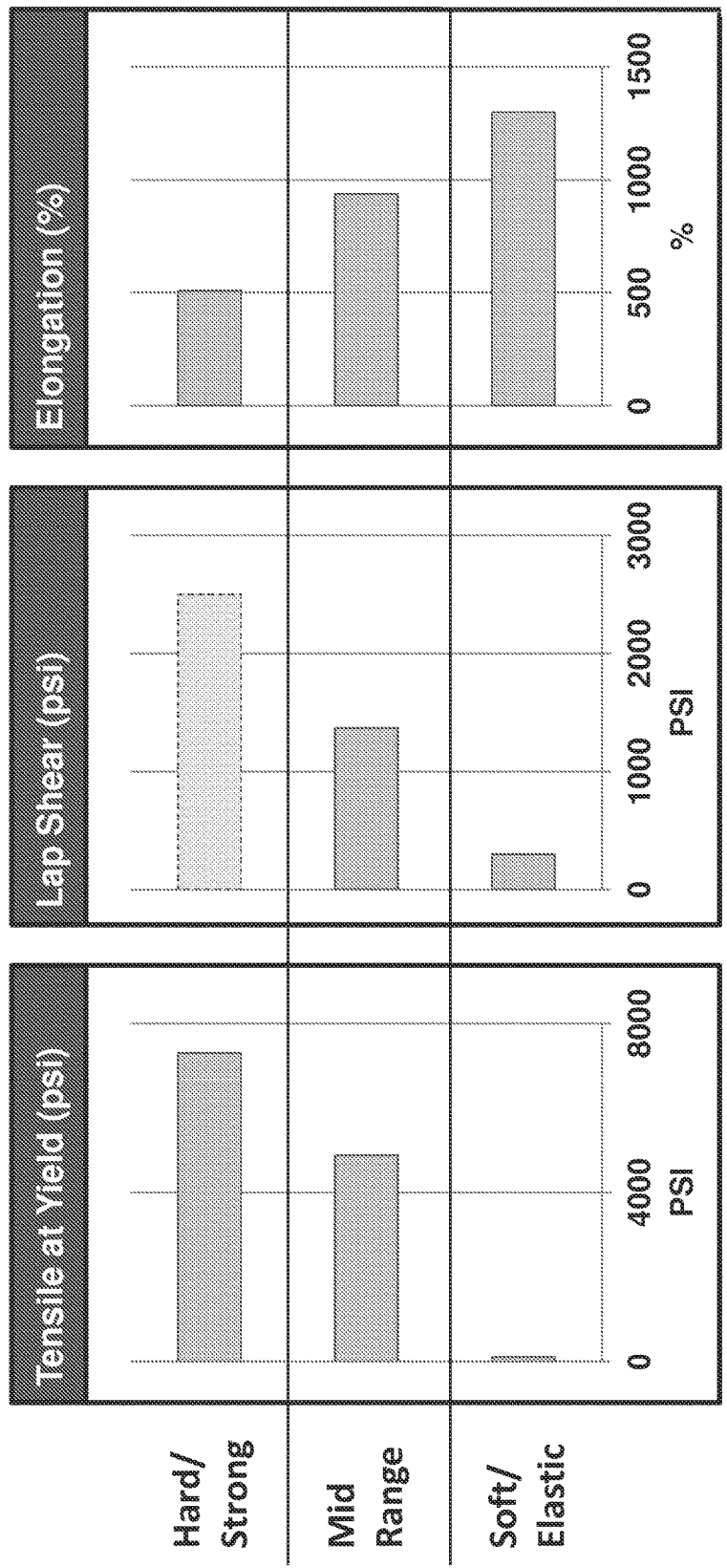
FIG. 8 shows the strength and elongation of several blended adhesive formulations of the present invention.

In certain embodiments, the present invention encompasses adhesives formulated from a polyol blend comprising one or more of the aliphatic polycarbonate polyol as described hereinabove, and one or more commercially available polyester or polyether polyols. In certain embodiments, the aliphatic polycarbonate content of such blends ranges from about 10 to about 90%. Such blends can be formulated to provide a range of hardness or elasticity as shown in FIG. 8. In certain embodiments, the present invention encompasses adhesive compositions derived from a polyol blend comprising about 10%, about 20%, about 30%, about 40%, about 50%, about 60%, about 70%, or about 80% aliphatic polycarbonate polyol with the balance comprising a polyester polyol. In certain embodiments, such blends comprise poly(butylene adipate) glycol as the polyester polyol. In certain embodiments, the present invention encompasses adhesive compositions derived from a polyol blend comprising about 10%, about 20%, about 30%, about 40%, about 50%, about 60%, about 70%, or about 80% aliphatic polycarbonate polyol with the balance comprising a polyether polyol. In certain embodiments, such blends comprise polyethylene glycol, or polypropylene glycol as the polyether polyol component.

C. Hot-Melt Polyurethane Adhesives

In one aspect, the present invention encompasses reactive hot melt adhesives. In certain embodiments, such reactive hot melt adhesive compositions are derived from a mixture containing one or more of the aliphatic polycarbonate polyol compositions as defined above and in the embodiments and examples herein.

In certain embodiments the hot-melt adhesives include prepolymers derived from one or more aliphatic polycarbonate polyols. These prepolymers can be produced with excess isocyanate and/or excess hydroxyl content and are then mixed with one or more of the isocyanates, aliphatic polycarbonate polyols, other polyols, and other components described above. In certain embodiments the molar ratio of isocyanate to polyol is between 1.5:1 and 4:1, preferably between 1.9:1 and 3:1, and often very near 2:1.

In certain embodiments, MDI is the preferred isocyanate to react with one or more aliphatic polyols and possibly one or more other polyols as described above. In certain embodiments requiring unique hot melt adhesive performance properties, TDI and/or aliphatic isocyanates are used in place of or in addition to MDI.

In certain embodiments the reactive hot melt adhesive prepolymers are produced by reacting an excess of isocyanate with a relatively high molecular weight polyol. These prepolymers thus have an excess of isocyanate, or "free" isocyanate groups, which react with atmospheric moisture to improve the finished properties of the reactive hot melt adhesive. In certain embodiments the amount of free isocyant is about 1-5 percent by weight.

In certain embodiments the polyols, isocyanates, and/or prepolymers comprising the primary components of the reactive hot melt adhesive are formulated such that the viscosity of the adhesive formulation is sufficiently low at the application temperature to enable efficient application to the substrate. The reactive hot melt viscosity increases as it cools to rapidly provide good adhesive properties.

In certain embodiments, the reactive hot melt polyurethane adhesive mixture forms a final, cured polyurethane adhesive with the following composition:
- 5-40 parts by weight of one or more isocyanate components or pre-polymers based on isocyanate components as described above and in the specific embodiments and examples herein;
- 60-95 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

D. Non-Reactive Solvent-Borne Polyurethane Adhesive

In another aspect, the present invention encompasses non-reactive solvent-borne adhesives. In certain embodiments, such solvent-borne adhesives compositions are derived from one or more of the aliphatic polycarbonate polyol compositions as defined above and in the embodiments and examples herein.

In certain embodiments the solvent-borne adhesives are produced by reacting one or more aliphatic polycarbonate polyols with one or more isocyanates and possibly with one or more additional polyols and/or all other additives described above to create higher molecular weight prepolymers and/or polyurethane adhesives. These high molecular weight polyurethanes are then dissolved in one or more solvents for application onto various substrates. In these embodiments the solvent-borne adhesive is described as a one-component system. Additional fillers and performance enhancing additives may be included in the formulation.

In certain embodiments, solvent-borne cross-linkers are added to solvent-born polyurethane adhesives as described above to improve the strength and resistance of the finished adhesive. The crosslinkers may be any combination of aliphatic polycarbonate polyols, additional polyols, and isocyanates described above and may also be other types of thermosetting components. In these embodiments the solvent-borne adhesive is described as a two-component reactive system and are thus similar and/or equivalent to the two-component reactive adhesives described above, in the embodiments in which these systems are dissolved in one or more solvents.

In certain embodiments, the non-reactive solvent-borne adhesive mixture forms a final, cured polyurethane adhesive with the following composition:
- 5-30 parts by weight of one or more isocyanate components or pre-polymers based on isocyanate components as described above and in the specific embodiments and examples herein;
- 70-95 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

E. Non-Reactive Water-Borne Adhesive

In one aspect, the present invention encompasses reactive water-borne adhesives. In certain embodiments, such water-borne adhesives compositions are derived from a mixture containing one or more of the aliphatic polycarbonate polyol compositions as defined above and in the embodiments and examples herein.

In certain embodiments the water-borne adhesives are produced by reacting one or more aliphatic polycarbonate polyols with one or more isocyanates and possibly with one or more additional polyols and/or all other additives described above to create higher molecular weight prepolymers and/or polyurethane adhesives, which are then dispersed in water and known as polyurethane dispersions (PUDs). In certain embodiments, they may contain low levels of solvents to help stabilize the polymers in water.

In certain embodiments, the solids content of the final PUD adhesive is in the range of 25-75%, preferably in the range of 35-50%. In certain embodiments, the water-borne adhesives are formulated to be on the very high or low end of these ranges depending on viscosity requirements, other processing considerations, and finished adhesive properties required.

In certain embodiments, water-borne cross-linkers are added to water-born PUDs as described above to improve the performance of the finished adhesive. The crosslinkers may be any combination of aliphatic polycarbonate polyols, additional polyols, and isocyanates described above and may also be other types of thermosetting components. In these embodiments the water-borne adhesive is akin to the two-component reactive system described above (except it is dispersed in an aqueous system) in the embodiments in which these systems are dispersed or emulsified in water.

In certain embodiments, the non-reactive water-borne adhesive mixture forms a final, cured polyurethane adhesive with the following composition:
- 20-50 parts by weight of one or more isocyanate components or pre-polymers based on isocyanate components as described above and in the specific embodiments and examples herein;
- 50-80 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

F. Non-Reactive Hot Melt Adhesives

In one aspect, the present invention encompasses non-reactive hot melt adhesives. In certain embodiments, such non-reactive hot melt adhesives compositions are derived from a mixture containing one or more of the aliphatic polycarbonate polyol compositions as defined above and in the embodiments and examples herein.

In certain embodiments the non-reactive hot melt adhesives are produced by reacting one or more aliphatic polycarbonate polyols with one or more isocyanates and possibly with one or more additional polyols and/or all other additives described above to create higher molecular weight polymers and/or polyurethane adhesives. Additional fillers and performance enhancing additives may be included in the formulation.

In certain embodiments the polyols, isocyanates, prepolymers and/or polyurethane adhesives comprising the primary components of the non-reactive hot melt adhesive are formulated such that the viscosity of the adhesive formulation is sufficiently low at the application temperature to enable efficient application to the substrate. The non-reactive hot melt viscosity increases as it cools to rapidly provide good adhesive properties. In certain applications, they are formulated to have melt viscosities between 25,000 and 500,000 mPa*s, more preferable between 50,000 to 250,000 mPa*s.

In certain embodiments, the non-reactive hot-melt adhesive mixture forms a final, cured polyurethane adhesive with the following composition:
- 1-80 parts by weight of one or more isocyanate components or pre-polymers based on isocyanate components as described above and in the specific embodiments and examples herein;
- 20-99 parts by weight of a polyol component or a polyol-based pre-polymer component, wherein the polyol component comprises from about 5 weight percent to 100 weight percent of one or more of the aliphatic polycarbonate polyols described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardants as described above and in the specific embodiments and examples herein.

G. Hybrid Systems

In certain embodiments, any of the above reactive and non-reactive adhesive formulations are combined with other adhesive chemistries in hybrid systems. In certain embodiments, the finished adhesives are urethane acrylic systems which can take a number of forms, including aqueous systems using water-dispersable isocyanates with PUDs and acrylic emulsion polymers, mixing acrylic and hydroxyl polyols to create co-polymerized resins, and the like. In certain embodiments, vinyl-terminated acrylic polymers are used to improve impact resistance. In certain embodiments, polyurethanes with acrylic functionality are also used in anaerobic or radiation-cured adhesives to increase toughness. In certain embodiments, urethanes are combined with epoxy chemistries using amine curing systems to create fast-curing adhesives for structural and heavy duty applications.

VI. Adhesives with Improved Properties

Adhesives provide by the present invention have unique and unexpected properties. As described above, the epoxide-$CO_2$ based polyols incorporated into adhesives of the present invention differ from existing commercial polycarbonate polyols which have more than two carbon atoms enchained between adjacent carbonate linkages. Without being bound by theory or thereby limiting the scope of the invention, one possibility is that the higher density of carbonate functional groups per unit chain length of the $CO_2$-based polyols as compared to existing polycarbonate polyols leads to the unexpected increases in desirable properties such as adhesion, high temperature strength, and solvent resistance.

A. Improved High Temperature Strength

In certain embodiments, the present invention encompasses adhesives comprising polyols derived from the copolymerization of $CO_2$ and one or more epoxides and characterized in that the cured adhesives have unexpectedly high strength at elevated temperatures. The high strength at elevated temperature can be demonstrated by measuring the strength of the cured adhesive strength on metal substrate using the ASTM D1002 lap sheer test at ambient temperature and then performing the same measurement at one or more elevated temperatures.

In certain embodiments, adhesives of the present invention (i.e. any of the adhesive compositions described hereinabove) are characterized in that the strength of the cured adhesive measured using ASTM D1002 at 50° C. retains at least 60% of the strength measured using the same procedure at 25° C. In certain embodiments, adhesives of the present invention are characterized in that the strength of the cured adhesive measured at 50° C. is least 65%, at least 70%, at least 75%, at least 80%, at least 85%, at least 90%, at least 92%, at least 95%, or at least 98% of the strength measured using the same procedure at 25° C. In certain embodiments, adhesives of the present invention are characterized in that the strength of the cured adhesive measured at 50° C. is between 50 and 100% of the strength measured using the same procedure at 25° C. In certain embodiments, adhesives of the present invention are characterized in that the strength of the cured adhesive measured at 50° C. is between 50% and 80%, between 70% and 80%, between 60% and 80%, between 70% and 100%, or between 80% and 100% of the strength measured using the same procedure at 25° C. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described hereinabove) are characterized in that the strength of the cured adhesive indicated by Load at Failure measured using ASTM D1002 at 50° C. is at least 60% of the Load at Failure measured using the same procedure at 25° C. In certain embodiments, adhesives of the present invention are characterized in that the Load at Failure of the cured adhesive measured at 50° C. is least 65%, at least 70%, at least 75%, at least 80%, at least 85%, at least 90%, at least 92%, at least 95%, or at least 98% of the Load at Failure measured using the same procedure at 25° C. In certain embodiments, adhesives of the present invention are characterized in that the Load at Failure of the cured adhesive measured at 50° C. is between 50 and 100% of the Load at Failure measured using the same procedure at 25° C. In certain embodiments, adhesives of the present invention are characterized in that the Load at Failure of the cured adhesive measured at 50° C. is between 50% and 80%, between 70% and 80%, between 60% and 80%, between 70% and 100%, or between 80% and 100% of the Load at Failure measured using the same procedure at 25° C.

In certain embodiments, adhesives of the present invention (i.e. any of the adhesive compositions described hereinabove) are characterized in that the strength of the cured adhesive indicated by the Tensile Energy to Break measured using ASTM D1002 at 50° C. is at least 60% of the Tensile Energy to Break measured using the same procedure at 25° C. In certain embodiments, adhesives of the present invention are characterized in that the Tensile Energy to Break the cured adhesive measured at 50° C. is least 65%, at least 70%, at least 75%, at least 80%, at least 85%, at least 90%, at least 92%, at least 95%, or at least 98% of the Tensile Energy to Break measured using the same procedure at 25° C. In certain embodiments, adhesives of the present invention are characterized in that the Tensile Energy to Break the cured adhesive measured at 50° C. is between 50 and 100% of the Tensile Energy to Break measured using the same procedure at 25° C. In certain embodiments, adhesives of the present invention are characterized in that the Tensile Energy to Break the cured adhesive measured at 50° C. is between 50% and 80%, between 70% and 80%, between 60% and 80%, between 70% and 100%, or between 80% and 100% of the Tensile Energy to Break measured using the same procedure at 25° C.

In certain embodiments, adhesives of the present invention (i.e. any of the adhesive compositions described hereinabove) are characterized in that the strength of the cured adhesive indicated by Stress at Yield or Strain at Yield measured using ASTM D1002 at 50° C. is at least 60% of the corresponding parameter measured using the same procedure at 25° C. In certain embodiments, adhesives of the present invention are characterized in that the Stress at Yield or Strain at Yield of the cured adhesive measured at 50° C. is least 65%, at least 70%, at least 75%, at least 80%, at least 85%, at least 90%, at least 92%, at least 95%, or at least 98% of the corresponding parameter measured using the same procedure at 25° C. In certain embodiments, adhesives of the present invention are characterized in that the Stress at Yield or Strain at Yield of the cured adhesive measured at 50° C. is between 50 and 100% of the corresponding parameter measured using the same procedure at 25° C. In certain embodiments, adhesives of the present invention are characterized in that the Stress at Yield or Strain at Yield of the cured adhesive measured at 50° C. is between 50% and 80%, between 70% and 80%, between 60% and 80%, between 70% and 100%, or between 80% and 100% of the corresponding parameter measured using the same procedure at 25° C.

In certain embodiments, adhesives of the present invention (i.e. any of the adhesive compositions described hereinabove) are characterized in that the strength of the cured adhesive measured using ASTM D1002 at 50° C. is greater than the strength at 25° C. In certain embodiments, adhesives of the present invention are characterized in that the strength of the cured adhesive measured using ASTM D1002 at 50° C. is at least 10% higher than the strength measured using the same procedure at 25° C. In certain embodiments, adhesives of the present invention are characterized in that the strength of the cured adhesive at 50° C. is at least 15%, at least 20%, at least 30%, at least 40%, at least 50%, at least 75%, at least 100%, or at least 150% greater than the strength measured using the same procedure at 25° C. In certain embodiments, adhesives of the present invention are characterized in that the strength of the cured adhesive measured at 50° C. is between 100% and 200%, between 100% and 150%, between 120% and 180%, between 120% and 150%, or between 100% and 120% of the strength measured using the same procedure at 25° C. In certain embodiments, the strengths compared above are indicated by a measurement selected from the group consisting of: Load at Failure; Tensile Energy to Break; Stress at Yield; and Strain at Yield. In certain embodiments, the strengths compared above are indicated by a measurement selected from the group consisting of: Load at Failure; Tensile Energy to Break; and Strain at Yield.

In certain embodiments, adhesives of the present invention (i.e. any of the adhesive compositions described hereinabove) are characterized in that the strength of the cured adhesive indicated by Load at Failure measured using ASTM D1002 at 50° C. is greater than the Load at Failure at 25° C. In certain embodiments, adhesives of the present invention are characterized in that the Load at Failure of the cured adhesive measured using ASTM D1002 at 50° C. is at least 10% higher than the Load at Failure measured using the same procedure at 25° C. In certain embodiments, adhesives of the present invention are characterized in that the Load at Failure of the cured adhesive at 50° C. is at least 15%, at least 20%, at least 30%, at least 40%, at least 50%, at least 75%, at least 100%, or at least 150% greater than the Load at Failure at 25° C. In certain embodiments, adhesives of the present invention are characterized in that the Load at Failure of the cured adhesive measured at 50° C. is between 100% and 200%, between 100% and 150%, between 120% and 180%, between 120% and 150%, or between 100% and 120% of the Load at Failure measured using the same procedure at 25° C.

In certain embodiments, adhesives of the present invention (i.e. any of the adhesive compositions described hereinabove) are characterized in that the strength of the cured adhesive indicated by the Tensile Energy to Break measured using ASTM D1002 at 50° C. is greater than the Tensile Energy to Break at 25° C. In certain embodiments, adhesives of the present invention are characterized in that the Tensile Energy to Break the cured adhesive measured using ASTM D1002 at 50° C. is at least 10% higher than the Tensile Energy to Break measured using the same procedure at 25° C. In certain embodiments, adhesives of the present invention are characterized in that the Tensile Energy to Break the cured adhesive at 50° C. is at least 15%, at least 20%, at least 30%, at least 40%, at least 50%, at least 75%, at least 100%, or at least 150% greater than the Tensile Energy to Break the adhesive at 25° C. In certain embodiments, adhesives of the present invention are characterized in that the Tensile Energy to Break the cured adhesive measured at 50° C. is between 100% and 200%, between 100% and 150%, between 120% and 180%, between 120% and 150%, or between 100% and 120% of the Tensile Energy to Break the adhesive at 25° C.

In certain embodiments, adhesives of the present invention (i.e. any of the adhesive compositions described hereinabove) are characterized in that the strength of the cured adhesive indicated by the Strain at Yield measured using ASTM D1002 at 50° C. is greater than the Strain at Yield at 25° C. In certain embodiments, adhesives of the present invention are characterized in that the Strain at Yield of the cured adhesive measured using ASTM D1002 at 50° C. is at least 10% higher than the Strain at Yield measured using the same procedure at 25° C. In certain embodiments, adhesives of the present invention are characterized in that the Strain at Yield of the cured adhesive at 50° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 50° C. is between 100% and 200%, between 100% and 150%, between 120% and 180%, between 120% and 150%, or between 100% and 120% of the Strain at Yield of the adhesive at 25° C.

In certain embodiments, adhesives of the present invention (i.e. any of the adhesive compositions described hereinabove) are characterized in that the strength of the cured adhesive measured using ASTM D1002 at 70° C. retains at least 40% of the strength measured using the same procedure at 25° C. In certain embodiments, adhesives of the present invention are characterized in that the strength of the cured adhesive measured at 50° C. is least 55%, at least 60%, at least 65%, at least 70%, at least 75%, or at least 80% of the strength measured using the same procedure at 25° C. In certain embodiments, adhesives of the present invention are characterized in that the strength of the cured adhesive measured at 70° C. is between 40% and 100% of the strength measured using the same procedure at 25° C. In certain embodiments, adhesives of the present invention are characterized in that the strength of the cured adhesive measured at 70° C. is between 40% and 80%, between 40% and 60%, between 50% and 80%, between 50% and 70%, or between 70% and 90% of the strength measured using the same procedure at 25° C. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described hereinabove) are characterized in that the strength of the cured adhesive indicated by the Strain at Yield measured using ASTM D1002 at 70° C. is greater than the Strain at Yield at 25° C. In certain embodiments, adhesives of the present invention are characterized in that the Strain at Yield of the cured adhesive measured using ASTM D1002 at 70° C. is at least 10% higher than the Strain at Yield measured using the same procedure at 25° C. In certain embodiments, adhesives of the present invention are characterized in that the Strain at Yield of the cured adhesive at 70° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 70° C. is between 100% and 200%, between 100% and 150%, between 120% and 180%, between 120% and 150%, or between 100% and 120% of the Strain at Yield of the adhesive at 25° C.

In certain embodiments, the present invention encompasses adhesive compositions comprising epoxide-$CO_2$-based polyols characterized in that the cured adhesive has the following properties as measured with ASTM D1002:—a Load at Failure at 50° C. between 75% and 200% of the Load at Failure at 25° C.; and
a Tensile Energy to Break at 50° C. that exceeds the Tensile Energy to break at 25° C.

In certain embodiments, the present invention encompasses adhesive compositions comprising epoxide-$CO_2$-based polyols characterized in that the cured adhesive has the following properties as measured with ASTM D1002:
a Stress at Yield at 50° C. that is at least 60% of the Stress at Yield at 25° C.; and
a Strain at Yield at 50° C. that exceeds the Strain at Yield at 25° C.

In certain embodiments, the present invention encompasses adhesive compositions comprising epoxide-$CO_2$-based polyols characterized in that the cured adhesive has the following properties as measured with ASTM D1002:
a Load at Failure at 50° C. of between 75% and 200% of the Load at Failure at 25° C.;
a Tensile Energy to Break at 50° C. that exceeds the Tensile Energy to break at 25° C.;
a Stress at Yield at 50° C. that is at least 60% of the Stress at Yield at 25° C.; and
a Strain at Yield at 50° C. that exceeds the Strain at Yield at 25° C.

In certain embodiments, the present invention encompasses adhesive compositions comprising epoxide-$CO_2$-based polyols characterized in that the cured adhesive has the following properties as measured with ASTM D1002:
a Load at Failure at 50° C. that exceeds the Load at Failure at 25° C.;
a Tensile Energy to Break at 50° C. that exceeds the Tensile Energy to break at 25° C.; and
a Strain at Yield at 70° C. that is equal to or greater than the Strain at Yield at 25° C.

B. Improved Transparency

Figure 7:
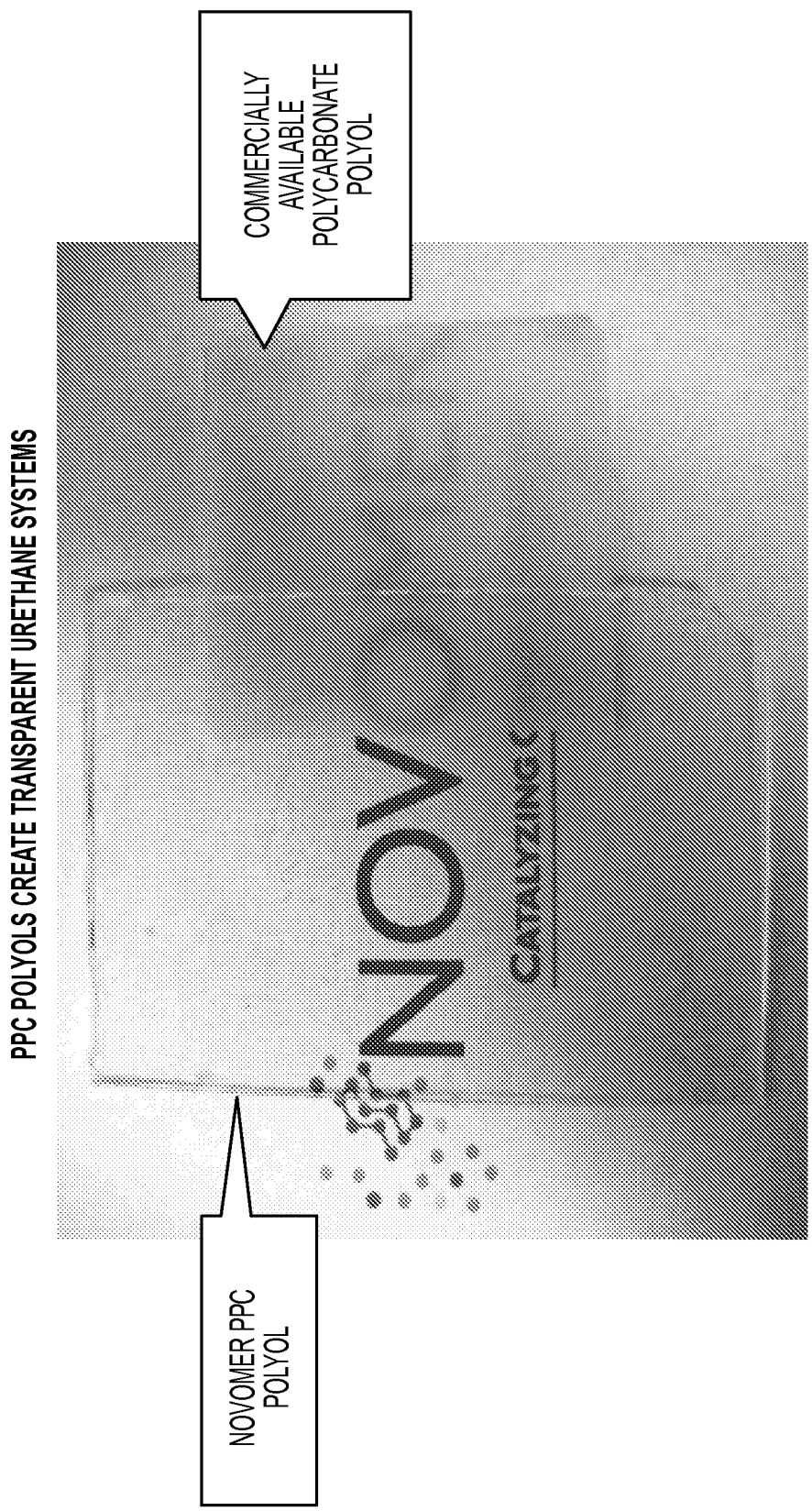
FIG. 7 shows the transparency of polyurethane composition of the present invention in comparison to formulations based on commercial polycarbonate polyols.

In another aspect, the present invention encompasses adhesive compositions comprising epoxide-$CO_2$-based polyols characterized in that the cured adhesive is highly transparent. Such transparent properties are unexpected since analogous adhesives formulated with commercially available polycarbonate polyols (e.g. those having more than two carbon atoms enchained between adjacent carbonate linkages) are hazy when cured (see FIG. 7, for example).

In certain embodiments, adhesive compositions of the present invention comprise epoxide-$CO_2$-based polyols and are further characterized in that they have total light transmission as measured using ASTM D1003-00 of greater than 85%. In certain embodiments, adhesive compositions of the present invention are further characterized in that they have light transmission as measured using ASTM D1003 of greater than 90%, greater than 95%, greater than 96%, greater than 97%, greater than 98% or greater than 99%.

In certain embodiments, adhesive compositions of the present invention comprise epoxide-$CO_2$-based polyols and are further characterized in that they have total light transmission as measured using ASTM D1003 (corrected for reflection) of greater than 85%. In certain embodiments, adhesive compositions of the present invention are further characterized in that they have light transmission as measured using ASTM D1003 of greater than 90%, greater than 95%, greater than 96%, greater than 97%, greater than 98% or greater than 99%.

In certain embodiments, adhesive compositions of the present invention comprise epoxide-$CO_2$-based polyols and are further characterized in that they have a haze value as measured using ASTM D1003-92 of less than 20%. In certain embodiments, adhesive compositions of the present invention are further characterized in that they have a haze value as measured using ASTM D1003-92 of less than 15%, less than 10%, less than 7%, less than 6%, less than 5%, or less than 3%.

C. Improved Resistance to Solvents

Figure 5:
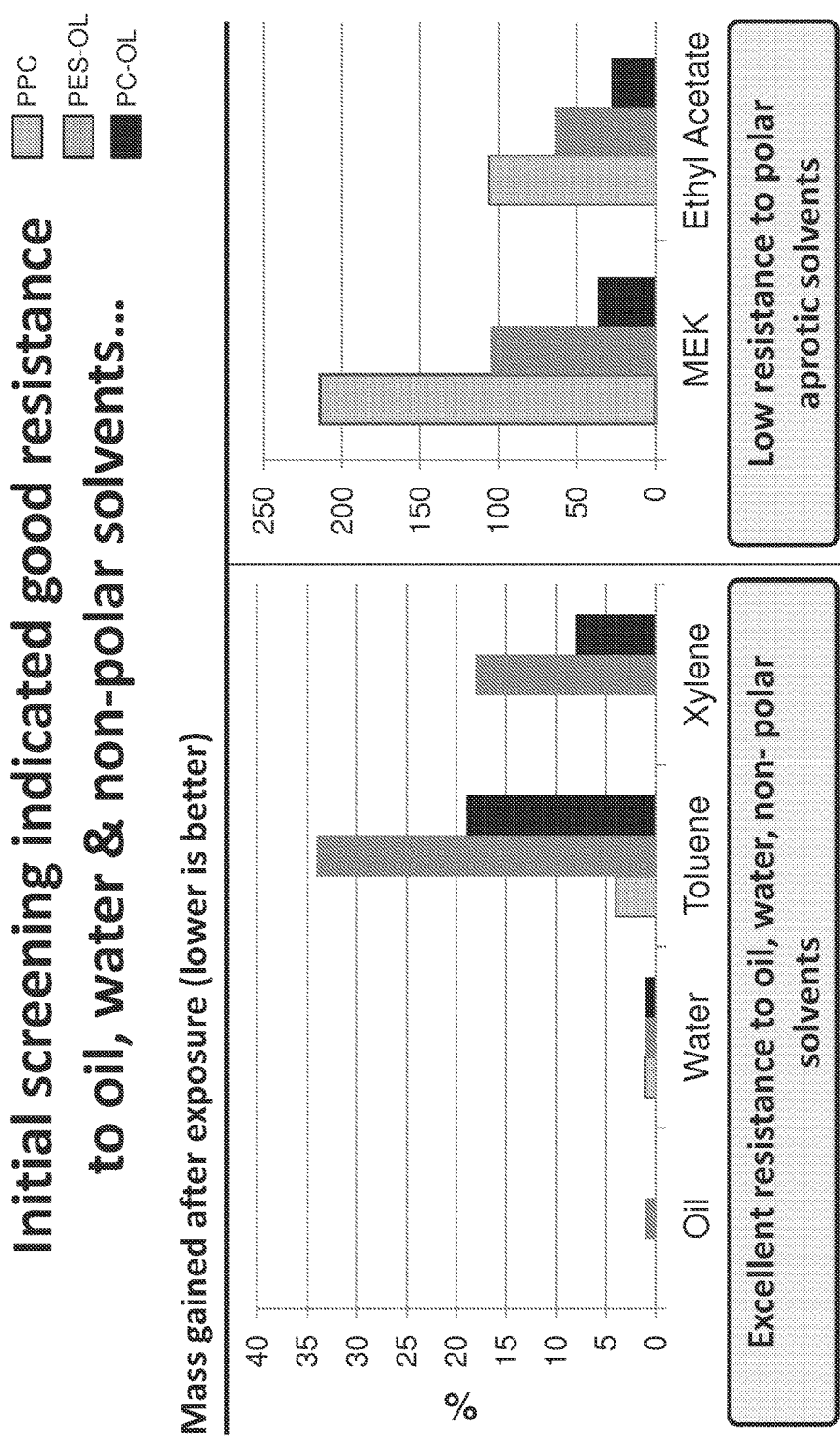
FIG. 5 shows the solvent resistance of an adhesive composition of the present invention in comparison to adhesive formulations based on commercial polyester or polycarbonate polyols.
Figure 6:
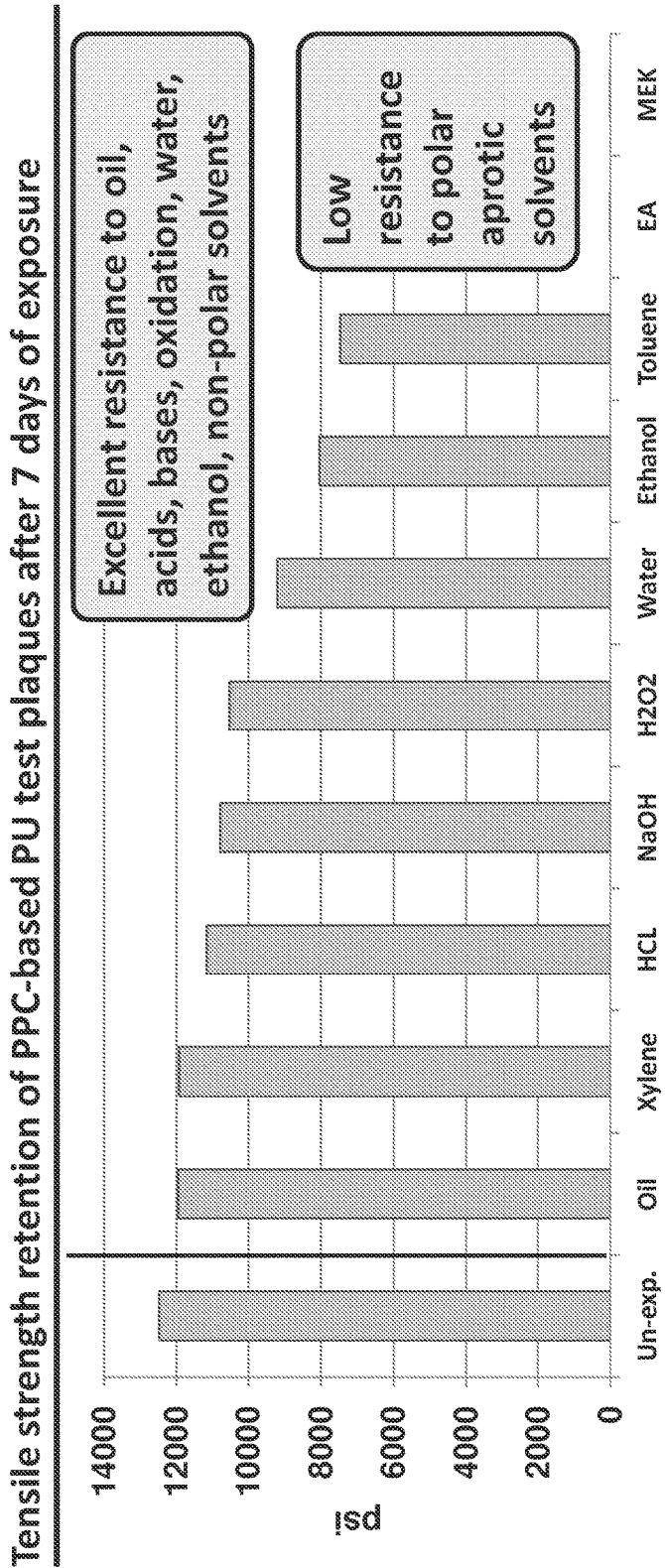
FIG. 6 shows the chemical resistance profile of an adhesive composition of the present invention.

In another aspect, the present invention encompasses adhesive compositions comprising epoxide-$CO_2$-based polyols characterized in that the cured adhesive is highly resistant to solvents. Such solvent resistance properties are unexpected since analogous adhesives formulated with commercially available polycarbonate polyols (e.g. those having more than two carbon atoms enchained between adjacent carbonate linkages) are degraded by solvent to a greater degree than the adhesives of the present invention. (see FIG. 5, for example).

In certain embodiments, adhesive compositions of the present invention comprise epoxide-$CO_2$-based polyols and are further characterized in that they have excellent resistance to hydrocarbon solvents. In certain embodiments, adhesive compositions of the present invention are characterized in that they have superb resistance to aromatic hydrocarbons. In certain embodiments, the present invention comprises epoxide-$CO_2$-based polyols characterized in that they gain less than 5% mass when immersed in aromatic hydrocarbon liquid for 1 week. In certain embodiments, they gain less than 5% mass when immersed in toluene for 1 week. In certain embodiments, they gain less than 1% mass when immersed in xylenes for 1 week.

D. Low Tensile Set Flexible Adhesives

In another aspect, the present invention encompasses adhesive compositions comprising epoxide-$CO_2$-based polyols characterized in that the cured adhesive has extremely low tensile set after stretching. Such low tensile set properties are unexpected since analogous adhesives formulated with commercially available polycarbonate polyols (e.g. those having more than two carbon atoms enchained between adjacent carbonate linkages) do not demonstrate such low tensile sets.

In certain embodiments, adhesive compositions of the present invention comprise epoxide-$CO_2$-based polyols and are further characterized in that they have a tensile set of less than 2% after being stretched to at least 500%. In certain embodiments, the tensile set is less than 1%, or less than 0.5% after being stretched to 500%. In certain embodiments, the tensile set is less than 2%, less than 1% or less than 0.5% after being stretched to 1000%.

VII. Adhesives Based on Blends of Polyols

The above improvements in the properties of adhesives are highly desirable in certain applications. Nonetheless, the properties of adhesives based solely on epoxide-$CO_2$-derived polyols are not suitable for every application. For example, while the strength of PPC-based adhesives is extremely high, the adhesives are not particularly flexible. In certain adhesive applications, such as those where the bonded parts must flex or move relative to each other, this can be undesirable. Fortunately, the inventors have also found that novel adhesives can be formulated based on mixtures of the epoxide-$CO_2$ polyols with traditional polyurethane polyols such as polyester polyols and polyether polyols. Using blends it is possible to formulate adhesives that span a continuum from very high tensile strength but inflexible adhesives through to very soft and flexible adhesives. Unexpectedly, even when formulated into highly flexible adhesives, the incorporation of the epoxide $CO_2$ polyols imparts remarkable toughness.

In certain embodiments, the present invention encompasses adhesives formulated from the $CO_2$-epoxide-derived polycarbonate polyols described above, in combination with a polyether or polyester polyol. In certain embodiments, the polyether or polyester polyol comprises from about 5 to about 50% of the polyol present in the adhesive formulation. The incorporation of polyether or polyester polyols in this range provides adhesives that are more flexible than those based on the epoxide $CO_2$ polyols alone.

In certain embodiments, the present invention encompasses adhesives comprising a mixture of one or more polyester polyols and one or more of the aliphatic polycarbonate polyols described above and in the classes, subclasses and examples herein. In certain embodiments, the polyol component of such adhesives comprises between 5% and about 10%, between 10% and about 25%, or between 20% and about 50% polyester polyol with the balance comprising an aliphatic polycarbonate polyol of any of formulae P2a through P2r-a (or mixtures of two or more of these). In certain embodiments, the polyester polyol present comprises a material based on a diol and a diacid (e.g. a polymer based on Adipic acid (AA); Sebacic acid (SBA); Succinic Acid (SA); Dodecanedioic acid (DDA); Isophthalic acid (iPA); Azelaic acid (Az); Ethylene glycol (EG); Propylene glycol (PG); 1,3 Propane diol; 1,4-Butanediol (BDO); 1,6-Hexanediol (HID); Diethylene glycol (DEG); Neopentyl glycol (NPG); 3-Methyl-1,5-Pentanediol (MPD). Examples of these include, but are not limited to:

AA-EG polyesters with molecular weights of 500, 1,000, 2,000 or 3,000 g/mol;

AA-EG/BDO polyesters with molecular weights of 500, 1,000, 2,000 or 3,000 g/mol;

AA-PG polyesters with molecular weights of 500, 1,000, 2,000 or 3,000 g/mol

AA-BDO polyesters with molecular weights of 500, 1,000, 2,000 or 3,000 g/mol;

AA-BDO/HID polyesters with molecular weights of 500, 1,000, 2,000 or 3,000 g/mol;

AA-DEG polyesters with molecular weights of 500, 1,000, 2,000 or 3,000 g/mol;

AA-NPG polyesters with molecular weights of 500, 1,000, 2,000 or 3,000 g/mol;

AA-NPG/HID polyesters with molecular weights of 500, 1,000, 2,000 or 3,000 g/mol;

AA-HID polyesters with molecular weights of 500, 1,000, 2,000 or 3,000 g/mol;

AA-MPD polyesters with molecular weights of 500, 1,000, 2,000 or 3,000 g/mol;

SEA-HID polyesters with molecular weights of 2,000, 3,000, 4,000 or 5,000 g/mol;

DDA-HID polyesters with molecular weights of 2,000, 3,000, 4,000 or 5,000 g/mol;

Az-EG polyesters with molecular weights of 500, 1,000, 2,000 or 3,000 g/mol;

Az/iPA-EG/NPG polyesters with molecular weights of 500, 1,000, 2,000 or 3,000 g/mol;

SA-EG polyesters with molecular weights of 500, 1,000, 2,000 or 3,000 g/mol;

SA-DEG polyesters with molecular weights of 500, 1,000, 2,000 or 3,000 g/mol;

SA-NPG polyesters with molecular weights of 500, 1,000, 2,000 or 3,000 g/mol;

SA-PG polyesters with molecular weights of 500, 1,000, 2,000 or 3,000 g/mol;

In certain embodiments, the polyester polyol is formed by ring-opening-polymerization of caprolactone or propiolactone. For example, polycaprolactone with molecular weights of 500, 1,000, 2,000 or 3,000 g/mol; or polypropiolactone with molecular weights of 500, 1,000, 2,000 or 3,000 g/mol.

In certain embodiments, the present invention encompasses polyurethane adhesives derived from reaction of a polyisocyanate with a polyol composition where the polyol composition is characterized in that it contains 50 to 95 weight percent of an aliphatic polycarbonate polyol selected from the group consisting of poly(propylene carbonate); poly(ethylene carbonate); and poly(ethylene-co-propylene carbonate), and 5 to 50 weight percent of a polyester polyol. In certain embodiments, the polyurethane adhesive is further characterized in that the aliphatic polycarbonate polyol has an Mn between about 500 g/mol and 10,000 g/mol; or between about 500 and 5,000 g/mol; or between about 500 and 3,000 g/mol, or between about 500 and 1,500 g/mol, or between about 1,000 and 2,500 g/mol, or between about 3,000 and 7,000 g/mol. In certain embodiments, the polyurethane adhesive is further characterized in that the aliphatic polycarbonate polyol has a functional number of 2; or that the aliphatic polycarbonate polyol has a functional number greater than 2. In certain embodiments, the polyurethane adhesive is further characterized in that the polyester contains is derived from one or more of: Adipic acid (AA); Sebacic acid (SBA); Succinic Acid (SA); Dodecanedioic acid (DDA); Isophthalic acid (iPA); Azelaic acid (Az); Ethylene glycol (EG); Propylene glycol (PG); 1,3 Propane diol; 1,4-Butanediol (BDO); 1,6-Hexanediol (HID); Diethylene glycol (DEG); Neopentyl glycol (NPG); and 3-Methyl-1,5-Pentanediol (MPD). In certain embodiments, such adhesive formulations are further characterized in that they have a yield at strain (i.e. as measured using ASTM D1002) of greater than 5%. In certain embodiments, the adhesive formulations are further characterized in that they have a yield at strain of greater than 10%. In certain embodiments, such adhesive formulations are further characterized in that they have an elongation at break (i.e. as measured using ASTM D412) of greater than 100%. In certain embodiments, the adhesive formulations are further characterized in that they have an elongation at break greater than 200%, greater than 300%, or greater than 500%.

In another aspect, the present invention provides adhesive compositions and formulations comprising mixtures of the aliphatic polycarbonate polyols described hereinabove with other commonly used polyols. In certain embodiments, the present invention comprises a strength enhancing additive for polyurethane adhesives, wherein the additive comprises a polycarbonate polyol derived from the copolymerization of $CO_2$ and one or more epoxides. In certain embodiments, the additive has a primary repeating unit with a structure:

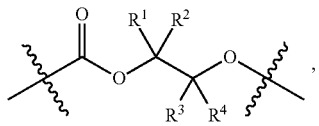

Where each of $R^1$, $R^2$, $R^3$, and $R^4$ is as defined above and in the classes and subclasses herein.

In certain embodiments, the additive comprises from about 1% to about 40% of the polyol present in the adhesive formulation. In certain embodiments, the additive comprises between 2% and 5% of the polyol present in an adhesive formulation with an aliphatic polycarbonate polyol derived from the copolymerization of carbon dioxide and one or more epoxides. In certain embodiments, the additive is used at between 1% and 5%, between 5% and 10%, between 10% and 20%, between 20% and 30% or between 30% and 40% of the polyol present.

Related to this, the invention also provides methods for improving the strength of a polyurethane adhesive by substituting a portion of the polyol in a base formulation with epoxide-$CO_2$-derived polyol.

In certain embodiments, the methods comprise modifying a base polyurethane adhesive formulation where the base formulation includes polyester polyols. The modification is performed by substituting some fraction of the polyester polyol with an aliphatic polycarbonate polyol derived from the copolymerization of carbon dioxide and one or more epoxides and having a primary repeating unit with a structure:

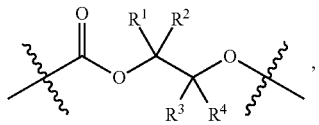

Where each of $R^1$, $R^2$, $R^3$, and $R^4$ is as defined above and in the classes and subclasses herein.

In certain embodiments, the fraction of the polyester polyol substituted is between about 2% and about 50%. In certain embodiments, the method comprises substituting between 2% and 5% of the polyester polyol in an adhesive formulation with an aliphatic polycarbonate polyol derived from the copolymerization of carbon dioxide and one or more epoxides. In certain embodiments, between 5% and 10%, between 10% and 20%, between 20% and 30%, or between 30% and 50% of the polyester polyol in the formulation is substituted.

In certain embodiments, the methods comprise modifying a base polyurethane adhesive formulation where the base formulation includes polyether polyols. The modification is performed by substituting some fraction of the polyether polyol with an aliphatic polycarbonate polyol derived from the copolymerization of carbon dioxide and one or more epoxides and having a primary repeating unit with a structure:

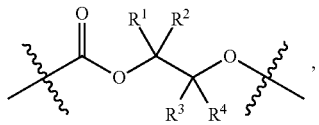

Where each of $R^1$, $R^2$, $R^3$, and $R^4$ is as defined above and in the classes and subclasses herein.

In certain embodiments, the fraction of the polyether polyol substituted is between about 2% and about 50%. In certain embodiments, the method comprises substituting between 2% and 5% of the polyether polyol in an adhesive formulation with an aliphatic polycarbonate polyol derived from the copolymerization of carbon dioxide and one or more epoxides. In certain embodiments, between 5% and 10%, between 10% and 20%, between 20% and 30%, or between 30% and 50% of the polyether polyol in the formulation is substituted.

In certain embodiments of the above method, the aliphatic polycarbonate polyol has substantially the same OH# as the polyester or polyether polyol for which it is substituted. In certain embodiments, the aliphatic polycarbonate polyol has substantially the same functional number as the polyester or polyether polyol for which it is substituted. In certain embodiments, the aliphatic polycarbonate polyol has a substantially different OH# from the polyester or polyether polyol for which it is substituted (for example, more than 5% different, more than 10% different or more than 25% different) and the method includes the additional step of adjusting the amount of isocyanate included in the adhesive formulation to accommodate the resulting difference in OH# of the blended polyol relative to the base formulation.

EXAMPLES

General Formulation and Test Procedures for Examples X Through Y

Raw Materials

The formulations described in Examples 1 to 5 use the following raw materials:
- Polypropylene carbonate (PPC) diols, with molecular weights ranging from ~800 to ~3000 grams/mol
  - Polydispersity index of all polyols was <1.2
  - All polyols were initiated with diol chain transfer agents (i.e. they are of formula P2)
  - All diols were 2.0 functional with no unsaturation or other functionality
  - Hydroxyls are a mixture of ~85% secondary and 15% primary
- Linear aliphatic ethylene/butylene polyester diol with molecular weight of 2000 grams/mol (EBD)
- Modified diphenylmethane-4,4'-diisocyanate(MDI) with functionality of 2.2 (MM103)
- Ester-based isocyanate-terminated two functional prepolymer
- Traditional tin-type polyurethane catalysts
- Adhesion promoters and other additives
- 78-083 is a poly(propylene carbonate) polyol initiated with dipropylene glycol and having an Mn of 1,940 g/mol, a PDI of 1.06, containing greater than 99% —OH end groups and >99% carbonate linkages (excluding the starter). This material conforms to formula Q5,

Q5

$$H \left( O \underset{}{\overset{}{\diagdown}} O \right)_n O \left( O \underset{R^t}{\overset{}{\diagdown}} O \right)_t \overset{O}{\underset{\|}{C}} \left( O \underset{}{\overset{}{\diagdown}} O \right)_n H$$

where $R^t$ is methyl, t is 2, and n is on average in the composition approximately 8.8.

- 58-064 is a poly(propylene carbonate) polyol initiated with dipropylene glycol and having an Mn of 3,180 g/mol, a PDI of 1.04, containing greater than 99% —OH end groups and >99% carbonate linkages (excluding the starter). This material conforms to formula Q5,

Q5

$$H \left( O \underset{}{\overset{}{\diagdown}} O \right)_n O \left( O \underset{R^t}{\overset{}{\diagdown}} O \right)_t \overset{O}{\underset{\|}{C}} \left( O \underset{}{\overset{}{\diagdown}} O \right)_n H$$

where $R^t$ is methyl, t is 2, and n is on average in the composition approximately 15.

Procedures

The following general procedures were used in Examples 1 to 5:
- Polyols were heated and degassed under 2 mm vacuum to remove residual volatile components.
- In some cases, prepolymers were created. When the experiment called for a prepolymer, it was made by reacting the specified polyol with MM103. These prepolymer ingredients were mixed thoroughly, and then degassed, again under 2 mm of vacuum, until bubbling was minimal, and then blanketed with dry nitrogen at the specified temperature and time to complete the reaction.
- For prepolymers, the remaining unreacted isocyanate groups were measured using the standard dibutylamine titration method.
- When necessary, the effective hydroxyl number of the polyol was then "back calculated" from the final NCO measurement, to yield a practical basis for further experiments.
- For some formulations the final polymer was made by the "one shot" approach, bypassing the prepolymer step.
- Once characterized for the unreacted isocyanate, the prepolymer was then reacted into the given experimental formulations, using a variety of co-reactants at various stoichiometric ratios. Typically, a final degassing also occurred after all ingredients were thoroughly mixed in a lab mixer. The mixture was then applied to bonding substrates as specified, in some cases after curing, or in some cases before substantial curing occurred, thus creating a hot melt system, or a 2K reactive system.
- Also, for formulations showing promise as hot melt or reactive systems, sheet samples were made for testing ASTM D412 properties, including ultimate tensile strength, ultimate elongation, and stress measurements at 100%, 300%, and 500% elongation.
- Tear strength measurements were made in accordance with ASTM D624 Die C, and ASTM D1938.

Example 1

A prepolymer with MM103 was made from PPC 74-083 to a measured NCO % of 7.79. A final system was made with a blocked diamine (Duracast 3C-LF from Chemtura) and MDI. The system was heated to 300 F for 30 minutes, and then the temperature was reduced to 275 F for 16 hours.

Result: The hardness at 275° F. was 75 A—much harder at this temperature than any other system in which the PPC diol was the only large molecular ingredient. At RT the specimen hardened to 76 D and was brittle. However, 1K systems using this technology are promising for a fast curing, reactive hot melt adhesive, not dependent on moisture, and capable of unusually high temperature service for a polyurethane material.

Example 2

A polyester-based prepolymer (MS242 prepolymer from Bayer) was combined with a PPC polyol-based prepolymer (similar to that described in Example 1, but based on PPC 58-064 and having an NCO % of 8.1%) and cured with traditional tertiary amine catalyst system (33LV from Dabco) and BDO (1,4-butane diol). The formulation was 30% PPC polyol by weight. Gel time was ~2 minutes. Multiple test plaques were created (demold time ~1 hour) and tested.

Figure 9:
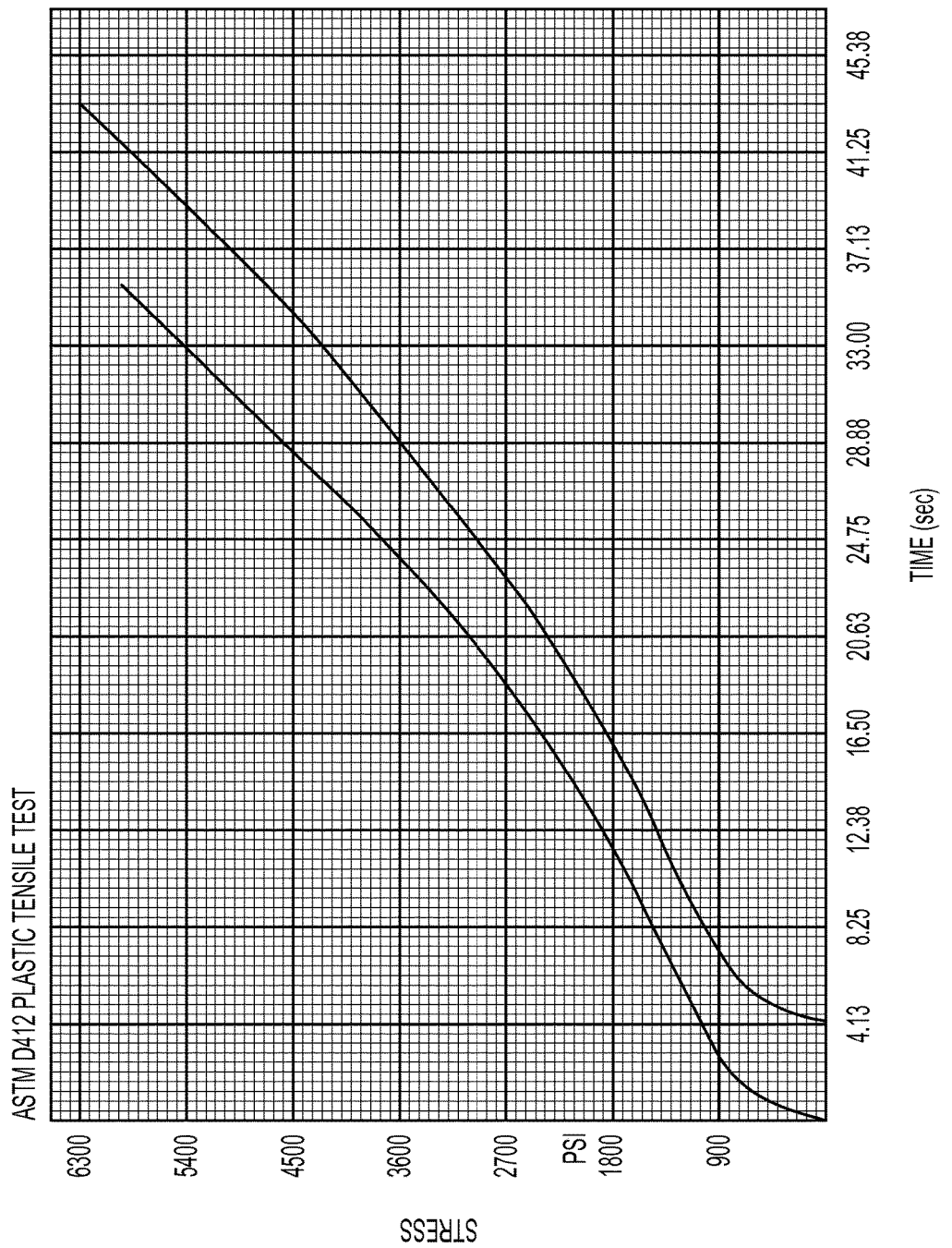
FIG. 9 shows the ASTM D412 Tensile Test for the Adhesive of Example 2.

ASTM D412 Test Results (See FIG. 9)
Tensile: 7,160 psi/7,460 psi/6,200 psi
Elongation 500%/520%
Moduli: 100% 1,215/1215 psi; 300% 2,670/2,760 psi; 500% 7,160/6,840 psi
Tensile Set: 25% after 500%+elongation
Durometer: 85 A at room temperature Example 3

The PPC prepolymer described in Example 2 (NCO % of 8.1) was reacted with EBD, and after that reaction was complete, it was further reacted with a blocked diamine. In this formulation the PPC comprises 28% of the total polymer weight. The mix was put into the mold and oven at 300 F. After ½ hour the material was solidly gelled. After further curing the material at 280 F for 4 hours the hardness was 80 A at 275 F.

Result: At RT the hardness increased to 88 A and was tough and elastic. Additional material was cured at 275 F overnight. After 22 hours at 275 F the material measured 81 A, and at RT its hardness increased to 85 A. A single tensile sample was cut from the sheet and measured 3860 psi, only 2 hours after it had been cooled to RT and the 100% mod was only 720 psi, indicating thermoplasticity.

Example 4

Four separate hot melt formulations designated HM4, HM5, HM6 and HM7 were formulated of the same ingredients with approximately equal parts PPC polyol and EBD. The first three were reactive hot melts and HM7 was a true hot melt. The iso theory was varied across the four formulations.

Result: All these formulations had significant bonds to the substrates, however they were quite soft at RT. HM7 could be used as a permanently sticky adhesive. With a moderate increase in hardness it might be applicable as a shoe sole adhesive.

Example 5

A similar formulation to Example 4 was created with an increased amount of PPC relative to EBD (approximately 2:1). This system was tested as both a true hot melt and a reactive system.

Hot Melt Result: The bond to wood was excellent; the bond to aluminum was very good, better than a standard commercial hot melt. The durometer hardness was 75 A with rapid fall of to 50 A, typical of a soft adhesive material.

Figure 10:
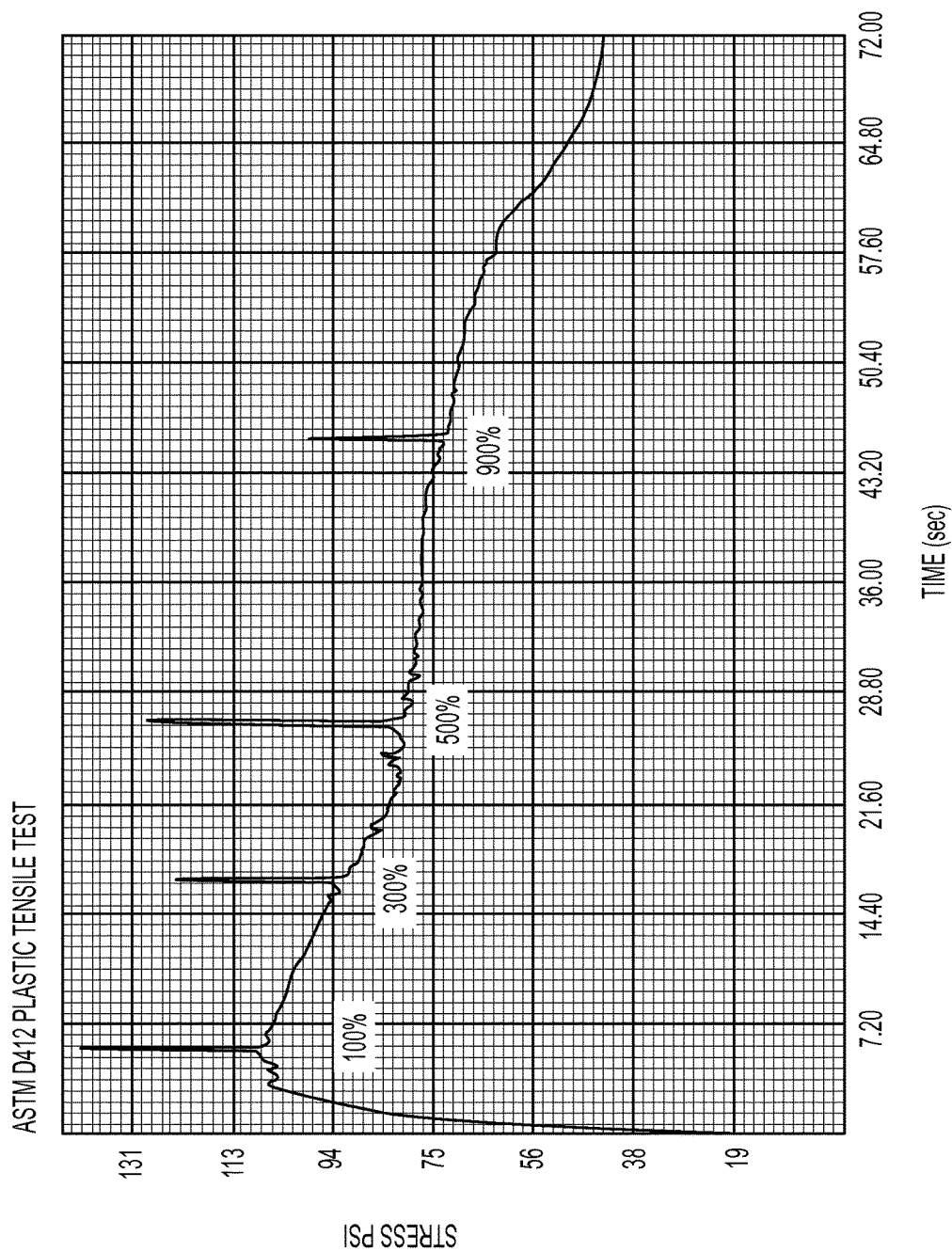
FIG. 10 shows the ASTM D412 Tensile Test for the Adhesive of Example 5.
Figure 11:
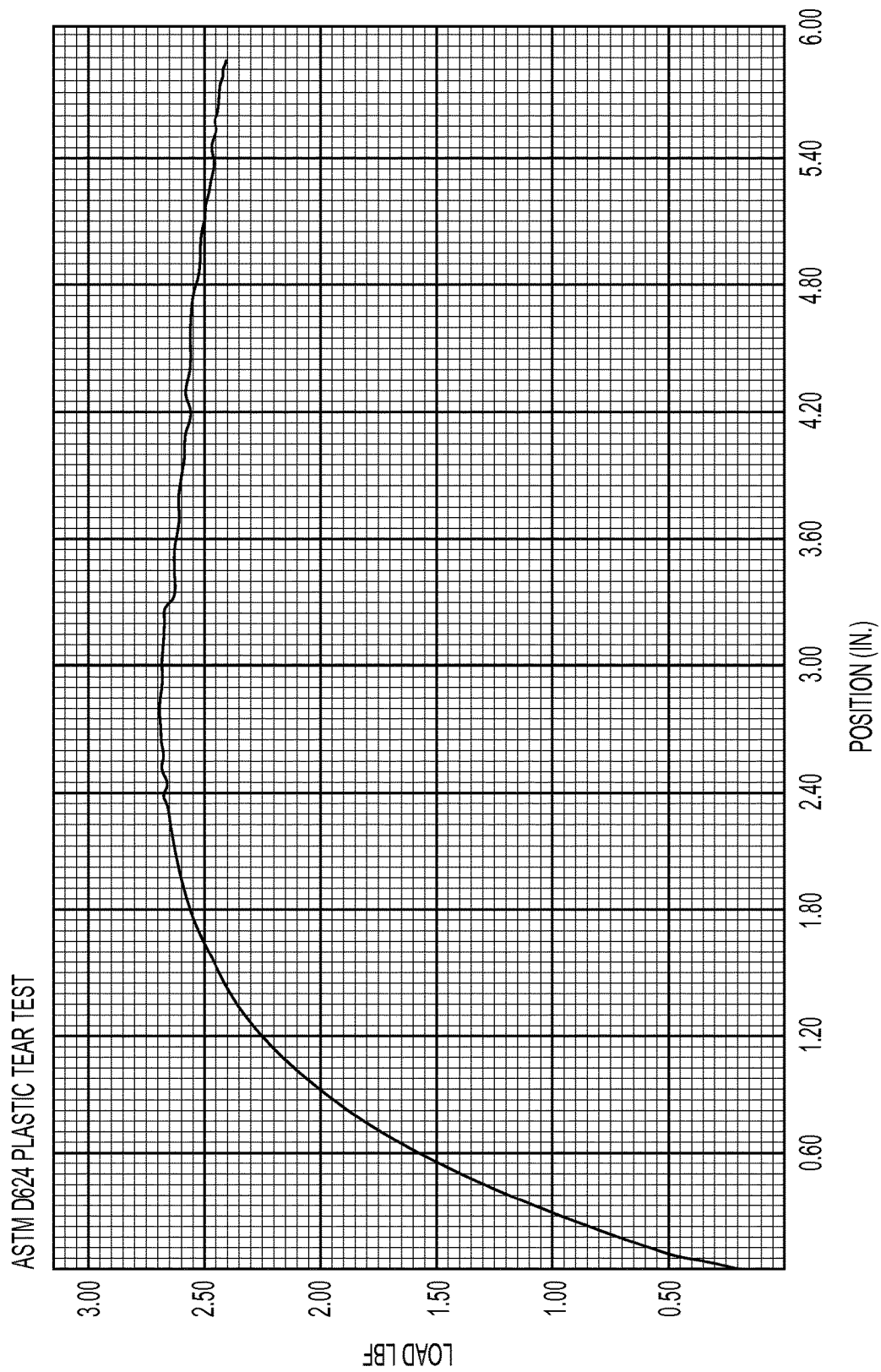
FIG. 11 shows the ASTM D624-Die C Tear Test for the Adhesive of Example 5.
Figure 12:
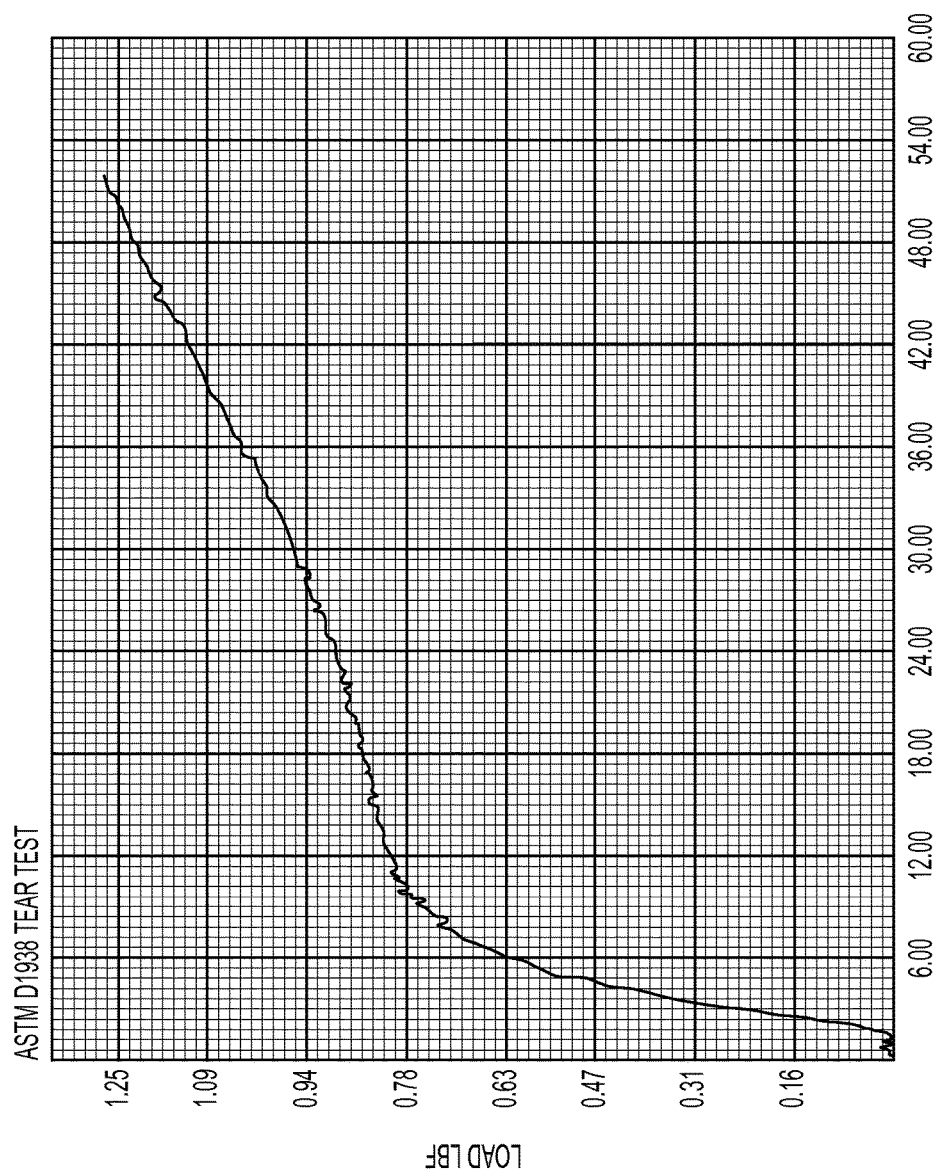
FIG. 12 shows the ASTM D1938 Tear Test for the Adhesive of Example 5.

Reactive System Result: Bonds to aluminum, steel, PVC, Nylon, acrylic, polycarbonate acetal and ABS were uniformly excellent. The physical properties were measured. The tensile graph showed very high elongation of over 900% with continual gradual yielding of the polymer; the D624, Die C tear also showed some yield but no sudden failure as is normally expected. Additionally, the D1938 split tear showed a remarkable gradual increase in tear resistance indicating toughness. (See FIGS. 10, 11, and 12). The adhesive exhibits its good properties as a reactive system for a variety of substrates as a very soft glue. ASTM D1002 testing resulted in a LSS result of 300 psi on aluminum strips. In the test, there was neither cohesive nor adhesive failure. Instead the strips slid apart thermoplastically to the extension limit of the test, at which point the stress was measured.

Example 6

Building on the work described in Examples 1 through 5, a two component adhesive system targeted at footwear and textile applications was formulated. The performance of urethane adhesive systems containing PPC polyol was compared to equivalent systems without the PPC polyol.

Raw Materials
1000 Mw polypropylene carbonate (PPC) diol, with functionality of 2.0, PDI of <1.2, and 85/15 secondary/primary hydroxyl groups This material conforms to formula Q5,

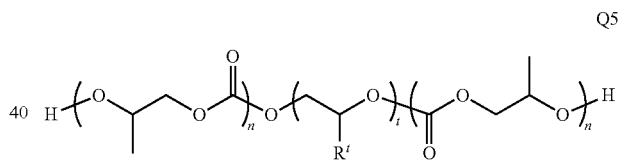

where $R^t$ is methyl, t is 1, and n is on average in the composition approximately 4.5.

Panolam Piothane 50-2000 EBA, a linear aliphatic polyester diol of 2000 Mw
Modified diphenylmethane-4,4'-diisocyanate(MDI) with functionality of 2.2 (MM103)
Butanediol chain extender Procedure A 7-8% NCO prepolymer was produced which is a combination of PPC polyol and EBA polyester polyol, in approximately equal proportions. The polyol side of the formulation was then fully reacted with the prepolymer after application to obtain a finished adhesive. Cure time could be accelerated with heat, and as with most adhesives bond strength continues to increase over time. The formulation is 100% VOC free.

An equivalent baseline adhesive was created which substituted 1000 Mw EBA polyester polyol for the Novomer 1000 mw PPC polyol. All other components of the formulation are unchanged.

The formulated adhesive system was testing on both compounded rubber and EVA substrates, as these are commonly used in textile, footwear, sporting good, and other similar applications.

Results

Figure 13:
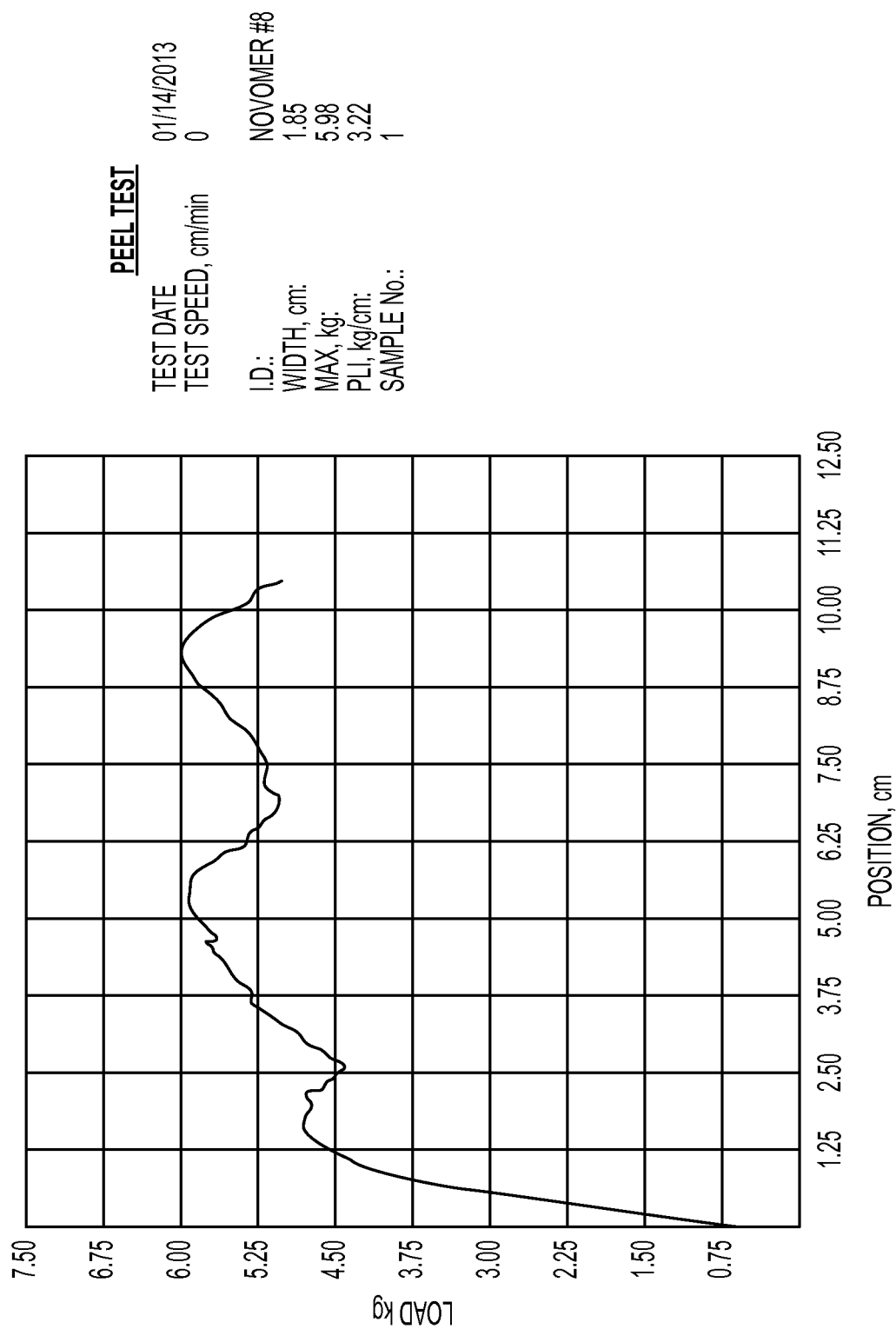
FIG. 13 shows the peel test for PPC-containing adhesive of Example 6.
Figure 14:
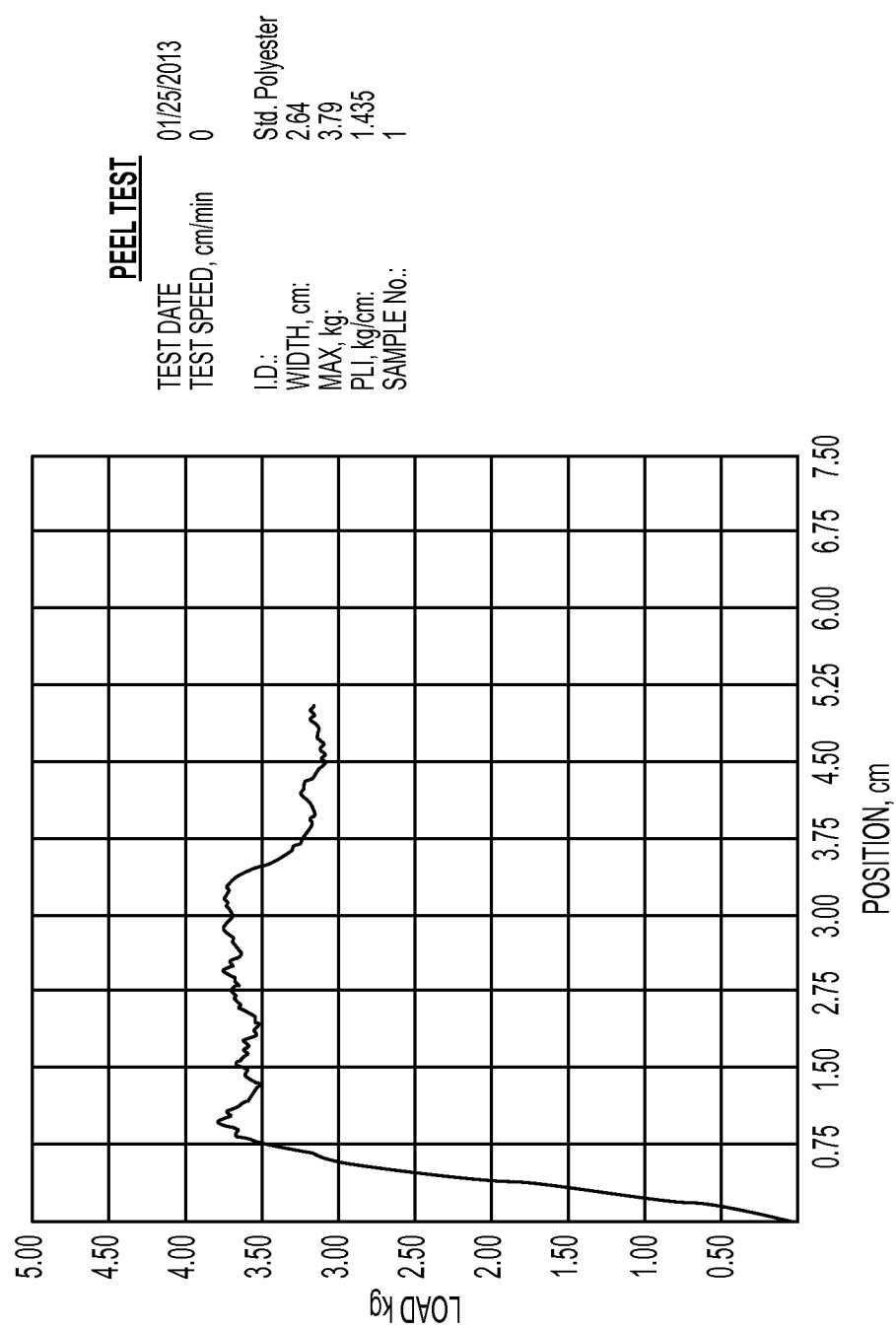
FIG. 14 Shows the peel test for a control adhesive from Example 6 not containing PPC polyol.

The results obtained are as follows (see FIGS. 13 and 14):

Peel test results (compounded rubber substrate)
  Formulated system containing approximately 36% 1000 Mw PPC Polyol: 3.2 kg/cm, adhesive failure
  Equivalent system substituting 1000 Mw polyester polyol for PPC polyol: 1.45 kg/cm, adhesive failure Peel test results (EVA substrate)
  Formulated system containing approximately 36% 1000 Mw PPC Polyol: >5-6 kg/cm, substrate tears The addition of PPC polyol to the standard polyester-based two component reactive adhesive more than doubled adhesive strength to rubber substrates. The same PPC-based system exhibited excellent adhesion to an EVA substrate, with a strength sufficient to result in substrate failure. More broadly, the poly(propylene carbonate) backbone appears to impart both improved adhesion and high strength properties coupled with versatile application opportunities. The PPC polyol was fully compatible with existing polyester polyols and reacted well with common urethane catalysts and other additives.

Example 7

In Example 7, a series of reactive one-component adhesives were formulated and a qualitative assessment of their performance was completed. In this example, a PPC diol with a measured OH # of 181 was utilized.

Procedure:

The PPC polyol was formulated in a 1/2/1 equivalent ratio of polyol to isocyanate to chain extender to produce a prepolymer of ~7.5% NCO. First, the required amount of 2,4/4,4-MDI was weighed into a 3 neck flask and heat to 80° C. The aliphatic polycarbonate polyol was heated to 50° C. and was added to the isocyanate with stirring at such a rate that the reaction temperature is maintained at approximately 80° C. After all the polyol was added, heating continued with stirring for an additional 3 hours. The prepolymer was transferred to a bottle and seal under dry $N_2$. The prepolymer composition is shown below.

| Novomer | polyol | 2,4-MDI |
|---|---|---|
| 1/2/1 | 308 | 250 |

The percent NCO content was measured and compared to the theoretically calculated value and was shown to have good agreement.

The prepolymers are then subject to lap shear testing (Lap Shear Strength of Adhesively Bonded Metal Specimens ASTM D1002). One inch wide cold rolled steel plates are marked at the ½" mark. 10 g of prepolymer is readied and 0.1 g of glass spacer beads are added and mixed in. The mixes are then spread on one of the metal strips within the ½" by 1" area and the second strip is overlapped ½" to the first and the two strips clamped together and left to cure at room temperature for 72 hours. Three samples are prepared for each prepolymer. After curing for 72 hour, the test specimens were clamped in the Instron and separated.

Example 8

In Example 8, a series of reactive two-component adhesives were formulated and a qualitative assessment of their performance was completed. In this example, a 620 Mw PPC diol with a measured OH # of 181 was formulated in two different formulations, a 1/2/1 and a 1/3.5/1 equivalent ratio of polyol to isocyanate to chain extender to produce a ~7% and a ~14% NCO prepolymer, respectively. First, the required amount of 2,4/4,4-MDI was weighed into a 3 neck flask and heat to 80° C. The aliphatic polycarbonate polyol was heated up to 50° C. or slightly higher if the viscosity is too high to be easily pourable. The polyol was added to the isocyanate with stirring at such a rate that the reaction temperature is maintained at approximately 80° C. After all the polyol was added, heating continued with stirring for an additional 3 hours. The prepolymer was transferred to a bottle and seal under dry $N_2$. The prepolymer composition is shown below.

| Novomer | polyol | 2,4-MDI |
|---|---|---|
| 1/2/1 | 308 | 250 |
| 1/3.5/1 | 308 | 437.5 |

The percent NCO content was measured and compared to the theoretically calculated value and was shown to have good agreement.

| % NCO of the Prepolymers 1 eq Polyol/3.5 eq MDI | | | | |
|---|---|---|---|---|
| | | Measured % NCO | | |
| | Theoretical % NCO | 1 | 2 | Ave |
| Polyol | | | | |
| Poly G 20-181 | 14.05 | 12.63 | 12.56 | 12.60 |
| PTMEG 650 | 13.74 | 13.48 | 13.42 | 13.45 |
| CAPA 2067A | 13.81 | 13.84 | 13.78 | 13.81 |
| Novomer | 14.09 | 13.70 | 13.64 | 13.67 |

The prepolymers are then subject to lap shear testing (Lap Shear Strength of Adhesively Bonded Metal Specimens ASTM D1002). One inch wide cold rolled steel plates are marked at the ½" mark. 10 g of prepolymer and the equivalent amount of butanediol are mixed together, then 0.1 g of glass spacer beads are added and mixed and lastly 1 drop of tin catalyst (T-9) was added and mixed in. The mix are then spread on 1 of the metal strips within the ½" by 1" area and the second strip is overlapped ½" to the first and then the two strips clamped together and left to cure at room temperature for 72 hours. Three samples are prepared for each prepolymer. After curing for 72 hour, the test specimens are clamped in the Instron and separated.

Example 9

In this example, the objective was to determine performance of $CO_2$-based poly(propylene-carbonate) diol (PPC diol) Novomer 58-076 in polyurethane adhesives.

NOV-58-076 is a poly(propylene carbonate) polyol initiated with dipropylene glycol and having an Mn of 816 g/mol, a PDI of 1.15, containing greater than 99% —OH end groups and >99% carbonate linkages (excluding the starter). This material conforms to formula Q5,

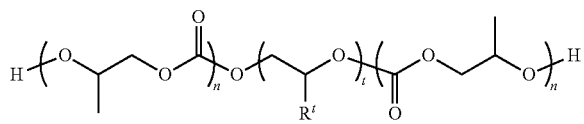

where $R^t$ is methyl, t is 2, and n is on average in the composition approximately 3.3.

A two-component adhesive was formulated with Novomer 58-076 polyol, 1,4-BD as a chain extender, and 4,4'-MDI isocyanate at MDI/Polyol/Chain extender equivalent ratio 2.02/1/1. As reference, two component polyurethane adhesives were formulated using Eternacoll UH-50 polycarbonate polyol, 1,4-BD chain extender and 4,4'-MDI isocyanate and using Fomrez 44-160 polyester polyol, 1,4-BD chain extender and 4,4'-MDI isocyanate. All polyurethane systems were formulated at the same hard segment concentration.

The polyol and chain extender (previously degassed) were preheated at 70° C., weighed into Speed Mixer cup, benzoyl chloride added and all components were mixed via Speed Mixer (FlackTek Inc.) for 60 seconds at 2200 rpm (Component B). The mixture was conditioned for additional 15 minutes at 70° C.

Required amount of melted MDI was placed into a syringe and conditioned at 70° C. (Component A).

Metal plates were conditioned at 120° C. Component A was added to Component B and all components mixed via Speed Mixer for 20 seconds at 2200 rpm. Immediately after mixing, about 0.075 g of the resin was placed in the center of overlapping area of each plate. Before gel time, two plates were joined via over-lapping area, closed with clamps and left to cure for 2 hours at 120° C. followed by 20 hours at 110° C. The samples were left to age at room conditions for 5 days prior to testing.

Two-component polyurethane adhesive was composed of Component A which was straight isocyanate 4,4'-MDI and Component B which was mixture of polyol, chain extender, and small amount of benzoyl chloride. The gel time of Eternacoll UH-50-based system was too fast to handle in preparation of adhesive samples. Benzoyl chloride was added in small amount to slightly increase the gel time.

Two component polyurethane systems based on NCO— prepolymer was also too fast (gel time 60 seconds) and was not practical for laboratory preparation of adhesive samples, as well.

Both types of polyurethane adhesive, based on Novomer 58-076 polyol and Eternacoll UH-50 exhibited similar stress-strain properties, with yields at low strains (about 2% strain). The adhesion properties at room temperature were also close. However, adhesives based on Novomer 58-076 unexpectedly exhibited much better retention of adhesion strength at 70° C. as compared to adhesive made with Eternacoll UH-50. The retention of stress at yield at 70° C. of Novomer 58-076 adhesives was 61% as compared to 29% of Eternacol UH-50 adhesive. The strain at yield for Novomer 58-076 adhesive at 70° C. increased slightly as compared to room temperature. The strain at yield decreased for Eternacol UH-50 polyol based adhesive.

| Effect of temperature on properties of two-component polycarbonate PU adhesives | | |
|---|---|---|
| Type of Adhesive | UH-50 (50% HS) | Novomer 58-076 (50% HS) |
| Properties at RT | | |
| Load at Failure, $N/mm^2$ | 1166 ± 156 | 1850 ± 266 |
| Tensile Energy to Break, in-$lbf/in^3$ | 17 ± 2 | 27 ± 4 |
| Modulus, psi | 181099 ± 31962 | 188948 ± 19184 |
| Stress at Yield, psi | 3566 ± 120 | 3542 ± 164 |
| Strain at Yield, % | 2.10 ± 0.17 | 2.19 ± 0.16 |
| Properties at 50° C. | | |
| Load at Failure, 50° C., $N/mm^2$ | 429 ± 52 | 2631 ± 317 |
| Tensile Energy to Break, 50° C., in-$lbf/in^3$ | 1.676 ± 0.063 | 67 ± 17 |
| Modulus, 50° C., psi | 105243 ± 9918 | 109948 ± 10556 |
| Stress at Yield, 50° C., psi | 1854 ± 210 | 2707 ± 155 |
| Strain at Yield, 50° C., % | 2.13 ± 0.06 | 3.05 ± 0.46 |
| Properties at 70° C. | | |
| Load at Failure, 70° C., $N/mm^2$ | 251 ± 17 | 586 ± 62 |
| Tensile Energy to Break, 70° C., in-$lbf/in^3$ | 0.431 ± 0.068 | 3.03 ± 0.76 |
| Modulus, 70° C., psi | 128160 ± 17070 | 117612 ± 22535 |
| Stress at Yield, 70° C., psi | 1039 ± 89 | 2174 ± 109 |
| Strain at Yield, 70° C., % | 1.02 ± 0.15 | 2.75 ± 0.54 |

In addition, Novomer polyols performed favorably in a number of additional performance areas including solvent resistance, clarity, and adhesion to a range of substrates— these results are summarized in FIGS. 1-7.

By blending Novomer PPC with polyester polyols over a range of 20-58% (using formulations similar to those described above for the pure materials), a range of soft and hard adhesives were prepared. A summary of the properties of these formulations are shown in FIG. 8.

TABLE 2

| Formulation and properties of two-component polyurethane adhesives based on polycarbonate polyol | | |
|---|---|---|
| | Novomer 58-076 (50% HS) | UH-50 (50% HS) |
| | Retention of properties (70° C./RT) % | Retention of properties (70° C./RT) % |
| Type of Adhesive Formulation (pbw) Component B | | |
| Novomer 58-076 | 14.025 | 13 |
| 1,4 Butane Diol | 2.052 | 2.381 |
| Benzoyl chloride | 3 drops | 3 drops |

TABLE 2-continued

Formulation and properties of two-component polyurethane adhesives based on polycarbonate polyol

| | Novomer 58-076 (50% HS) | | UH-50 (50% HS) | |
|---|---|---|---|---|
| | | Retention of properties (70° C./RT) % | | Retention of properties (70° C./RT) % |
| Component A | | | | |
| Mondur M | 11.949 | | 11.522 | |
| Hard segment, % | 50 | | 50 | |
| Adhesive sample preparation | | | | |
| Components temp., ° C. | 70 | | 70 | |
| Gel Time | 3-4 minutes | | 100 s | |
| Curing time and temperature | 2 hours at 120° C. | | 2 hours at 120° C. | |
| Postcuring time and temperature | 20 hours at 110° C. | | 20 hours at 110° C. | |
| Adhesive properties, RT | | | | |
| Load at Failure, N/mm$^2$ | 1850 ± 266 | | 1166 ± 156 | |
| Tensile Energy to Break, in-lbf/in$^3$ | 27 ± 4 | | 17 ± 2 | |
| Modulus, psi | 188948 ± 19184 | | 181099 ± 31962 | |
| Stress at Yield, psi | 3542 ± 164 | | 3566 ± 120 | |
| Strain at Yield, % | 2.19 ± 0.16 | | 2.10 ± 0.17 | |
| Adhesive properties, 70° C. | | | | |
| Load at Failure, 70° C., N/mm$^2$ | 586 ± 62 | 32 | 251 ± 17 | 21 |
| Tensile Energy to Break, 70° C., in-lbf/in$^3$ | 3.03 ± 0.76 | 11 | 0.431 ± 0.068 | 2.5 |
| Modulus, 70° C., psi | 117612 ± 22535 | 62 | 128160 ± 17070 | 71 |
| Stress at Yield, 70° C., psi | 2174 ± 109 | 61 | 1039 ± 89 | 29 |
| Strain at Yield, 70° C., % | 2.75 ± 0.54 | 125 | 1.02 ± 0.15 | 50 |

EQUIVALENTS

All material cited in this application, including, but not limited to, patents and patent applications, regardless of the format of such literature and similar materials, are expressly incorporated herein by reference in their entirety. In the event that one or more of the incorporated literature and similar materials differs from or contradicts this application, including but not limited to defined terms, term usage, described techniques, or the like, this application controls.

What is claimed is:

1. A reactive polyurethane adhesive formulation comprising segments derived from one or more aliphatic polycarbonate polyols having a structure P1:

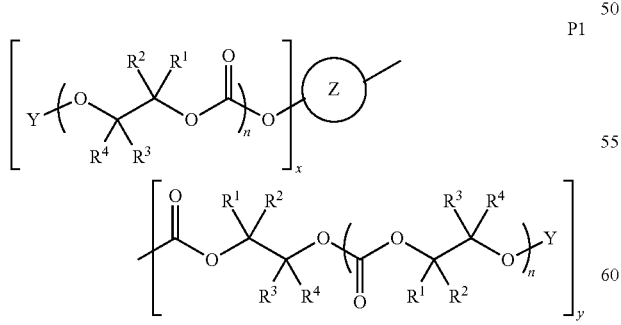

wherein $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group;

any two or more of $R^1$, $R^2$, $R^3$, and $R^4$ may optionally be taken together with intervening atoms to form one or more optionally substituted rings optionally containing one or more heteroatoms;

Y is, at each occurrence, independently —H, a reactive group, or a site of attachment to a chain-extending moiety;

is a multivalent moiety;

x and y are each independently an integer from 0 to 6, where the sum of x and y is between 2 and 6;

n is, at each occurrence independently, an integer from 3 to 1,000; and wherein the strength of a cured bond formed by the polyurethane adhesive composition between two substrates is at least 30% greater at a temperature of 70° C. than the strength of the cured bond formed by the polyurethane adhesive composition at 25° C., wherein the strength is measured at each temperature by ASTM D1002 lap sheer test, and the strength is indicated by a measurement selected from the group consisting of: Load at Failure; Tensile Energy to Break; Stress at Yield; and Strain at Yield.

2. The polyurethane adhesive composition of claim 1, wherein the strength of the cured bond formed by the polyurethane adhesive composition at is at least 40% greater at 70° C. than the strength of the cured bond formed by the polyurethane adhesive composition at 25° C.

3. The polyurethane adhesive composition of claim 2, wherein the strength of the cured bond formed by the polyurethane adhesive composition is at least 50% greater at 70° C. than the strength of the cured bond formed by the polyurethane adhesive composition at 25° C.

4. The polyurethane adhesive composition of claim 3, wherein the strength of the cured bond formed by the polyurethane adhesive composition is at least 75% greater at 70° C. than the strength of the cured bond formed by the polyurethane adhesive composition at 25° C.

5. The polyurethane adhesive composition of claim 4, wherein the strength of the cured bond formed by the polyurethane adhesive composition is at least 100% greater at 70° C. than the strength of the cured bond formed by the polyurethane adhesive composition at 25° C.

6. The polyurethane adhesive composition of claim 5, wherein the strength of the cured bond formed by the polyurethane adhesive composition is between 100% and 200% greater at 70° C. than the strength of the cured bond formed by the polyurethane adhesive composition at 25° C.

7. The reactive polyurethane adhesive formulation of claim 1, wherein at least one of Load at Failure, Tensile Energy to Break, or Strain at Yield is higher at 50° C. than at room temperature.

8. The polyurethane adhesive composition of claim 1, wherein the strength of the cured bond formed by the polyurethane adhesive composition is at least 15% greater at 50° C. than the strength of the cured bond formed by the polyurethane adhesive composition at 25° C.

9. The polyurethane adhesive composition of claim 8, wherein the strength of the cured bond formed by the polyurethane adhesive composition is at least 20% greater at 50° C. than the strength of the cured bond formed by the polyurethane adhesive composition at 25° C.

10. The polyurethane adhesive composition of claim 9, wherein the strength of the cured bond formed by the polyurethane adhesive composition is at least 30% greater at 50° C. than the strength of the cured bond formed by the polyurethane adhesive composition at 25° C.

11. The polyurethane adhesive composition of claim 10, wherein the strength of the cured bond formed by the polyurethane adhesive composition is at least 40% greater at 50° C. than the strength of the cured bond formed by the polyurethane adhesive composition at 25° C.

12. The polyurethane adhesive composition of claim 11, wherein the strength of the cured bond formed by the polyurethane adhesive composition is at least 50% greater at 50° C. than the strength of the cured bond formed by the polyurethane adhesive composition at 25° C.

13. The polyurethane adhesive composition of claim 12, wherein the strength of the cured bond formed by the polyurethane adhesive composition is at least 75% greater at 50° C. than the strength of the cured bond formed by the polyurethane adhesive composition at 25° C.

14. The polyurethane adhesive composition of claim 13, wherein the strength of the cured bond formed by the polyurethane adhesive composition is at least 100% greater at 50° C. than the strength of the cured bond formed by the polyurethane adhesive composition at 25° C.

15. The polyurethane adhesive composition of claim 14, wherein the strength of the cured bond formed by the polyurethane adhesive composition is between 100% and 200% greater at 50° C. than the strength of the cured bond formed by the polyurethane adhesive composition at 25° C.

16. The reactive polyurethane adhesive formulation of claim 1, wherein the cured bond formed by reactive polyurethane adhesive formulation retains at least 50% of its room temperature strength when heated to a temperature of 60° C.

17. The reactive polyurethane adhesive formulation of claim 1 characterized in that a cured sample of the reactive polyurethane adhesive formulation gains less than 5% mass upon immersion in toluene for 1 week at room temperature, or characterized in that a cured sample of the reactive polyurethane adhesive formulation gains less than 1% mass upon immersion in xylene for 1 week room temperature.

18. The reactive polyurethane adhesive formulation of claim 1, wherein the one or more aliphatic polycarbonate polyols are characterized in that at least 99%, at least 99.5%, at least 99.7%, or at least 99.8% of the end groups are —OH groups.

19. The reactive polyurethane adhesive formulation of claim 1, wherein the one or more aliphatic polycarbonate polyols comprise a copolymer of carbon dioxide and ethylene oxide.

20. The reactive polyurethane adhesive formulation of claim 1, wherein the one or more aliphatic polycarbonate polyols comprise a copolymer of carbon dioxide and propylene oxide.

21. The reactive polyurethane adhesive formulation of claim 1, wherein the one or more aliphatic polycarbonate polyols comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins.

22. The reactive polyurethane adhesive formulation of claim 1, wherein the one or more aliphatic polycarbonate polyols comprise a terpolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, styrene oxides, and epoxides of higher alpha olefins.

23. The reactive polyurethane adhesive formulation of claim 1, wherein the one or more aliphatic polycarbonate polyols have a number average molecular weight ($M_n$) in the range of about 500 g/mol to about 10,000 g/mol, or between about 500 g/mol and about 5,000 g/mol, or between about 500 g/mol and about 4,000 g/mol, or between about 500 g/mol and about 3,000 g/mol, or between about 500 g/mol and about 2,500 g/mol, or between about 500 g/mol and about 1,500 g/mol.

24. The reactive polyurethane adhesive formulation of claim 1, wherein the one or more aliphatic polycarbonate polyols are characterized in that, on average in the one or more aliphatic polyols, the percentage of carbonate linkages is 95% or greater or is 99% or greater.

25. The reactive polyurethane adhesive formulation of claim 1, wherein the one or more aliphatic polycarbonate polyols are characterized in that, on average in the one or more aliphatic polyols, the percentage of carbonate linkages is 99% or greater.

26. The reactive polyurethane adhesive formulation of claim 1, wherein the one or more aliphatic polycarbonate polyols are derived from a polyfunctional chain transfer agent having a formula:

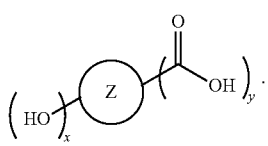

27. The reactive polyurethane adhesive formulation of claim 26, wherein

is derived from a dihydric alcohol.

28. The reactive polyurethane adhesive formulation of claim 26, wherein y is 0 and x is greater than 2.

29. The reactive polyurethane adhesive formulation of claim 1, wherein the one or more aliphatic polycarbonate polyols are selected from the group consisting of:

wherein, t is an integer from 1 to 12 inclusive, and $R^t$ is independently at each occurrence —H, or —CH$_3$.

30. The reactive polyurethane adhesive formulation of claim 1, comprising 100 parts by weight of a polyol component, wherein the one or more aliphatic polycarbonate polyols comprise from about 5 parts to 100 parts of the polyol component.

31. The reactive polyurethane adhesive formulation of claim 30, further comprising 0.01 to 20 parts by weight of one or more chain extenders.

32. The reactive polyurethane adhesive formulation of claim 30, further comprising 0 to 20 parts by weight of one or more reactive small molecules, wherein the one or more reactive small molecules comprise functional groups selected from the group consisting of hydroxyls, amines, thiols, and carboxylic acids.

33. The reactive polyurethane adhesive formulation of claim 32, wherein the one or more reactive small molecule comprises a diol.

34. The reactive polyurethane adhesive formulation of claim 30, further comprising 0 to 10 parts by weight of one

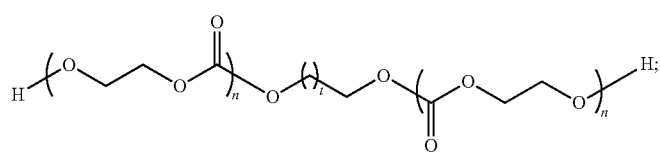

Q1

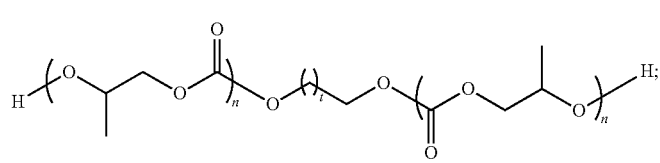

Q2

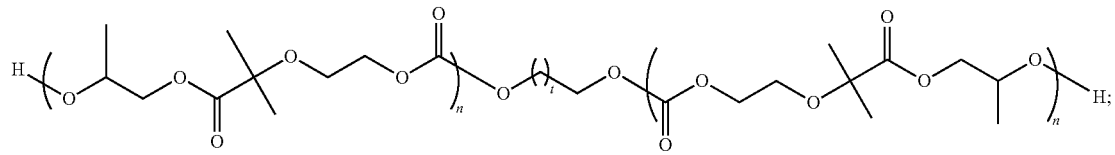

Q3

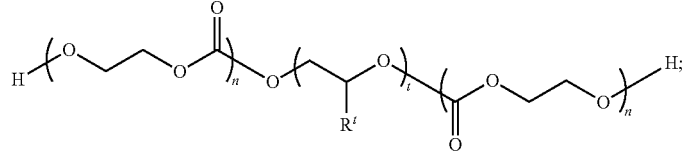

Q4

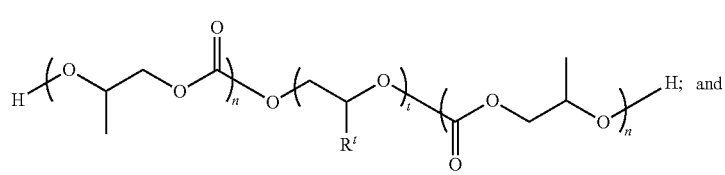

Q5

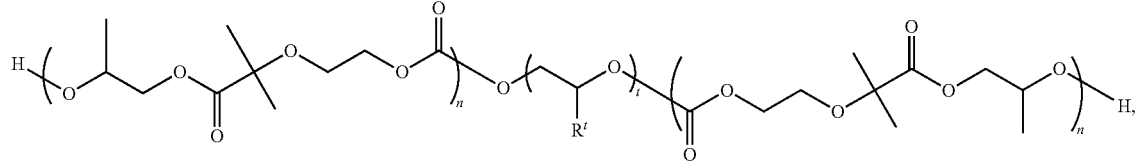

Q6 or more additives, wherein the one or more additives are selected from the group consisting of: fillers, clays, blocking agents, stabilizers, thixotropic materials, plasticizers, compatibilizers, colorants, UV stabilizers or flame retardants.

35. The reactive polyurethane adhesive formulation of claim 1, wherein the reactive polyurethane adhesive formulation is a one part adhesive formulation.

36. A method of joining two substrates, the method comprising the step of applying a reactive polyurethane adhesive formulation of claim 1 to at least one substrate, arranging the substrates so that both substrates are in contact with the reactive polyurethane adhesive formulation, and curing the reactive polyurethane adhesive formulation.

\* \* \* \* \*